(12) United States Patent
Vangbo

(10) Patent No.: US 8,763,642 B2
(45) Date of Patent: Jul. 1, 2014

(54) MICROFLUIDIC DEVICES WITH MECHANICALLY-SEALED DIAPHRAGM VALVES

(75) Inventor: Mattias Vangbo, Fremont, CA (US)

(73) Assignee: IntegenX Inc., Pleasanton, CA (US)

( * ) Notice: Subject to any disclaimer, the term of this patent is extended or adjusted under 35 U.S.C. 154(b) by 0 days.

(21) Appl. No.: 13/202,877

(22) PCT Filed: Aug. 20, 2011

(86) PCT No.: PCT/US2011/048527
§ 371 (c)(1),
(2), (4) Date: Sep. 19, 2011

(87) PCT Pub. No.: WO2012/024657
PCT Pub. Date: Feb. 23, 2012

(65) Prior Publication Data
US 2013/0139895 A1 Jun. 6, 2013

Related U.S. Application Data

(60) Provisional application No. 61/375,791, filed on Aug. 20, 2010.

(51) Int. Cl.
*F16K 15/14* (2006.01)

(52) U.S. Cl.
USPC .......................................... 137/859; 251/331

(58) Field of Classification Search
USPC .................. 137/859; 251/61.1, 331
See application file for complete search history.

(56) References Cited

U.S. PATENT DOCUMENTS

| 2,677,390 | A | * | 5/1954 | Davis et al. ................... 137/594 |
| 3,190,310 | A | | 6/1965 | Honsinger |
| 3,352,643 | A | | 11/1967 | Ando et al. |
| 3,433,257 | A | | 3/1969 | Jensen |
| 3,568,692 | A | | 3/1971 | Metzger et al. |
| 3,610,274 | A | | 10/1971 | Levesque et al. |
| 3,633,605 | A | * | 1/1972 | Smith .......................... 137/113 |
| 3,844,529 | A | * | 10/1974 | Brandt et al. ................ 251/61.1 |
| 4,113,665 | A | | 9/1978 | Law et al. |
| 4,210,310 | A | * | 7/1980 | Kay ............................. 251/61.1 |
| 4,558,845 | A | | 12/1985 | Hunkapiller |
| 4,703,913 | A | | 11/1987 | Hunkapiller |
| 4,847,120 | A | | 7/1989 | Gent |
| 4,963,498 | A | | 10/1990 | Hillman et al. |
| 5,085,757 | A | | 2/1992 | Karger et al. |

(Continued)

FOREIGN PATENT DOCUMENTS

| CA | 2433145 A1 | 5/2002 |
| EP | 0459241 B1 | 12/1991 |

(Continued)

OTHER PUBLICATIONS

U.S. Appl. No. 13/287,398, filed Nov. 2, 2011, Jovanovich et al.

(Continued)

*Primary Examiner* — John K Fristoe, Jr.
*Assistant Examiner* — R. K. Arundale

(57) ABSTRACT

This invention provides a fluidic device comprising a diaphragm valve having a fluidics layer, an actuation layer and an elastic layer between the fluidics layer and the actuation layer, the elastic layer having a diaphragm that is mechanically sealed against the fluidics layer and the actuation layer by a sealing ring in the actuation layer.

33 Claims, 21 Drawing Sheets

(56) References Cited

U.S. PATENT DOCUMENTS

| | | |
|---|---|---|
| 5,197,192 A | 3/1993 | Wylie |
| 5,275,645 A | 1/1994 | Ternoir et al. |
| 5,364,759 A | 11/1994 | Caskey et al. |
| 5,376,252 A | 12/1994 | Ekström et al. |
| 5,387,505 A | 2/1995 | Wu |
| 5,453,163 A | 9/1995 | Yan |
| 5,482,836 A | 1/1996 | Cantor et al. |
| 5,523,231 A | 6/1996 | Reeve |
| 5,571,410 A | 11/1996 | Swedberg et al. |
| 5,587,128 A | 12/1996 | Wilding et al. |
| 5,635,358 A | 6/1997 | Wilding et al. |
| 5,639,428 A | 6/1997 | Cottingham |
| 5,660,370 A | 8/1997 | Webster |
| 5,681,946 A | 10/1997 | Reeve |
| 5,705,628 A | 1/1998 | Hawkins |
| 5,705,813 A | 1/1998 | Apffel et al. |
| 5,726,026 A | 3/1998 | Wilding et al. |
| 5,741,462 A | 4/1998 | Nova et al. |
| 5,750,015 A | 5/1998 | Soane et al. |
| 5,770,029 A | 6/1998 | Nelson et al. |
| 5,775,371 A | 7/1998 | Pan et al. |
| 5,776,748 A | 7/1998 | Singhvi et al. |
| 5,830,662 A | 11/1998 | Soares et al. |
| 5,842,787 A | 12/1998 | Kopf-Sill et al. |
| 5,856,174 A | 1/1999 | Lipshutz et al. |
| 5,863,502 A | 1/1999 | Southgate et al. |
| 5,872,010 A | 2/1999 | Karger et al. |
| 5,885,470 A | 3/1999 | Parce et al. |
| 5,898,071 A | 4/1999 | Hawkins |
| 5,900,130 A | 5/1999 | Benvegnu |
| 5,908,552 A | 6/1999 | Zimmerman et al. |
| 5,922,591 A | 7/1999 | Anderson et al. |
| 5,932,799 A * | 8/1999 | Moles ............... 73/53.01 |
| 5,942,443 A | 8/1999 | Parce et al. |
| 5,948,684 A | 9/1999 | Weigl et al. |
| 5,971,158 A | 10/1999 | Yager et al. |
| 5,994,064 A | 11/1999 | Staub et al. |
| 6,001,229 A | 12/1999 | Ramsey |
| 6,007,690 A | 12/1999 | Nelson et al. |
| 6,007,775 A | 12/1999 | Yager |
| 6,010,607 A | 1/2000 | Ramsey |
| 6,048,100 A | 4/2000 | Thrall et al. |
| 6,056,860 A | 5/2000 | Amigo et al. |
| 6,073,482 A | 6/2000 | Moles |
| 6,074,827 A | 6/2000 | Nelson et al. |
| 6,103,199 A | 8/2000 | Bjornson et al. |
| 6,110,343 A | 8/2000 | Ramsey et al. |
| 6,120,184 A | 9/2000 | Laurence et al. |
| 6,136,212 A | 10/2000 | Mastrangelo et al. |
| 6,168,948 B1 | 1/2001 | Anderson et al. |
| 6,176,962 B1 | 1/2001 | Soane et al. |
| 6,190,616 B1 | 2/2001 | Jovanovich et al. |
| 6,197,595 B1 | 3/2001 | Anderson et al. |
| 6,207,031 B1 | 3/2001 | Adourian et al. |
| 6,235,471 B1 | 5/2001 | Knapp et al. |
| 6,238,538 B1 | 5/2001 | Parce et al. |
| 6,251,343 B1 | 6/2001 | Dubrow et al. |
| 6,280,589 B1 | 8/2001 | Manz et al. |
| 6,319,476 B1 | 11/2001 | Victor, Jr. et al. |
| 6,321,791 B1 | 11/2001 | Chow |
| 6,322,683 B1 | 11/2001 | Wolk et al. |
| 6,342,142 B1 | 1/2002 | Ramsey |
| 6,348,318 B1 | 2/2002 | Valkirs |
| 6,379,929 B1 | 4/2002 | Burns et al. |
| 6,387,234 B1 | 5/2002 | Yeung et al. |
| 6,387,707 B1 | 5/2002 | Seul et al. |
| 6,403,338 B1 | 6/2002 | Knapp et al. |
| 6,408,878 B2 | 6/2002 | Unger et al. |
| 6,423,536 B1 | 7/2002 | Jovanovich et al. |
| 6,429,025 B1 | 8/2002 | Parce et al. |
| 6,432,191 B2 | 8/2002 | Schutt |
| 6,432,290 B1 | 8/2002 | Harrison et al. |
| 6,454,924 B2 | 9/2002 | Jedrzejewski et al. |
| 6,489,112 B1 | 12/2002 | Hadd et al. |
| 6,521,188 B1 | 2/2003 | Webster |
| 6,524,456 B1 | 2/2003 | Ramsey et al. |
| 6,527,003 B1 | 3/2003 | Webster |
| 6,531,041 B1 | 3/2003 | Cong et al. |
| 6,531,282 B1 | 3/2003 | Dau et al. |
| 6,532,997 B1 | 3/2003 | Bedingham et al. |
| 6,533,914 B1 | 3/2003 | Liu |
| 6,534,262 B1 | 3/2003 | Mckernan et al. |
| 6,537,757 B1 | 3/2003 | Langmore et al. |
| 6,544,734 B1 | 4/2003 | Briscoe et al. |
| 6,551,839 B2 | 4/2003 | Jovanovich et al. |
| 6,581,441 B1 | 6/2003 | Paul |
| 6,581,899 B2 | 6/2003 | Williams |
| 6,605,454 B2 | 8/2003 | Barenburg et al. |
| 6,613,525 B2 | 9/2003 | Nelson et al. |
| 6,614,228 B2 | 9/2003 | Hofmann et al. |
| 6,618,679 B2 | 9/2003 | Loehrlein |
| 6,623,613 B1 | 9/2003 | Mathies et al. |
| 6,627,446 B1 | 9/2003 | Roach et al. |
| 6,629,820 B2 | 10/2003 | Kornelsen |
| 6,632,619 B1 | 10/2003 | Harrison et al. |
| 6,632,655 B1 | 10/2003 | Mehta et al. |
| 6,663,833 B1 | 12/2003 | Stave et al. |
| 6,685,442 B2 | 2/2004 | Chinn et al. |
| 6,685,809 B1 | 2/2004 | Jacobson et al. |
| 6,705,345 B1 | 3/2004 | Bifano |
| 6,752,922 B2 | 6/2004 | Huang et al. |
| 6,764,648 B1 | 7/2004 | Roach et al. |
| 6,782,746 B1 | 8/2004 | Hasselbrink et al. |
| 6,786,708 B2 | 9/2004 | Brown et al. |
| 6,787,111 B2 | 9/2004 | Roach et al. |
| 6,793,753 B2 | 9/2004 | Unger et al. |
| 6,802,342 B2 | 10/2004 | Fernandes et al. |
| 6,803,019 B1 | 10/2004 | Bjornson et al. |
| 6,807,490 B1 | 10/2004 | Perlin |
| 6,824,663 B1 | 11/2004 | Boone |
| 6,829,753 B2 | 12/2004 | Lee et al. |
| 6,833,246 B2 | 12/2004 | Balasubramanian |
| 6,852,287 B2 | 2/2005 | Ganesan |
| 6,870,185 B2 | 3/2005 | Roach et al. |
| 6,885,982 B2 | 4/2005 | Harris et al. |
| 6,899,137 B2 | 5/2005 | Unger et al. |
| 6,923,907 B2 | 8/2005 | Hobbs et al. |
| 6,929,030 B2 | 8/2005 | Unger et al. |
| 6,951,632 B2 | 10/2005 | Unger et al. |
| 6,953,058 B2 | 10/2005 | Fernandes et al. |
| 6,960,437 B2 | 11/2005 | Enzelberger et al. |
| 6,994,986 B2 | 2/2006 | Swartz et al. |
| 7,005,292 B2 | 2/2006 | Wilding et al. |
| 7,005,493 B2 | 2/2006 | Huang et al. |
| 7,015,030 B1 | 3/2006 | Fouillet et al. |
| 7,046,357 B2 | 5/2006 | Weinberger et al. |
| 7,049,558 B2 | 5/2006 | Baer et al. |
| 7,063,304 B2 | 6/2006 | Leys |
| 7,087,380 B2 | 8/2006 | Griffiths et al. |
| 7,097,809 B2 | 8/2006 | Van Dam et al. |
| 7,118,910 B2 | 10/2006 | Unger et al. |
| 7,157,228 B2 | 1/2007 | Hashmi et al. |
| 7,169,557 B2 | 1/2007 | Rosenblum et al. |
| 7,198,759 B2 | 4/2007 | Bryning et al. |
| 7,211,388 B2 | 5/2007 | Cash et al |
| 7,232,656 B2 | 6/2007 | Balasubramanian et al. |
| 7,244,961 B2 | 7/2007 | Jovanovich et al. |
| 7,258,774 B2 | 8/2007 | Chou et al. |
| 7,279,146 B2 | 10/2007 | Nassef et al. |
| 7,282,361 B2 | 10/2007 | Hodge |
| 7,312,085 B2 | 12/2007 | Chou et al. |
| 7,312,611 B1 | 12/2007 | Harrison et al. |
| 7,323,305 B2 | 1/2008 | Leamon et al. |
| 7,361,471 B2 | 4/2008 | Gerdes et al. |
| 7,377,483 B2 | 5/2008 | Iwabuchi et al. |
| 7,416,165 B2 | 8/2008 | Ohmi et al. |
| 7,438,856 B2 | 10/2008 | Jedrzejewski et al. |
| 7,445,926 B2 | 11/2008 | Mathies et al. |
| 7,488,603 B2 | 2/2009 | Gjerde et al. |
| 7,501,237 B2 | 3/2009 | Solus et al. |
| 7,526,741 B2 | 4/2009 | Lee et al. |
| 7,537,886 B1 | 5/2009 | Nazarenko et al. |
| 7,575,865 B2 | 8/2009 | Leamon et al. |
| 7,645,580 B2 | 1/2010 | Barber et al. |

(56) References Cited

U.S. PATENT DOCUMENTS

| | | |
|---|---|---|
| 7,691,614 B2 | 4/2010 | Senapathy |
| 7,745,207 B2 | 6/2010 | Jovanovich et al. |
| 7,763,453 B2 | 7/2010 | Clemmens et al. |
| 7,766,033 B2 | 8/2010 | Mathies et al. |
| 7,799,553 B2 | 9/2010 | Mathies et al. |
| 7,803,281 B2 | 9/2010 | Davies |
| 7,817,273 B2 | 10/2010 | Bahatt et al. |
| 7,832,429 B2 | 11/2010 | Young et al. |
| 7,863,357 B2 | 1/2011 | Madabhushi et al. |
| 7,867,713 B2 | 1/2011 | Nasarabadi |
| 7,885,770 B2 | 2/2011 | Gill et al. |
| 7,892,856 B2 | 2/2011 | Grate et al. |
| 7,942,160 B2 | 5/2011 | Jeon et al. |
| 7,943,305 B2 | 5/2011 | Korlach et al. |
| 7,959,875 B2 | 6/2011 | Zhou et al. |
| 7,972,561 B2 | 7/2011 | Viovy et al. |
| 7,976,789 B2 | 7/2011 | Kenis et al. |
| 7,976,795 B2 | 7/2011 | Zhou et al. |
| 8,007,746 B2 | 8/2011 | Unger et al. |
| 8,018,593 B2 | 9/2011 | Tan et al. |
| 8,037,903 B2 | 10/2011 | Wang et al. |
| 8,053,192 B2 | 11/2011 | Bignell et al. |
| 8,062,612 B2* | 11/2011 | McAvoy et al. ............... 422/537 |
| 8,256,465 B2* | 9/2012 | Christenson et al. ......... 137/859 |
| 8,376,317 B2* | 2/2013 | Chuang et al. ................ 251/331 |
| 2001/0041357 A1 | 11/2001 | Fouillet et al. |
| 2002/0022587 A1 | 2/2002 | Ferguson et al. |
| 2002/0025529 A1 | 2/2002 | Quake et al. |
| 2002/0025576 A1 | 2/2002 | Northrup et al. |
| 2002/0047003 A1 | 4/2002 | Bedingham et al. |
| 2002/0048536 A1 | 4/2002 | Bergh et al. |
| 2002/0051992 A1 | 5/2002 | Bridgham et al. |
| 2002/0058332 A1 | 5/2002 | Quake et al. |
| 2002/0068357 A1 | 6/2002 | Mathies et al. |
| 2002/0098097 A1 | 7/2002 | Singh |
| 2002/0110900 A1 | 8/2002 | Jovanovich et al. |
| 2002/0119480 A1 | 8/2002 | Weir et al. |
| 2002/0119482 A1 | 8/2002 | Nelson et al. |
| 2002/0127736 A1 | 9/2002 | Chou et al. |
| 2002/0139084 A1 | 10/2002 | Tobolka |
| 2002/0144738 A1 | 10/2002 | Unger et al. |
| 2002/0148992 A1 | 10/2002 | Hayenga et al. |
| 2002/0157951 A1 | 10/2002 | Foret et al. |
| 2002/0160361 A1 | 10/2002 | Loehrlein et al. |
| 2003/0008308 A1 | 1/2003 | Enzelberger et al. |
| 2003/0021734 A1 | 1/2003 | Vann et al. |
| 2003/0029724 A1 | 2/2003 | Derand et al. |
| 2003/0070677 A1 | 4/2003 | Handique et al. |
| 2003/0077839 A1 | 4/2003 | Takei |
| 2003/0095897 A1 | 5/2003 | Grate et al. |
| 2003/0217923 A1 | 11/2003 | Harrison et al. |
| 2004/0003997 A1 | 1/2004 | Anazawa et al. |
| 2004/0013536 A1 | 1/2004 | Hower et al. |
| 2004/0014091 A1 | 1/2004 | Duck et al. |
| 2004/0018611 A1 | 1/2004 | Ward et al. |
| 2004/0021068 A1 | 2/2004 | Staats |
| 2004/0037739 A1 | 2/2004 | Mcneely et al. |
| 2004/0038385 A1 | 2/2004 | Langlois et al. |
| 2004/0053290 A1 | 3/2004 | Terbrueggen et al. |
| 2004/0063217 A1 | 4/2004 | Webster et al. |
| 2004/0072278 A1 | 4/2004 | Chou et al. |
| 2004/0086870 A1 | 5/2004 | Childers et al. |
| 2004/0086872 A1 | 5/2004 | Childers et al. |
| 2004/0132170 A1 | 7/2004 | Storek et al. |
| 2004/0151629 A1 | 8/2004 | Pease et al. |
| 2004/0185484 A1 | 9/2004 | Costa et al. |
| 2004/0197845 A1 | 10/2004 | Hassibi et al. |
| 2004/0200724 A1 | 10/2004 | Fujii et al. |
| 2004/0209354 A1 | 10/2004 | Mathies et al. |
| 2004/0224380 A1 | 11/2004 | Chou et al. |
| 2005/0026300 A1 | 2/2005 | Samper et al. |
| 2005/0047967 A1 | 3/2005 | Chuang et al. |
| 2005/0053952 A1 | 3/2005 | Hong et al. |
| 2005/0142663 A1 | 6/2005 | Parthasarathy et al. |
| 2005/0161326 A1 | 7/2005 | Morita et al. |
| 2005/0161669 A1 | 7/2005 | Jovanovich et al. |
| 2005/0224134 A1 | 10/2005 | Yin et al. |
| 2005/0224352 A1 | 10/2005 | Harrison et al. |
| 2005/0241941 A1 | 11/2005 | Parce et al. |
| 2005/0255000 A1 | 11/2005 | Yamamoto et al. |
| 2005/0255003 A1 | 11/2005 | Summersgill et al. |
| 2005/0255007 A1 | 11/2005 | Yamada et al. |
| 2005/0266582 A1 | 12/2005 | Modlin et al. |
| 2005/0287572 A1 | 12/2005 | Mathies et al. |
| 2006/0027456 A1 | 2/2006 | Harrison et al. |
| 2006/0057209 A1 | 3/2006 | Chapman et al. |
| 2006/0073484 A1 | 4/2006 | Mathies et al. |
| 2006/0076068 A1 | 4/2006 | Young et al. |
| 2006/0140051 A1 | 6/2006 | Kim et al. |
| 2006/0163143 A1 | 7/2006 | Chirica et al. |
| 2006/0186043 A1 | 8/2006 | Covey et al. |
| 2006/0260941 A1 | 11/2006 | Tan et al. |
| 2006/0263789 A1 | 11/2006 | Kincaid |
| 2006/0266645 A1 | 11/2006 | Chen et al. |
| 2006/0292032 A1 | 12/2006 | Hataoka et al. |
| 2007/0015179 A1 | 1/2007 | Klapperich et al. |
| 2007/0017812 A1 | 1/2007 | Bousse |
| 2007/0031865 A1 | 2/2007 | Willoughby |
| 2007/0034025 A1 | 2/2007 | Pant et al. |
| 2007/0105163 A1 | 5/2007 | Grate et al. |
| 2007/0113908 A1 | 5/2007 | Lee et al. |
| 2007/0122819 A1 | 5/2007 | Wu et al. |
| 2007/0175756 A1 | 8/2007 | Nguyen et al. |
| 2007/0184463 A1 | 8/2007 | Molho et al. |
| 2007/0202531 A1 | 8/2007 | Grover |
| 2007/0237686 A1 | 10/2007 | Mathies et al. |
| 2007/0238109 A1 | 10/2007 | Min et al. |
| 2007/0248958 A1 | 10/2007 | Jovanovich et al. |
| 2007/0289941 A1 | 12/2007 | Davies |
| 2007/0297947 A1 | 12/2007 | Sommers et al. |
| 2008/0014576 A1 | 1/2008 | Jovanovich et al. |
| 2008/0014589 A1 | 1/2008 | Link et al. |
| 2008/0047836 A1 | 2/2008 | Strand et al. |
| 2008/0064610 A1 | 3/2008 | Lipovsek et al. |
| 2008/0124723 A1 | 5/2008 | Dale et al. |
| 2008/0138809 A1 | 6/2008 | Kapur et al. |
| 2008/0164155 A1 | 7/2008 | Pease et al. |
| 2008/0179255 A1 | 7/2008 | Jung et al. |
| 2008/0179555 A1 | 7/2008 | Landers et al. |
| 2008/0237146 A1 | 10/2008 | Harrison et al. |
| 2008/0242560 A1 | 10/2008 | Gunderson et al. |
| 2008/0257437 A1 | 10/2008 | Fernandes et al. |
| 2008/0281090 A1 | 11/2008 | Lee et al. |
| 2008/0302732 A1 | 12/2008 | Soh et al. |
| 2008/0311585 A1 | 12/2008 | Gao et al. |
| 2009/0004494 A1 | 1/2009 | Blenke et al. |
| 2009/0011959 A1 | 1/2009 | Costa et al. |
| 2009/0023603 A1 | 1/2009 | Selden et al. |
| 2009/0035770 A1 | 2/2009 | Mathies et al. |
| 2009/0053799 A1 | 2/2009 | Chang-yen et al. |
| 2009/0056822 A1 | 3/2009 | Young et al. |
| 2009/0060797 A1 | 3/2009 | Mathies et al. |
| 2009/0084679 A1 | 4/2009 | Harrison et al. |
| 2009/0092970 A1 | 4/2009 | Williams |
| 2009/0134069 A1 | 5/2009 | Handique |
| 2009/0137413 A1 | 5/2009 | Mehta et al. |
| 2009/0148933 A1 | 6/2009 | Battrell et al. |
| 2009/0178934 A1 | 7/2009 | Jarvius et al. |
| 2009/0181411 A1 | 7/2009 | Battrell et al. |
| 2009/0253181 A1 | 10/2009 | Vangbo et al. |
| 2009/0269504 A1 | 10/2009 | Liao |
| 2009/0286327 A1 | 11/2009 | Cho et al. |
| 2009/0311804 A1 | 12/2009 | Mcbrady et al. |
| 2009/0314972 A1 | 12/2009 | Mcavoy et al. |
| 2009/0325277 A1 | 12/2009 | Shigeura et al. |
| 2010/0068723 A1 | 3/2010 | Jovanovich et al. |
| 2010/0111770 A1 | 5/2010 | Hwang et al. |
| 2010/0129810 A1 | 5/2010 | Greiner et al. |
| 2010/0165784 A1 | 7/2010 | Jovanovich et al. |
| 2010/0172898 A1 | 7/2010 | Doyle et al. |
| 2010/0173398 A1 | 7/2010 | Peterman |
| 2010/0197507 A1 | 8/2010 | Rothberg et al. |
| 2010/0210008 A1 | 8/2010 | Strand et al. |
| 2010/0221726 A1 | 9/2010 | Zenhausern et al. |

(56) References Cited

U.S. PATENT DOCUMENTS

| | | |
|---|---|---|
| 2010/0224255 A1 | 9/2010 | Mathies et al. |
| 2010/0228513 A1 | 9/2010 | Roth et al. |
| 2010/0233696 A1 | 9/2010 | Joseph et al. |
| 2010/0243916 A1 | 9/2010 | Maurer et al. |
| 2010/0252123 A1 | 10/2010 | Mathies et al. |
| 2010/0266432 A1 | 10/2010 | Pirk et al. |
| 2010/0285578 A1 | 11/2010 | Selden et al. |
| 2010/0285606 A1 | 11/2010 | Philips et al. |
| 2010/0285975 A1 | 11/2010 | Mathies et al. |
| 2010/0291666 A1 | 11/2010 | Collier et al. |
| 2010/0303687 A1 | 12/2010 | Blaga et al. |
| 2010/0304355 A1 | 12/2010 | Shuler et al. |
| 2010/0326826 A1 | 12/2010 | Harrison et al. |
| 2011/0003301 A1 | 1/2011 | Raymond et al. |
| 2011/0005932 A1 | 1/2011 | Jovanovich et al. |
| 2011/0008813 A1 | 1/2011 | Dilleen et al. |
| 2011/0020920 A1 | 1/2011 | Mathies et al. |
| 2011/0027913 A1 | 2/2011 | Bau et al. |
| 2011/0038758 A1 | 2/2011 | Akaba et al. |
| 2011/0039303 A1 | 2/2011 | Jovanovich et al. |
| 2011/0045505 A1 | 2/2011 | Warthoe et al. |
| 2011/0048945 A1 | 3/2011 | Harrison et al. |
| 2011/0053784 A1 | 3/2011 | Unger et al. |
| 2011/0070578 A1 | 3/2011 | Bell et al. |
| 2011/0076735 A1 | 3/2011 | Jovanovich et al. |
| 2011/0124049 A1 | 5/2011 | Li et al. |
| 2011/0126910 A1 | 6/2011 | May |
| 2011/0126911 A1 | 6/2011 | Kobrin et al. |
| 2011/0127222 A1 | 6/2011 | Chang-yen et al. |
| 2011/0136179 A1 | 6/2011 | Bin/lee et al. |
| 2011/0137018 A1 | 6/2011 | Chang-yen et al. |
| 2011/0171086 A1 | 7/2011 | Prins et al. |
| 2011/0172403 A1 | 7/2011 | Harrold et al. |
| 2011/0189678 A1 | 8/2011 | Mcbride et al. |
| 2011/0206576 A1 | 8/2011 | Woudenberg et al. |
| 2011/0212440 A1 | 9/2011 | Viovy et al. |
| 2011/0212446 A1 | 9/2011 | Wang et al. |
| 2011/0223605 A1 | 9/2011 | Bienvenue et al. |
| 2012/0181460 A1* | 7/2012 | Eberhart et al. ............ 251/61.1 |

FOREIGN PATENT DOCUMENTS

| | | | |
|---|---|---|---|
| EP | 0637999 A1 | 2/1995 |
| EP | 0527905 B1 | 11/1995 |
| EP | 1065378 B1 | 4/2002 |
| EP | 1411340 A2 | 4/2004 |
| EP | 1411340 A3 | 5/2004 |
| EP | 1345697 B1 | 6/2007 |
| EP | 1658890 B1 | 5/2008 |
| EP | 1345551 B1 | 4/2009 |
| EP | 2345739 A2 | 7/2011 |
| JP | 2007-506430 A | 7/1995 |
| JP | 408327594 A | 12/1996 |
| JP | 2001-500966 A | 1/2001 |
| JP | 2001-521818 A | 11/2001 |
| JP | 2002-370200 A | 12/2002 |
| JP | 2003-536058 A | 12/2003 |
| JP | 2004-025159 A | 1/2004 |
| JP | 2004-108285 A | 4/2004 |
| JP | 2004-180594 A | 7/2004 |
| JP | 2005-323519 A | 11/2005 |
| JP | 2005-337415 | 12/2005 |
| JP | 2005-345463 A | 12/2005 |
| JP | 2007-155491 A | 6/2007 |
| JP | 2008-513022 A | 5/2008 |
| WO | WO 93/22053 A1 | 4/1993 |
| WO | WO 96/04547 A1 | 2/1996 |
| WO | WO 96/14934 A1 | 5/1996 |
| WO | WO 98/10277 A1 | 7/1997 |
| WO | WO 99/22868 A1 | 10/1998 |
| WO | WO 98/52691 A1 | 11/1998 |
| WO | WO 98/53300 A2 | 11/1998 |
| WO | WO 98/53300 A3 | 2/1999 |
| WO | WO 99/36766 A1 | 7/1999 |
| WO | WO 99/40174 A1 | 8/1999 |
| WO | WO 00/40712 A1 | 7/2000 |
| WO | WO 00/60362 A1 | 10/2000 |
| WO | WO 00/61198 A1 | 10/2000 |
| WO | WO 01/32930 A1 | 5/2001 |
| WO | WO 01/38865 A1 | 5/2001 |
| WO | WO 01/85341 A1 | 11/2001 |
| WO | WO 02/43864 A2 | 11/2001 |
| WO | WO 02/41995 A1 | 5/2002 |
| WO | WO 02/43615 A2 | 6/2002 |
| WO | WO 02/43864 A3 | 8/2002 |
| WO | WO 03/043615 A3 | 3/2003 |
| WO | WO 03/044528 A2 | 5/2003 |
| WO | WO 03/085379 A2 | 10/2003 |
| WO | WO 03/085379 A3 | 12/2003 |
| WO | WO 2004/038363 A2 | 5/2004 |
| WO | WO 03/044528 A3 | 6/2004 |
| WO | WO 2004/061085 A2 | 7/2004 |
| WO | WO 2004/061085 A3 | 10/2004 |
| WO | WO 2004/098757 A2 | 11/2004 |
| WO | WO 2004/038363 A3 | 12/2004 |
| WO | WO 2005/075081 A1 | 8/2005 |
| WO | WO 2005/121308 A1 | 8/2005 |
| WO | WO 2005/091820 A2 | 10/2005 |
| WO | WO 2005/108620 A2 | 11/2005 |
| WO | WO 2005/118867 A2 | 12/2005 |
| WO | WO 2006/032044 A2 | 3/2006 |
| WO | WO 2005/108620 A3 | 4/2006 |
| WO | WO 2004/098757 A3 | 5/2006 |
| WO | WO 2005/091820 A3 | 10/2006 |
| WO | WO 2006/032044 A3 | 1/2007 |
| WO | WO 2007/002579 A2 | 1/2007 |
| WO | WO 2007/064635 A1 | 6/2007 |
| WO | WO 2007/082480 A1 | 7/2007 |
| WO | WO 2007/109375 A2 | 9/2007 |
| WO | WO 2005/118867 A3 | 12/2007 |
| WO | WO 2008/012104 A2 | 1/2008 |
| WO | WO 2008/024319 A2 | 2/2008 |
| WO | WO 2008/024319 A3 | 4/2008 |
| WO | WO 2008/039875 A1 | 4/2008 |
| WO | WO 2008/012104 A3 | 5/2008 |
| WO | WO 2008/115626 A2 | 9/2008 |
| WO | WO 2007/109375 A3 | 10/2008 |
| WO | WO 2008/115626 A3 | 11/2008 |
| WO | WO 2009/008236 A1 | 1/2009 |
| WO | WO 2009/015296 A1 | 1/2009 |
| WO | WO 2007/002579 A3 | 9/2009 |
| WO | WO 2009/108260 A2 | 9/2009 |
| WO | WO 2009/129415 A1 | 10/2009 |
| WO | WO 2009/108260 A3 | 12/2009 |
| WO | WO 2010/041174 A1 | 4/2010 |
| WO | WO 2010/041231 A2 | 4/2010 |
| WO | WO 2010/042784 A2 | 4/2010 |
| WO | WO 2010/042784 A3 | 7/2010 |
| WO | WO 2010/041231 A3 | 9/2010 |
| WO | WO 2010/109392 A1 | 9/2010 |
| WO | WO 2010/130762 A2 | 11/2010 |
| WO | WO 2010/141921 A1 | 12/2010 |
| WO | WO 2011/003941 A1 | 1/2011 |
| WO | WO 2010/130762 A3 | 2/2011 |
| WO | WO 2011/012621 A1 | 2/2011 |
| WO | WO 2011/034621 A2 | 3/2011 |
| WO | WO 2011/084703 A2 | 7/2011 |
| WO | WO 2011/034621 A3 | 11/2011 |

OTHER PUBLICATIONS

Chinese office action dated Jul. 8, 2011 for CN 200580035911.7. (In Chinese with English translation).
International search report and written opinion dated Jan. 5, 2012 for PCT Application No. US2011/048527.
International search report and written opinion dated Oct. 26, 2011 for PCT Application No. US11/38180.
International written opinion dated Oct. 6, 2010 for PCT Application No. US10/37545.
International written opinion report dated Jul. 30, 2010 for PCT Application No. US2010/36464.
Japanese office action dated May 27, 2011 for Application No. 2007-532553 (in Japanese with English translation).

(56) References Cited

OTHER PUBLICATIONS

Japanese office action dated Jul. 28, 2011 for Application No. 2008-553535 (in Japanese with English translation).
U.S. Appl. No. 13/349,832, filed Jan. 13, 2012, Eberhart et al.
U.S. Appl. No. 13/367,326, filed Feb. 6, 2012, Jovanovich et al.
U.S. Appl. No. 13/384,753, filed Jan. 18, 2012, Stern et al.
Allowed Claims dated May 6, 2010 for U.S. Appl. No. 11/726,701.
Allowed Claims dated Jul. 1, 2010 for U.S. Appl. No. 11/139,018.
Allowed Claims dated Aug. 13, 2008 for U.S. Appl. No. 10/750,533.
Auroux, et al. Micro Total Analysis Systems 2. Analytical Standard Operations and Applications. Anal. Chem. 2002; 2637-2652.
Belgrader, et al. A Minisonicator to Rapidly Disrupt Bacterial Spores for DNA Analysis. Anal. Che. 1999; 4232-4236.
Belgrader, et al. PCR Detection of Bacteria in Seven Minutes. Science Magazin. 1999; 284(5413):449-450.
Belgrader, et al. Rapid PCR for Identity Testing Using a Battery-Powered Miniature Thermal Cycler. J Forensic Sci. 1998; 315-319.
Birnboim. A Rapid Alkaline Extraction Method for the Isolation of Plasmid DNA. Methods of Enzymology. 1983; 100:243-255.
Blazej, et al. Inline injection microdevice for attomole-scale sanger DNA sequencing. Anal Chem. Jun. 15, 2007;79(12):4499-506. Epub May 12, 2007.
Burns, et al. An Integrated Nanoliter DBA Analysis Device. Science Magazine. 1998; 484-487.
Call, et al. Detecting and genotyping *Escherichia coli* 0157:H7 using multiplexed PCR and nucleic acid microarrays. International Journal of Food Microbiology. 2001; 67:71-80.
Cameron, et al. High Internal Phase Emulsions (HIPEs) Structure, Properties and Use in Polymer Preparation. University of Strathclyde. 1995; 163214.
Canadian Office Action dated Jun. 10, 2011 for CA Application No. 2512071.
Capanu, et al. Design Fabrication and Testing of a Bistable Electromagnetically Actuated Microvalve. Journal of Microeclectromechanical System. 2000; 9:181-189.
Chandler, et al. Automated immunomagnetic separation and microarray detection of *E. coli* 0157:H7 from poultry carcass rinse. International Journal of Food Microbiology. 2001; 70:143-154.
Charlieu, et al. 3' Alu PCR: a simple and rapid method to isolate human polymorphic markers. Nucleic Acids Res. Mar. 25, 1992;20(6):1333-7.
Chinese office action dated Jan. 18, 2012 for CN 200980108368.7. (In Chinese with English translation).
Chinese Office Action dated Jan. 25, 2008 for Application No. 2003801100666.
Chinese office action dated Feb. 24, 2010 for CN Application No. 200780018073.1.
Delehanty, et al. A Microarray Immunoassay for Simultaneous Detection of Proteins and Bacteria. Anal. Chem. 2002; 74:5681-5687.
Dodson, et al. Fluidics Cube for Biosensor Miniaturization. Anal. Chem. 2001; 3776-3780.
Duffy, et al. Rapid Prototyping of Micro fluidic Systems in Poly(dimethylsiloxane). Anal. Chem. 1998; 4974-4984.
European office action dated Apr. 7, 2011 for EP Application No. 05804847.1.
Gau, et al. A MEMS based amperometric detector for *E. coli* bacteria using self-assembled monolayers. Biosensors & Bioelectronic. 2001; 16:745755.
Hansen, et al. Polymerase chain reaction assay for the detection of *Bacillus cereus* group cells. FEMS Microbiology Letters. 2001; 202:209-213.
Hartmann, et al. Direct immobilization of antibodies on phthalocyaninato-polysiloxane photopolymers. Thin Solid Films. 1994; 245:206-210.
Hartmann, et al. One-step immobilization of immunoglobulin G and potential of the method for application in immunosensors. Sensors and Actuators. 1995; 28 (2):143-149.
He, et al. Fabrication of Nanocolumns for Liquid Chromatography. Anal. Chem. 1998; 3790-3797.
Hjerten. High-performance electrophoresis : Elimination of electroendosmosis and solute adsorption. J. Chromotography. 1985; 347:191-198.
Hosokawa, et al. A Pneumatically-Actuated Three-Way Microvalve Fabricated with Polydimcthylsiloxanc Using the Membrane Transfer Technique. J. Micinicch. Microcng. 2000; 10:415-420.
International search report and written opinion dated Oct. 29, 2007 for PCT/US2005/018678.
International search report and written opinion dated Mar. 16, 2012 for PCT/US2011/048528.
International search report and written opinion dated Jul. 15, 2008 for PCT/US2007/007381.
Jacobson, et al. High-Speed Separations on a Microchip. Anal. Chem. 1994; 1114-1118.
Jacobson, et al. Integrated Microdevice for DNA Restriction Fragment Analysis Anal. Chem. 1996; 720-723.
Japanese office action dated Jan. 5, 2012 for Application No. 2007-532553 (in Japanese with English translation).
Japanese Office Action dated Jan. 13, 2010 for JP Application No. 2005508628.
Japanese office action dated Mar. 1, 2011 for JP Application. No. 2007-515379.
Japanese Office Action dated Aug. 10, 2010 for JP Application No. 2005508628.
Kamei, et al. Integrated Amorphous Silicon Photodiode Detector for Microfabricaqted Capillary Electrophoresis Devices. Micro Total Analysis Systems. 2002; 257-259.
Kamei, et al. Integrated hydrogenated amorphous Si photodiode detector for microfluidic bioanalytical devices. Anal Chem. Oct. 15, 2003;75(20):5300-5.
Kimura, et al. Restriction-Site-Specific PCR as a Rapid Test to Detect Enterohemorrhagic *Escherichia coli* 0157:H7 Strains in Environmental Samples. Applied and Environmental Microbiology. Jun. 2000; 25132519.
Koch, et al. Optical flow-cell multichannel immunosensor for the detection of biological warfare agents. Biosens Bioelectron. Jan. 2000;14(10-11):779-84.
Kong, et al. Rapid detection of six types of bacterial pathogens in marine waters by multiplex PCR. Water Research. 2002; 36: 2802-2812.
Korean office action dated Mar. 5, 2012 for KR 10-2007-7008423. (In Korean with English translation).
Kourentzi, et al. Microbial identification by immunohybridization assay of artificial RNA labels. Journal of Microbiological Methods. 2002; 49:301-306.
Kuhnert, et al. Detection System for *Escherichia coli*-Specific Virulence Genes: Absence of Virulence Determinants in B and C Strains. applied and Environmental Microbiology. 1997:703-709.
Ligler, et al. Integrating Waveguide Biosensor. Anal Chem. Feb. 1, 2002;74(3):713-9.
Manz, et al. Miniaturized Total Chemical Analysis Systems: A Novel Concept for Chemical Sensing. Sensors & Actuators. 1990; 244-248.
McLaughlin, et al. Molecular Approaches to the Identification of Streptococci. Methods in Molecular Medicine. 1998; 15:117-139.
Medintz, et al. Genotyping Energy-Transfer Cassette Labeled Short Tandem Repeat Amplicons with Capillary Array Electrophoresis Microchannel Plates. Clinical Chemistry. 2001; 1614-1621.
Medintz, et al. High-Performance Genetic Analysis Using Microfabricated Capillary Array Electroporesis Microplates. Electrophoresis. 2001; 38453856.
Medintz, et al. High-Performance Multiplex SNP Analysis of Three Hemochmromatosis-Related Mutations with Capillary Array Electrophoresis Microplates. Genome Research. 2001; 413-421.
Medintz, et al. Novel Energy Transfer Fluorescence Labeling Cassette. BioTechniques. 2002; 32(2):270.
Nataro, et al. Diarrheagenic *Escherichia coli*. Clinical MicroBiology Reviews. Jan. 1998;142-201.
Notice of Allowance dated May 6, 2010 for U.S. Appl. No. 11/726,701.
Notice of Allowance dated Jul. 1, 2010 for U.S. Appl. No. 11/139,018.
Notice of Allowance dated Aug. 13, 2008 for U.S. Appl. No. 10/750,533.

(56) References Cited

OTHER PUBLICATIONS

Office action dated Jan. 7, 2011 for U.S. Appl. No. 12/844,544.
Office action dated Jan. 20, 2010 for U.S. Appl. No. 11/978,224.
Office action dated Feb. 22, 2010 for U.S. Appl. No. 11/139,018.
Office action dated Mar. 2, 2008 for U.S. Appl. No. 10/540,658.
Office action dated Mar. 29, 2012 for U.S. Appl. No. 12/789,186.
Office action dated Mar. 30, 2012 for U.S. Appl. No. 12/795,515.
Office action dated Apr. 11, 2012 for U.S. Appl. No. 11/139,018.
Office action dated Apr. 29, 2009 for U.S. Appl. No. 11/139,018.
Office action dated Aug. 27, 2008 for U.S. Appl. No. 11/139,018.
Office action dated Oct. 8, 2008 for U.S. Appl. No. 10/540,658.
Office action dated Oct. 25, 2010 for U.S. Appl. No. 11/978,224.
Office action dated Nov. 6, 2009 for U.S. Appl. No. 11/139,018.
Office action dated Dec. 11, 2009 for U.S. Appl. No. 11/726,701.
O'Mahony, et al. A real time PCR assay for the detection and quantitation of Mycobacterium avium subsp. Paratuberculosis using SYBE Green and the Light Cycler. Journal of Microbiological Methods. 2002; 51:283-293.
Papadelli, et al. Rapid detection and identification of Streptococcus macedonicus by species-specific PCR and DNA hybridisation. International Journal of Food Microbiology. 2003; 81:231-239.
Peng, et al. Immuno-capture PCR for detection of Aeromonas hydrophila Journal of Microbiological Methods. 2002; 49:335-338.
Press, et al., An Integrated Microfluidic Processor for Single Nucleotide Polymorphism-based DNA Computing, Lab on a Chip. 2005, 5:10, 8 pages.
Press, et al., The Art of Scientific Computing, Numerical Recipes in C, 2nd Edition, Cambridge University Press, 1992, (table of Contents).
Quake, et al. From Micro-to Nanofabrication with Soft Materials. Science Magazine. 2000; 1536-1540.
Reyes, et al. Micro Total Analysis Systems. 1. Introduction Theory and Technology. Anal Chem. 2002; 2623-2636.
Roth, et al. Fundamentals of Logic Design, 3$^{rd}$ Edition, West Publishing Company, 1985 (Table of Content).
Rowe, et al. Array Biosensor for Simultaneous Identification of Bacterial, Viral and Protein Analytes. Anal. Chem. 1999; 71:3846-3852.
Rowe-Taitt, et al., Simultaneous detection of six biohazardous agents using a planar waveguide array biosensor. Biosensors & Bioelectronics. 2000; 15:579-589.
Ruan, et al. Immunobiosensor Chips for Detection of Escherichia coli 0157:H7 Using Electrochemical Impedance Spectroscopy. Anal. Chem. 2002; 74:4814-4820.
Sanford, et al. Photoactivatable Cross-Linked Polyacrylamide for the Site-Selective Immobilization of Antigens and Antibodies Chem Mater. 1998; 10(6): 15101520.
Shi, et al. Radial Capillary Array Electrophoresis Microplate and Scanner for High Performance Nucleic Acid Analysis. Anal. Chem. 1999; 5354-5361.
Soper, et al. Polymeric Microelectro-mechanical Systems. Anal. Chem 2000; 643-651.
Stumpfle, et al. Absence of DNA sequence homology with genes of the Excherichia coli hemB locus in Shiga-toxin producing E. coli (STEC) 0157 Strains. FEMS Microbiology Letters. 1999; 174:97-103.
Sun, et al. A Heater-Integrated Transparent Microchannel Chip for Continuous Flow PCR. Sensors and Actuators B. 2002; 84:283-289.
Tian, et al. Evaluation of Silica Resins for Direct and Efficient Extraction of DNA from Complex Biological Matrices in a Miniaturized Format. Analytical Biochemistry. 2000; 283:175-191.
Verlee, et al. .Fluid Circuit Technology: Integrated Interconnect Technology for Miniature Fluidic Devices. Abbott Laboratories Hospital Division, Abbott Park, IL. 1996; 9-14.
Walt, et al. Biological Warefare Detection. Analytical Chemistry 2000; 739-746.
Waters, et al. Microchip Device for Cell Lysis, Multiplex PCR Amplification, and Electrophoretic Sizing Anal. Chem. 1999; 158-162.
Webster, et al. Monolithic Capillary Electrophoresis Device with Integrated Fluorescence Detector. Anal. Chem. 2001;1622-1626.
White, et al. Flash detection/identification of pathogens, bacterial spores and bioterrorism agent biomarker from clinical and environmental matrices. Journal of Microbiological Methods. 2002; 48:139-147.
Yacoub-George, et al. Chemiluminescence multichannel immunosensor for biodetection Analytica Chimica Acta. 2002; 457:3-12.
Yang, et al. An Integrated Stacked Microlaboratory for Biological Agent Detection with DNA and Immunoassays. Biosensors & Bioelectronics. 2002; 17:605-618.
Zhu, et al. High-Sensitivity Capillary Electrophoresis of Double-Stranded DNA Fragments Using Monomeric and Dimeric Fluorescent Intercalating Dyes. Anal Chem. 1994; 1941-1948.
Bianco, et al. Teflon-like coatings for micro devices. CPAC Satellite Workshops. Rome, Italy. Mar. 23, 2009.
Blaga, et al. Microfluidic device for automated sample preparation. Poster. MSB Conference. Dalian, China. Oct. 2009.
Blaga, et al. Plastic chips with valves and pumps. MSB Conference. Berlin, Germany. Mar. 2008. Abstract only.
Franklin, et al. Apollo 200: an integrated platform for DNA profiling. Poster. MCB Conference. Prague, Czech Republic. Mar. 2010.
International search report and written opinion dated Apr. 30, 2012 for PCT/US2012/021217.
Japanese office action dated May 11, 2012 for Application No. 2008-553535 (English translation).
Lee, et al. Polymer nanoengineering for biomedical applications. Annals Biomed. Eng. 2006; 34:75-88.
Lu, et al. New valve and bonding designs for microfluidic biochips containing proteins. Anal. Chem. 2007; 79:994-1001.
Office action dated May 22, 2012 for U.S. Appl. No. 12/526,015.
Oh, et al. A review of microvalves. J. Micromech. Microeng. 2006; 16:R13-R39.
Samel. Novel Microfluidic devices based on a thermally responsive PDMS composite. KTH Royal Institute of Technology, Stockholm, Sweden. 2007; 1-80.
Tajima, et al. Physiochemical properties and morphology of fluorocarbon films synthesized on crosslinked polyethylene by capacitively coupled octafluorocyclobutane plasma. J. Phys. Chem. C. 2007; 111(11):4358-4367.
Willis, et al. Monolithic teflon membrane valves and pumps for harsh chemical and low-temperature use. Lab Chip. 2007; 7:1469-1474.
Zhang, et al. PMMA/PDMS valves and pumps for disposable microfluidics. Lap Chip. 2009; 9:3088-3094.
U.S. Appl. No. 12/026,510, filed Feb. 5, 2008, Jovanovich et al.
U.S. Appl. No. 12/820,390, filed Jun. 22, 2010, Harrison et al.
U.S. Appl. No. 12/845,650, filed Jul. 28, 2010, Jovanovich et al.
U.S. Appl. No. 13/075,165, filed Mar. 29, 2011, Eberhart et al.
U.S. Appl. No. 13/113,968, filed May 23, 2011, Majlof et al.
U.S. Appl. No. 13/202,884, filed Aug. 23, 2011, Jovanovich et al.
Amendment and Request for Correction of Inventorship mailed Jan. 10, 2008 in U.S. Appl. No. 10/750,533.
Anderson, et al. A miniature integrated device for automated multistep genetic assays. Nucleic Acids Research. 2000;28:e60.
Armani, et al. Re-configurable fluid circuits by PDMS elastomer micromachining. Proceedings of IEEE Micro Electro Mechanical Systems: MEMS. 1999; 222-227.
Bennett, et al. Toward the 1,000 dollars human genome. Pharmacogenomics, 6 (4) 373-382. (Jun. 2005).
Bings, et al. Microfluidic Devices Connected to Fused-Silica Capillaries with Minimal Dead Dead Volume. Analytical Chemistry. 1999;71(15):3292-3296.
Blazej, et al. Microfabricated bioprocessor for integrated narioliter-scale Sanger DNA sequencing. Proc. Natl. Acad. Sci. USA 2006;103:7240-7245.
Blazej, et al. Polymorphism Ratio Sequencing: A New Approach for Single Nucleotide Polymorphism Discovery and Genotyping. Genome Research. 2003;13:287-293.
Brenner, et al. Gene expression analysis by massively parallel signature sequencing (MPSS) on microbead arrays. Nature Biotechnology. 2000;18(6):630-634.
Buchholz, et al. The use of light scattering for precise characterization of polymers for DNA sequencing by capillary electrophoresis. Electrophoresis. 2001;22:4118-4128.

(56) References Cited

OTHER PUBLICATIONS

CAPLUS abstract of Krohkin et al. Modified silica as a stationary phase for ion chromatography. Journal of Chromatography A. 1995;706:93-8.
Chan, et al. Microfabricated Polymer Devices for Automated Sample Delivery of Peptides for Analysis by Electrospray Ionization Tandem Mass Spectrometry. Analytical Chemistry. 1999;71(20):4437-4444.
Chiem, et al. Microchip systems for immunoassay: an integrated immunoreactor with electrophoretic separation for serum theophylline determination. Clinical Chemistry.1998;44(3):591-598.
Chiem, et al. Room temperature bonding of micromachined glass devices for capillary electrophoresis. Sensors and Actuators. 2000;B63(3):147-152.
Chinese office action dated Jan. 31, 2011 for CN 200580035911.7. (In Chinese with English translation).
Coleman, et al. A sequential injection microfluidic mixing strategy. Microfluidics and Nanofluidics. 2005;3:19-327.
Curcio, et al. Continuous Segmented-Flow Polymerase Chain Reaction for High-Throughput Miniaturized DNA Amplification. Analytical Chemistry. 2003;75(1):1-7.
Datasheet Cycle Sequencing, Retrieved from the internet, URL:http//answers.com/topic/cycle sequencing. Printed Sep. 3, 2010, pp. 1-2.
Diehl, et al. BEAMing: single-molecule PCR on microparticles in water-in-oil emulsions. Nature Methods. 2006;3(7):551-9.
Doherty, et al. Sparsely Cross-linked "Nanogel" Matrices as Fluid, Mechanically Stablized Polymer Networks for High-Throughput Microchannel DNA Sequencing. Analytical Chemistry. 2004;76:5249-5256.
Doherty, et al. Sparsely cross-linked "nanogels" for microchannel DNA sequencing. Electrophoresis. 2003;24(24):4170-4180.
Dorfman, et al. Contamination-Free Continuous Flow Microfluidic Polymerase Chain Reaction for Quantitative and Clinical Applications. Analytical Chemistry. 2005;77(11):3700-3704.
Doyle, et al. Self-Assembled Magnetic Matrices for DNA Separation Chips. Science. 2000;295:2237.
Dressman, et al. Transforming single DNA molecules into fluorescent magnetic particles for detection and enumeration of genetic variations. Proc Natl Acad Sci USA. 2003;100(15):8817-8822.
Emrich, et al. Microfabricated 384-Lane Capillary Array Electrophoresis Bioanalyzer for Ultrahigh-Throughput Genetic Analysis. Analytical Chemistry. 2002;74(19):5076-5083.
Ericson, et al. Electroosmosis- and Pressure-Driven Chromatography in Chips Using Continuous Beds. Analytical Chemistry. 2000;72(1):81-87.
Erratum for Margulies, et al. Genome sequencing in microfabricated high-density picolitre reactors. Nature. 2005;437(7057):376-80.: Margulies, et al. Nature. 441(7089):120. (May 4, 2006).
European search report and search opinion dated Jun. 6, 2011 for Application No. 10011511.2.
European search report dated Dec. 18, 2009 for Application No. 03808583.3.
European search report dated Sep. 1, 2010 for Application No. 5804847.1.
Ewing, et al. Base-Calling of Automated Sequencer Traces Using Phred. I. Accuracy Assessment. Genome Research. 1998;8:175-185.
Ewing, et al. Base-Calling of Automated Sequencer Traces Using Phred. II. Error probabilities. Genome Research. 1998;8:186-194.
Figeys, et al. A Microfabricated Device for Rapid Protein Identification by Microelectrospray Ion Trap Mass Spectrometry. Analytical Chemistry. 1997;69(16):3153-3160.
Figeys, et al. An Integrated Microfluidics-Tandem Mass Spectrometry System for Automated Protein Analysis. Analytical Chemistry. 1998;70(18):3728-3734.
Figeys, et al. Microfabricated Device Coupled with an Electrospray Ionization Quadrupole Time-of-Flight Mass Spectrometer: Protein Identifications Based on Enhanced-Resolution Mass Spectrometry and Tandem Mass Spectrometry Data. Rapid Communications in Mass Spectrometry. 1998;12:1435-1444.
Figeys, et al. Nanoflow Solvent Gradient Delivery from a Microfabricated Device for Protein Identifications by Electrospray Ionization Mass Spectrometry. Analytical Chemistry. 1998;70(18):3721-3727.
Francis, et al. Flow analysis based on a pulsed flow of solution: theory, instrumentation and applications. Talanta. 2002;58(6):1029-1042.
Ghadessy, et al. Directed evolution of polymerase function by compartmentalized self-replication. Proc Natl Acad Sci USA. 2001;98:4552-4557.
Giddings, et al. A software system for data analysis in automated DNA sequencing. Genome Research. 1998;8:644-665.
Goll, et al. Microvalves with bistable buckled polymer diaphragms. Journal of Micromechanics and Microengineering. 1996;6:77-79.
Grover, et al. An integrated microfluidic processor for single nucleotide polymorphism-based DNA computing. Lab on a Chip. 2005;5(10):1033-1040.
Grover, et al. Development and multiplexed control of latching pneumatic valves using microfluidic logical structures. Lab on a chip. 2006;6:623-631.
Grover, et al. Monolithic membrane valves and diaphragm pumps for practical large-scale integration into glass microfluidic devices. Sensors and Actuators. 2003;B89:315-323.
Grover, et al. Practical Valves and Pumps for Large-Scale Integration into Microfludic Analysis Devices. Micro Total Analysis Systems. 2002;1:136-138.
Hansen, et al. A robust and scalable microfluidic metering method that allows protein crystal growth by free interface diffusion. Proc Natl Acad Sci USA. 2002;99(26):16531-16536.
Harrison, et al. Micromachining a Miniaturized Capillary Electrophoresis-Based Chemical Analysis System on a Chip. Science. 1993;261(5123):895-897.
Hayes, et al. Edge: A Centralized Resource for the Comparison, Analysis, and Distribution of Toxicogenomic Information. Molecular Pharmacology. 2005;67(4):1360-1368.
Hultman, et al. Bidirectional Solid-Phase Sequencing of In Vitro-Amplified Plasmid DNA. BioTechniques. 1991;10(1):84-93.
International Preliminary Report for corresponding PCT Application No. PCT/CA2000/01421 dated Feb. 14, 2002.
International Preliminary Report for corresponding PCT Application No. PCT/US2005/018678 dated Nov. 13, 2007.
International Preliminary Report for corresponding PCT Application No. PCT/US2005/033347 dated Mar. 20, 2007.
International Preliminary Report for corresponding PCT Application No. PCT/US2007/007381 dated Sep. 23, 2008.
International Preliminary Report for corresponding PCT Application No. PCT/US2007/02721 dated Aug. 5, 2008.
International Preliminary Report for corresponding PCT Application No. PCT/US2007/061573 dated Aug. 26, 2008.
International search report and written opinion dated Mar. 24, 2011 for PCT Application No. US2010/58227.
International search report and written opinion dated Jun. 9, 2011 for PCT Application No. US2011/30973.
International search report and written opinion dated Sep. 1, 2010 for PCT Application No. US2010/040490.
International search report dated Sep. 1, 2010 for PCT/US2010/040490.
International search report dated Oct. 6, 2010 for PCT Application No. US10/37545.
International search report dated Apr. 5, 2001 for PCT Application No. CA2000/01421.
International search report dated May 14, 2010 for PCT Application No. US2009/06640.
International search report dated Jul. 11, 2008 for PCT Application No. US07/61573.
International search report dated Jul. 30, 2010 for PCT Application No. US2010/36464.
International search report dated Aug. 18, 2009 for PCT Application No. US09/00419.
International search report dated Aug. 23, 2006 for PCT Application No. US2005/033347.
International search report dated Aug. 26, 2004 PCT Application No. US2003/41466.

(56) References Cited

OTHER PUBLICATIONS

International search report dated Sep. 25, 2007 for PCT Application No. US2007/02721.
International Search Report for PCT/US2005/033347.
Jacobson, et al. Electrokinetic Focusing in Microfabricated Channel Structures. Anal. Chem., 1997, 69 (16), pp. 3212-3217.
Japanese Office Action dated Dec. 21, 2010 for Application No. JP2001-540363 (in Japanese with English translation).
Japanese Office Action dated Apr. 27, 2010 for Application No. JP2001-540363 (in Japanese with English translation).
Ju, et al. Fluorescence energy transfer dye-labeled primers for DNA sequencing and analysis. Proc. Natl. Acad. Sci. USA. 1995;92:4347-4351.
Kan, et al. A novel thermogelling matrix for microchannel DNA sequencing based on poly-N-alkoxyalkylaclylamide copolymers. Electrophoresis. 2003;24(24):4161-4169.
Koh, et al. Integrating Polymerase Chain Reaction, Valving, and Electrophoresis in a Plastic Device for Bacterial Detection. Analytical Chemistry. 2003;75(17):4591-4598.
Kopp, et al. Chemical Amplification Continuous-Flow PCR on a Chip. Science. 1998;280:1046-1048.
Lagally, et al. Fully integrated PCR-capillary electrophoresis microsystem for DNA analysis. Lab on a Chip. 2001;1(2):102-107.
Lagally, et al. Integrated Portable Genetic Analysis Microsystem for Pathogen/Infectious Disease Detection. Analytical Chemistry. 2004;76:3162-3170.
Lagally, et al. Monolithic integrated microfluidic DNA amplification and capillary electrophoresis analysis system. Sensors and Actuators. 2000;B63(3):138-146.
Lagally, et al. Single-Molecule DNA Amplification and Analysis in an Integrated Microfluidic Device. Analytical Chemistry. 2001;73(3): 565-570.
Lazar, et al. Subattomole-Sensitivity Microchip Nanoelectrospray Source with Time-of-Flight Mass Spectrometry Detection. Analytical Chemistry. 1999;71(17):3627-3631.
Li, et al. Integration of Microfabricated Devices to Capillary Electrophoresis—Electrospray Mass Spectrometry Using a Low Dead Volume Connection: Application to Rapid Analyses of Proteolytic Digests. Analytical Chemistry. 1999;71(15):3036-3045.
Li, et al. Rapid and sensitive separation of trace level protein digests using microfabricated devices coupled to a quadrupole—time-of-flight mass spectrometer. Electrophoresis. 2000;21:198-210.
Li, et al. Separation and Identification of Peptides from Gel-Isolated Membrane Proteins Using a Microfabricated Device for Combined Capillary Electrophoresis/Nanoelectrospray Mass Spectrometry. Analytical Chemistry. 2000;72(3):599-609.
Licklider, et al. A Micromachined Chip-Based Electrospray Source for Mass Spectrometry. Analytical Chemistry. 2000;72(2):367-375.
Lisec, et al. A bistable pneumatic microswitch for driving fluidic components. Sensors and Actuators. 1996;A54:746-749.
Liu, et al. Automated parallel DNA sequencing on multiple channel microchips. Proc. Natl. Acad. Sci. USA. 2000;97(10):5369-5374.
Liu, et al. Optimization of High-Speed DNA Sequencing on Microfabricated Capillary Electrophoresis Channels. Analytical Chemistry. 1999;71:566-573.
Margulies, et al. Genome sequencing in microfabricated high-density picolitre reactors. Nature. 2005;437(7057):376-80.
Melin, et al. A Passive 2-Dimensional Liquid Sample Micromixer. 7th International Conference on Miniaturized Chemical and Biochemical Analysis Systems. 2003;167-170.
MillGat pump user manual, version 2.12, published 2005, pp. 1-28.
Mitra, et al. Digital genotyping and haplotyping with polymerase colonies. Proc Natl Acad Sci USA. 2003.100(10):15926-5931.
Norris, et al. Fully-integrated, multiplexed STR-based human identification using a single microfluidic chip and automated instrument. Available at http://www.promega.com/geneticidproc/ussymp2Oproc/oralpresentations/landersbienvenue.pdf. Accessed Jun. 2, 2010.
Notice of allowance dated Jun. 9, 2011 for U.S. Appl. No. 12/831,949.

Obeid, et al. Microfabricated Device for DNA and RNA mplification by Continuous-Flow Polymerase Chain Reaction and Reverse Transcription-Polymerase Chain Reaction with Cycle Number Selection. Analytical Chemistry. 2003;75(2): 288-295.
Ocvirk, et al. High Performance Liquid Chromatography Partially Integrated onto a Silicon Chip. Analytical Methods and Instrumentation. 1995;2:74-82.
Ocvirk, et al. Optimization of confocal epifluorescence microscopy for microchip-based miniaturized total analysis systems. The Analyst. 1998;123:1429-1434.
Office Action Final dated Feb. 19, 2008 issued in U.S. Appl. No. 10/540,658.
Office Action Final dated Feb. 6, 2008 issued in U.S. Appl. No. 11/139,018.
Office Action mailed Apr. 27, 2007 in U.S. Appl. No. 11/139,018, filed May 25, 2005.
Office Action mailed Jul. 2, 2007 in U.S. Appl. No. 10/540,658, filed Jun. 23, 2005.
Office Action mailed Jul. 12, 2007 in U.S. Appl. No. 10/750,533, filed Dec. 29, 2003.
Ohori, et al. Partly disposable three-way mirovalve for a medical micro total analysis system (muTAS). Sensors and Actuators. 1998;A64(1): 57-62.
Oleschuk, et al. Trapping of Bead-Based Reagents within Microfluidic Systems: On-Chip Solid-Phase Extraction and Electrochroniatography. Analytical Chemistry. 2000;72:585-590.
Olsen, et al. Immobilization of DNA Hydrogel Plugs in Microfluidic Channels. Analytical Chemistry. 2002;74:1436-1441.
Paegel, et al. High-throughput DNA sequencing with a 96-lane capillary array electrophoresis bioprocessor. Proc Natl Acad Sci USA. 2002;99:574-579.
Paegel, et al. Microchip Bioprocessor for Integrated Nanovolume Sample Purification and DNA Sequencing. Analytical Chemistry. 2002;74(19):5092-5098.
Paegel, et al. Microfluidic devices for DNA sequencing: sample preparation and electrophoretic analysis. Current Opinion in Biotechnology. 2003;14(1):42-50.
Paegel, et al. Turn Geometry for Minimizing Band Broadening in Microfabricated Capillary Electrophoresis Channels Analytical Chemistry. 2000;72:3030-3037.
PCT Notification of Transmittal of the International Search Report and The Written Opinion of the International Searching Authority, or the Declaration, mailed Jun. 17, 2008, Application No. PCT/US2007/082568.
Peterson, et al. Enzymatic Microreactor-on-a-Chip: Protein Mapping Using Trypsin Immobilized on Porous Polymer Monoliths Molded in Channels of Microfluidic Devices. Analytical Chemistry. 2002;74:4081-4088.
Ramsey, et al. Generating Electrospray from Microchip Devices Using Electroosmotic Pumping. Analytical Chemistry. 1997;69(6):1174-1178.
Rohr, et al. Porous polymer monoliths: Simple and efficient mixers prepared by direct polymerization in the channels of microfluidic chips. Electrophoresis. 2001;22:3959-3967.
Rye, et al. High-sensitivity two-color detection of double-stranded DNA with a confocal fluorescence gel scanner using ethidium homodimer and thiazole orange. Nucleic Acids Research. 1991;19(2):327-333.
Scherer, et al. High-Pressure Gel Loader for Capillary Array Electrophoresis Microchannel Plates. Biotechniques. 2001;31(5):1150-1154.
Schomburg, et al. Design Optimization of Bistable Microdiaphragm Valves. Sensors and Actuators. 1998;A64:259-264.
Seifar, et al. Capillary electrochromatography with 1.8-mum ODS-modified porous silica particles. Journal of Chromatography. 1998; A808:71-77.
Simpson, et al. High-throughput genetic analysis using microfabricated 96-sample capillary array electrophoresis microplates. Proc Natl Acad Sci USA. 1998;95:2256-2261.
Simpson, et al. Microfabrication Technology for the Production of Capillary Array Electrophoresis Chips. Biomedical Microdevices. 1998;1:7-26.

(56) References Cited

OTHER PUBLICATIONS

Soper, et al. Sanger DNA Sequencing Reactions Performed in a Solid-Phase Nanoreactor Directly Coupled to Capillary Gel Electrophoresis. Analytical Chemistry. 1998;70:4036-4043.

Spiering, et al. Novel microstructures and technologies applied in chemical analysis techniques. 1997 International Conference on Solid-State Sensors and Actuators. 1997;1:511-514.

Takao, et al. A Pneumatically Actuated Full In-Channel Microvalve With MOSFET-Like Function in Fluid Channel Networks. Journal of Microelectromechanical Systems. 2002;11(5):421-426.

Takao, et al. Microfluidic Integrated Circuits for Signal Processing Using Analogous Relationship Betweeen Pneumatic Microvalve and MOSFET. Journal of Microelectromechanical Systems. 2003;12(4):497-505.

Thomas, et al. Application of Genomics to Toxicology Research. Environmental Health Perspectives. 2002;110(6):919-923.

Thorsen, et al. Microfluidic Large-Scale Integration. Science. 2002;298(5593):580-584.

Tice, et al. Formation of Droplets and Mixing in Multiphase Microfluidics at Low Values of the Reynolds and the Capillary Numbers. Langmuir. 2003;19:9127-9133.

Unger, et al. Monolithic Microfabricated Valves and Pumps by Multilayer Soft Lithography. Science. 2000;288:113-116.

Van Der Moolen, et al. A Micromachined Injection Device for CZE: Application to Correlation CZE. Analytical Chemistry. 1997;69(20):4220-4225.

Van Der Moolen, et al. Correlation Capillary Zone Electrophoresis, a Novel Technique to Decrease Detection Limits. Chromatographia. 1995;40(7/8):368-374.

Vazquez, et al. Electrophoretic Injection within Microdevices. Analytical Chemistry. 2002;74:1952-1961.

Veenstra, et al. The design of an in-plane compliance structure for microfluidical systems. Sensors and Actuators. 2002;B81:377-383.

Waller, et al. Quantitative Immunocapture PCR Assay for Detection of Campylobacter jejuni in Foods. Applied Environmental Microbiology. 2000; 66(9):4115-4118.

Weimer, et al. Solid-Phase Capture of Proteins, Spores, and Bacteria. Applied Environmental Microbiology. 2001;67(3):1300-1307.

Wen, et al. Microfabricated isoelectric focusing device for direct electrospray ionization-mass spectrometry. Electrophoresis. 2000;21:191-197.

Wikipedia brochure for defining stocahstic process. Sep. 2, 2009.

Williams, et al. Amplification of complex gene libraries by emulsion PCR. Nature Methods. 2006;3(7):545-50.

Woolley, et al. Functional Integration of PCR Amplification and Capillary Electrophoresis in a Microfabricated DNA Analysis Device. Analytical Chemistry. 1996;68(23):4081-4086.

Wright, et al. Behavior and Use of Nonaqueous Media without Supporting Electrolyte in Capillary Electrophoresis and Capillary Electrochromatography. Analytical Chemistry. 1997;69(16):3251-3259.

Xiang, et al. An Integrated Microfabricated Device for Dual Microdialysis and On-Line ESI-Ion Trap Mass Spectrometry for Analysis of Complex Biological Samples. Analytical Chemistry. 1999;71(8):1485-1490.

Xue, et al. Integrated Multichannel Microchip Electrospray Ionization Mass Spectrometry: Analysis of Peptides from On-Chip Tryptic Digestion of Melittin. Rapid Communications in Mass Spectrometry. 1997;11:1253-1256.

Xue, et al. Multichannel Microchip Electrospray Mass Spectrometry. Analytical Chemistry. 1997;69(3):426-430.

Yang, et al. A MEMS thermopneumatic silicone rubber membrane valve. Sensors and Actuators. 1998;A64(1):101-108.

Yu, et al. Preparation of Monolithic Polymers with Controlled Porous Properties for Microfluidic Chip Applications Using Photoinitiated Free Radial Polymerization. Journal of Polymer Science. 2002;40:755-769.

Yu, et al. Towards stationary phases for chromatography on a microchip: Molded porous polymer monoliths prepared in capillaries by photoinitiated in situ polymerization as separation media for electrochromatography. Electrophoresis. 2000;21:120-127.

Zhang, et al. A Microdevice with Integrated Liquid Junction for Facile Peptide and Protein Analysis by Capillary Electrophoresis/Electrospray Mass Spectrometry. Analytical Chemistry. 2000;72(5):1015-1022.

Zhang, et al. Microfabricated Devices for Capillary Electrophoresis-Electrospray Mass Spectrometry. Analytical Chemistry. 1999;71(15):3258-3264.

U.S. Appl. No. 90/011,453, filed Jan. 21, 2011, Mathias et al.

European search report and search opinion dated Aug. 17, 2011 for Application No. 08799648.4.

Notice of allowance dated Sep. 8, 2011 for U.S. Appl. No. 12/820,390.

* cited by examiner

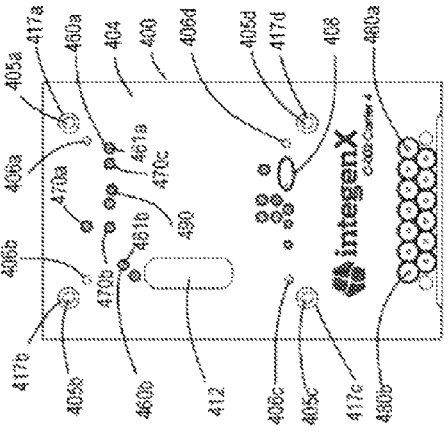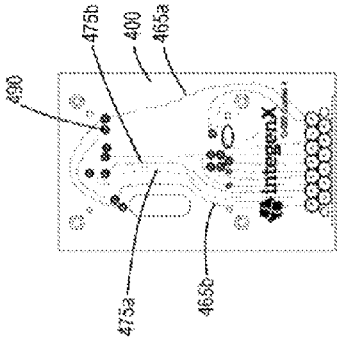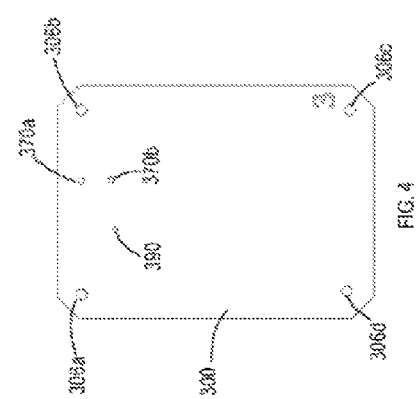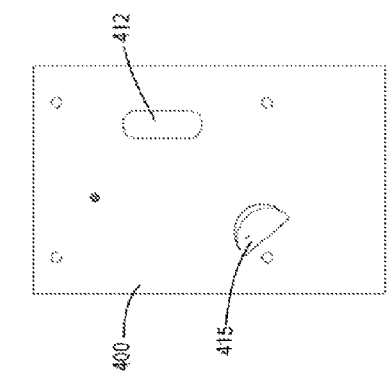

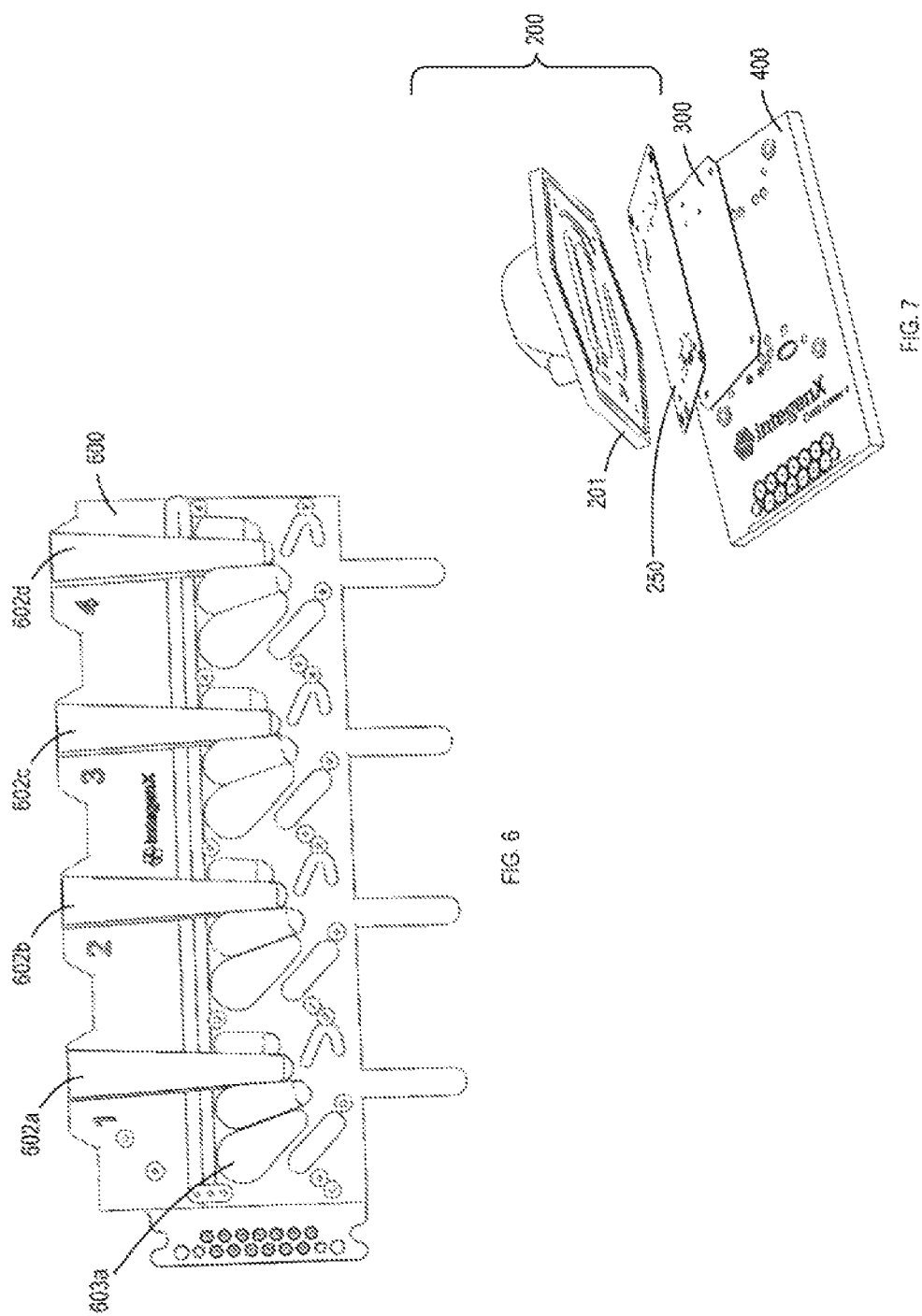

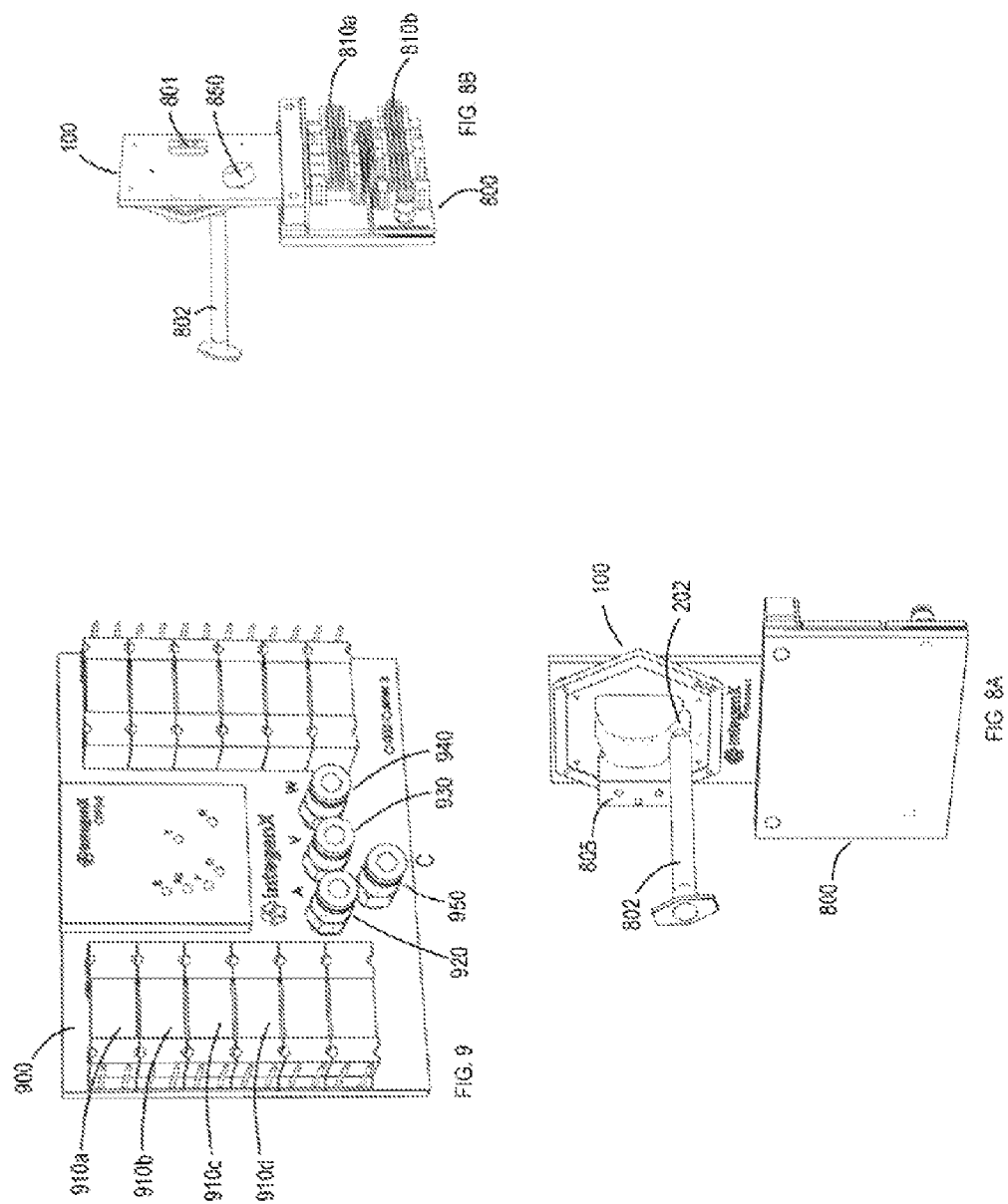

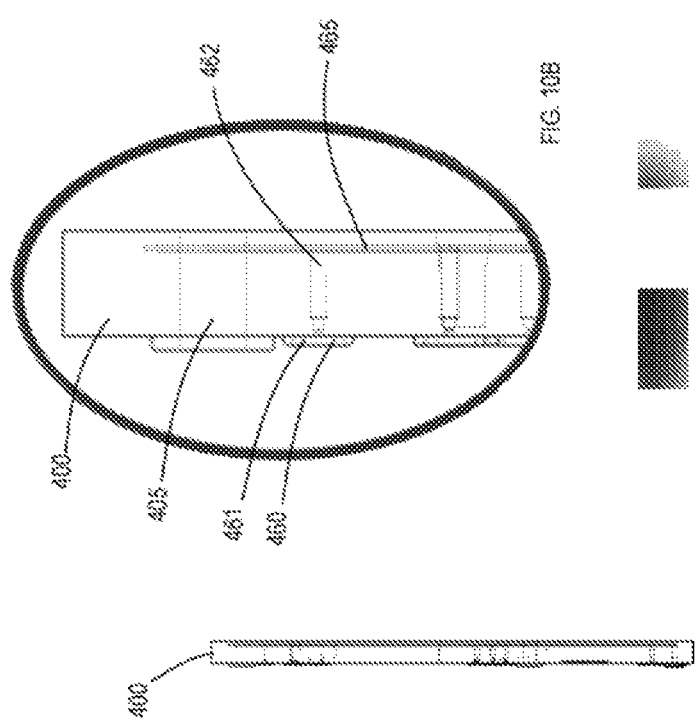

US 8,763,642 B2

MICROFLUIDIC DEVICES WITH MECHANICALLY-SEALED DIAPHRAGM VALVES

CROSS-REFERENCE

This application claims priority to U.S. Provisional Patent Application No. 61/375,791 to Vangbo, filed on Aug. 20, 2010, which is entirely incorporated herein by reference.

STATEMENT AS TO FEDERALLY SPONSORED RESEARCH

This invention was made with Government support under Contract No. W911SR-06-C-0018 awarded by the Department of Defense. The Government has certain rights in the invention.

BACKGROUND OF THE INVENTION

Mathies et al. (U.S. Patent Publication 2004-0209354, Oct. 21, 2004) describes a microfluidic structure comprising: a first surface including a pneumatic channel; a second surface including a fluidic channel; and an elastomer membrane located between the first and second surfaces such that the application of a pressure or a vacuum to the pneumatic channel causes the membrane to deflect to modulate a flow of a fluid in the fluidic channel. Fluid flow in a fluidic conduit of such devices can be regulated by a diaphragm valve in the conduit that comprises a valve seat on which the elastomer membrane sits. When in contact with the seat, the elastomer membrane blocks fluid flow across a fluidic conduit. When out of contact with the seat, a passage exists that allows fluid communication across the valve. Mathies et al. indicates that the device can have surfaces of glass plastic or polymer.

Anderson et al. (Nucleic Acids Res. 2000 June 15:28(12): E60) describes a plastic device held together using ultrasonic welding or adhesives.

Jovanovich et al. (U.S. Patent Publication 2005/0161669, Jul. 28, 2005) describes reducing macroscale sample solutions to microscale volumes, for example by concentrating milliliters to microliters or smaller volumes for introduction into one or more microfluidic devices. The document describes embodiments capable of acting as modular scale interfaces, permitting microscale and/or nanoscale devices to be integrated into fluidic systems that comprise operational modules that operate at larger scale.

Jovanovich et al. (WO 2008/115626, Sep. 25, 2008) describes microfluidic chips made from plastic components. The document also describes integration of macroscale devices such as automation and robotics with nanoscale sample preparation and analysis.

SUMMARY OF THE INVENTION

An aspect of the invention provides fluidic devices. In an aspect of the invention, a microfluidic device comprises one or more pneumatically-actuated valves operably coupled to an actuator, wherein each of the pneumatically-actuated valves is operable for at least about 90% of actuations performed on the valve by the actuator.

In another aspect of the invention, a microfluidic device comprises one or more pneumatically-actuated valves operably coupled to an actuator, wherein an individual valve of the pneumatically-actuated valves is movable from a first position to a second position with the aid of actuation, and wherein following termination of actuation the individual valve remains in the second position less than about 10% of actuation times.

In another aspect of the invention, a microfluidic device comprises one or more pneumatically-actuated valves operably coupled to an actuator, the one or more pneumatically actuated valves having a via layer and an elastic layer adjacent the actuator, wherein the elastic layer is movable from a first position to a second position with the aid of actuation from the actuator, and wherein the elastic layer has a failure rate less than about 10%.

In another aspect of the invention, a microfluidic lot of microfluidic devices comprises at least 10, 100 or 500 microfluidic cartridges, an individual cartridge of the microfluidic cartridges comprising one or more pneumatically actuated valves, an individual valve of the pneumatically actuated valves operably coupled to an actuator, wherein the microfluidic lot has a failure rate of at least about 10% per 100 consecutive actuations.

In another aspect of the invention, a device comprises at least one diaphragm valve comprised in a combination that comprises a fluidics layer, an actuation layer and an elastic layer sandwiched between the fluidics layer and the actuation layer, wherein the diaphragm in each diaphragm valve is comprised in the elastic layer and is mechanically (e.g., pressure) sealed against the fluidics layer and against the actuation layer by a raised sealing ring in the actuation layer. In one embodiment the at least one diaphragm valve is a plurality of diaphragm valves. In another embodiment each diaphragm valve comprises: a) a valve seat against which the diaphragm is configured to sit; b) a valve relief defined at least in part by the sealing ring, into which the diaphragm is configured to be deflected thereby defining a valve chamber; c) a valve inlet and a valve outlet comprised in the fluidics layer and in fluid communication with the valve chamber; and wherein the diaphragm is configured to be actuated by positive or negative pressure transmitted through an actuation conduit in the actuation layer that communicates with the valve relief. In another embodiment the fluidics layer comprises a via layer and a fluidics manifold, wherein the via layer has a first face mated with the elastic layer and a second face mated with a fluidics manifold, wherein the valve inlet and valve outlet of each diaphragm valve are configured as vias through the via layer and each via is in fluidic communication with a microfluidic channel in the fluidics layer; and wherein the fluidics manifold comprises at least one compartment sealed by the second face of the via layer, wherein at least one macrofluidic chamber is in fluid communication with a microfluidic channel communicating with a via. In another embodiment the microfluidic channel is disposed in the second face of the via layer. In another embodiment the microfluidic channel is disposed in the fluidics manifold. In another embodiment the fluidics manifold comprises a conduit in communication with at least one of the macrofluidic compartments and with a microfluidic channel in the second face of the via layer or with a via. In another embodiment the via layer is adhered to the fluidics manifold with an adhesive. In another embodiment the via layer is comprised of a flexible material. In another embodiment the via layer has a thickness of no more than 0.5 mm. In another embodiment the fluidics manifold comprises a second compartment that opens toward the via layer and the via layer comprises an aperture exposing the second compartment to the elastic layer. In another embodiment the fluidics manifold and/or the actuation layer comprises a polymer selected from poly(acrylonitrile butadiene styrene) ("ABS"), acrylic, acetal, rubber, nylon, polycarbonate, polyether, polyester, polyurethane, polypropylene, polyolefin, cycloolefin, and co-polymers or filled versions thereof. In another embodiment the fluidics manifold and/or the actuation layer are comprised of a rigid material. In another embodiment the compartment is a macrofluidic compartment. In another embodiment the compartment has a volume between 10 microliters and 20 milliliters. In another embodiment the elastic layer comprises a urethane, a nitrile, a latex or silicone (e.g., polydimethylsiloxane, also "PDMS" herein). In another embodiment at least one actuation conduit is configured to transmit positive or negative pressure to a plurality of diaphragm valves. In another embodiment at least one actuation conduit is configured to transmit positive or negative pressure to a fluidic conduit. In another embodiment at least one actuation conduit traverses the actuation layer from a first face to a second face, the second face opposing the first face. In another embodiment the actuation layer comprises an aperture configured to transmit heat to a chamber in the fluidics layer. In another embodiment a mechanical fastener configured to fasten the combination into a sandwich transmits pressure to the pressure seal. In another embodiment the mechanical fastener is selected from a screw, a clip, a snap, a staple, a rivet, a band and a pin. In another embodiment the fluidics manifold, the via layer and the actuation layer comprise guide holes configured to receive a mechanical fastener that is configured to hold the layers of the device together and apply a sealing pressure from the pressure rings against the elastic layer. In another embodiment the actuation layer comprises raised standoffs that set a distance between a surface of the actuation layer and the elastic layer in an assembled device.

In another aspect this invention provides a system comprising: a) a device comprising at least one diaphragm valve comprised in a combination that comprises a fluidics layer, an actuation layer and an elastic layer sandwiched between the fluidics layer and the actuation layer, wherein the diaphragm in each diaphragm valve is comprised in the elastic layer and is mechanically sealed against the fluidics layer and against the actuation layer by a raised sealing ring in the actuation layer; wherein each diaphragm valve comprises: i) a valve seat against which the diaphragm is configured to sit; ii) a valve relief defined at least in part by the sealing ring, into which the diaphragm is configured to be deflected thereby defining a valve chamber; iii) a valve inlet and a valve outlet comprised in the fluidics layer and in fluid communication with the valve chamber; and wherein the diaphragm is configured to be actuated by positive or negative pressure transmitted through an actuation conduit in the actuation layer that communicates with the valve relief; b) a source of positive and/or negative pressure in communication with the actuation conduits and c) a control unit comprising logic to open and/or close valves in a programmed sequence. In one embodiment the system further comprises: d) a magnet assembly configured to deliver a regulatable magnetic field to a chamber in the fluidic manifold. In another embodiment the system further comprises d) a thermal control assembly configured to regulate temperature in a chamber in the fluidic manifold.

Another aspect of the invention provides a fluidics device comprising at least one diaphragm valve, said at least one diaphragm valve comprising a via layer and an actuation layer separated by an elastic layer, said via layer having a first via adjacent a second via, said first via separated from said second via by a first width, said actuation layer having a raised sealing member in contact with said elastic layer, said sealing member having a second width that is greater than said first width.

Another aspect of the invention provides a fluidics device comprising at least one diaphragm valve, said at least one diaphragm valve comprising a via layer and an actuation layer separated by an elastic layer, the via layer having a first via adjacent a second via, the actuation layer having a raised sealing member for bringing at least a portion of the elastic layer in contact with the via layer, the sealing member having a dimension (D1) that is greater than a center-to-center dimension (D2) of the first via and second via.

Another aspect of the invention provides a fluidics device having one or more pneumatically actuated valves, an individual valve of said one or more pneumatically actuated valves having a fluidics layer that is independent of an actuation layer of said individual valve, wherein said individual valve leaks upon at most 1 actuation out of 100 actuations of said actuation layer. In an embodiment, the individual valve leaks upon at most 1 actuation out of 1000 actuations. In another embodiment, the individual valve leaks upon at most 1 actuation out of 10,000 actuations. In another embodiment, the individual valve leaks upon at most 1 actuation out of 100,000 actuations.

Another aspect of the invention provides a fluidics device comprising at least one diaphragm valve, said at least one diaphragm valve comprising a fluidics layer having a fluidics manifold adjacent a via layer, wherein the fluidics manifold comprises one or more macrofluidics chambers or channels, wherein the via layer comprises one or more microfluidic chambers or channels in fluid communication with said one or more macrofluidics chambers or channels. In an embodiment, the via layer comprises one or more vias extending from a first surface adjacent the fluidics manifold to a second surface opposite from the first surface.

In another aspect this invention provides a method comprising: a) providing a device comprising at least one diaphragm valve comprised in a combination that comprises a fluidics layer, an actuation layer and an elastic layer sandwiched between the fluidics layer and the actuation layer, wherein the diaphragm in each diaphragm valve is comprised in the elastic layer and is mechanically sealed against the fluidics layer and against the actuation layer by a raised sealing ring in the actuation layer; and further comprising two compartments in the fluidics manifold fluidically connected to each other through one of the diaphragm valves; b) opening the diaphragm valve; and c) moving liquid through the valve from one compartment to another.

In another aspect this invention provides a method comprising: a) providing a system of this invention that comprises a magnet assembly configured to deliver a regulatable magnetic field to a chamber in the fluidic manifold; b) moving magnetically responsive particles into the compartment; and c) capturing the particles in the compartment using the magnetic force.

Another aspect of the invention provides methods for regulating fluid flow. In an embodiment, a method for regulating the flow of fluid comprises providing a microfluidic device comprising one or more pneumatically-actuated valves operably coupled to an actuator, wherein an individual valve of the pneumatically-actuated valves is movable from a first position to a second position with the aid of actuation; and actuating the individual valve. Following termination of actuation, the individual valve remains in the second position less than about 10% of actuation times.

In another embodiment, a method for regulating the flow of fluid comprises providing a microfluidic device, comprising one or more pneumatically-actuated valves operably coupled to an actuator, the one or more pneumatically actuated valves having a via layer and an elastic layer adjacent the actuator, wherein the elastic layer is movable from a first position to a second position with the aid of actuation from the actuator;

and actuating, with the aid of the actuator, the elastic layer. The elastic layer has a failure rate less than about 10%.

In another aspect of the invention, a method for manufacturing a fluidics device comprises a) providing a via layer, an actuation layer and an elastic layer disposed between the via layer and the actuation layer, said actuation layer having a raised sealing member adjacent the elastic layer, said via layer having one or more vias and in some cases one or more fluid channels (also "channels" herein) in fluid communication with at least some of said one or more vias; and b) mechanically sealing the via layer, actuation layer and the elastic layer against one another to form the fluidics device. In an embodiment, the via layer, actuation layer and the elastic layer are mechanically sealed within a time period of 30 minutes or less to yield the fluidics device configured to flow a fluid through the one or more vias at a flow rate of at least about 50 nanoliters (nL)/second. In another embodiment, the via layer, actuation layer and the elastic layer are mechanically sealed within a time period of 10 minutes or less to yield the fluidics device configured to flow a fluid through the one or more vias at a flow rate of at least about 50 nL/s. In another embodiment, the via layer, actuation layer and the elastic layer are mechanically sealed within a time period of 1 minute or less to yield the fluidics device configured to flow a fluid through the one or more vias at a flow rate of at least about 50 nL/s.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2A shows a mating face. FIG. 2B shows a side view. FIG. 2C shows an external side.

FIG. 3A shows a first surface. FIG. 3B shows a side view. FIG. 3C shows a second surface.

FIG. 4 shows an example of an elastic layer.

FIG. 5 shows an example of an actuation layer. FIG. 5A shows a mating face. FIG. 5B shows a mating surface with internal conduits visible. FIG. 5C shows an external side.

FIG. 6 shows an example of a fluidic device that can be oriented vertically so that macrofluidic sample wells can hold liquids.

FIG. 7 shows a clamshell view of the device of FIG. 1.

FIGS. 8A and 8B show two sides of an actuation manifold engaged with a device of this invention.

FIG. 9 shows an example of a device in which the actuation layer and actuation manifold have been integrated into one unit.

FIG. 10A shows a cross-section of an actuation layer, revealing actuation conduits communicating with a mating surface of the layer. FIG. 10B shows a magnified portion of the cross-section.

DETAILED DESCRIPTION OF THE INVENTION

1. Introduction

Figure 1:
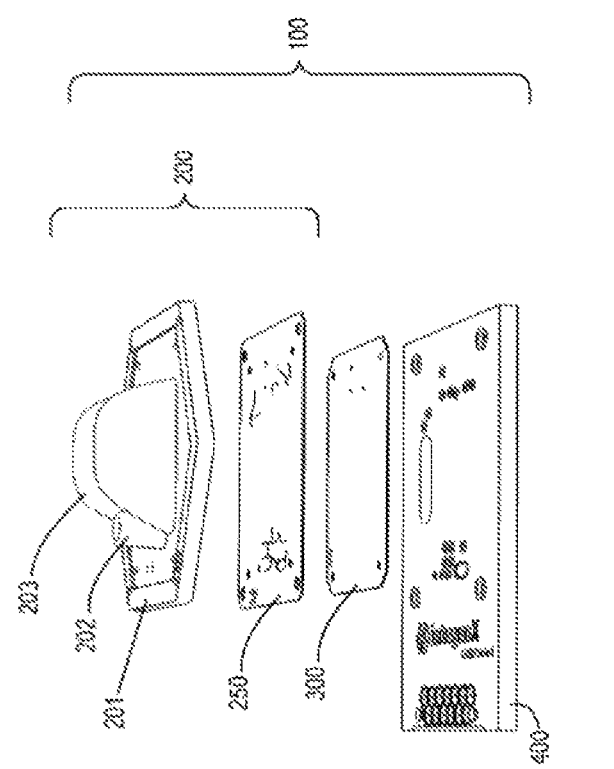
FIG. 1 shows an exploded view of a fluidic device of this invention.
Figure 2:
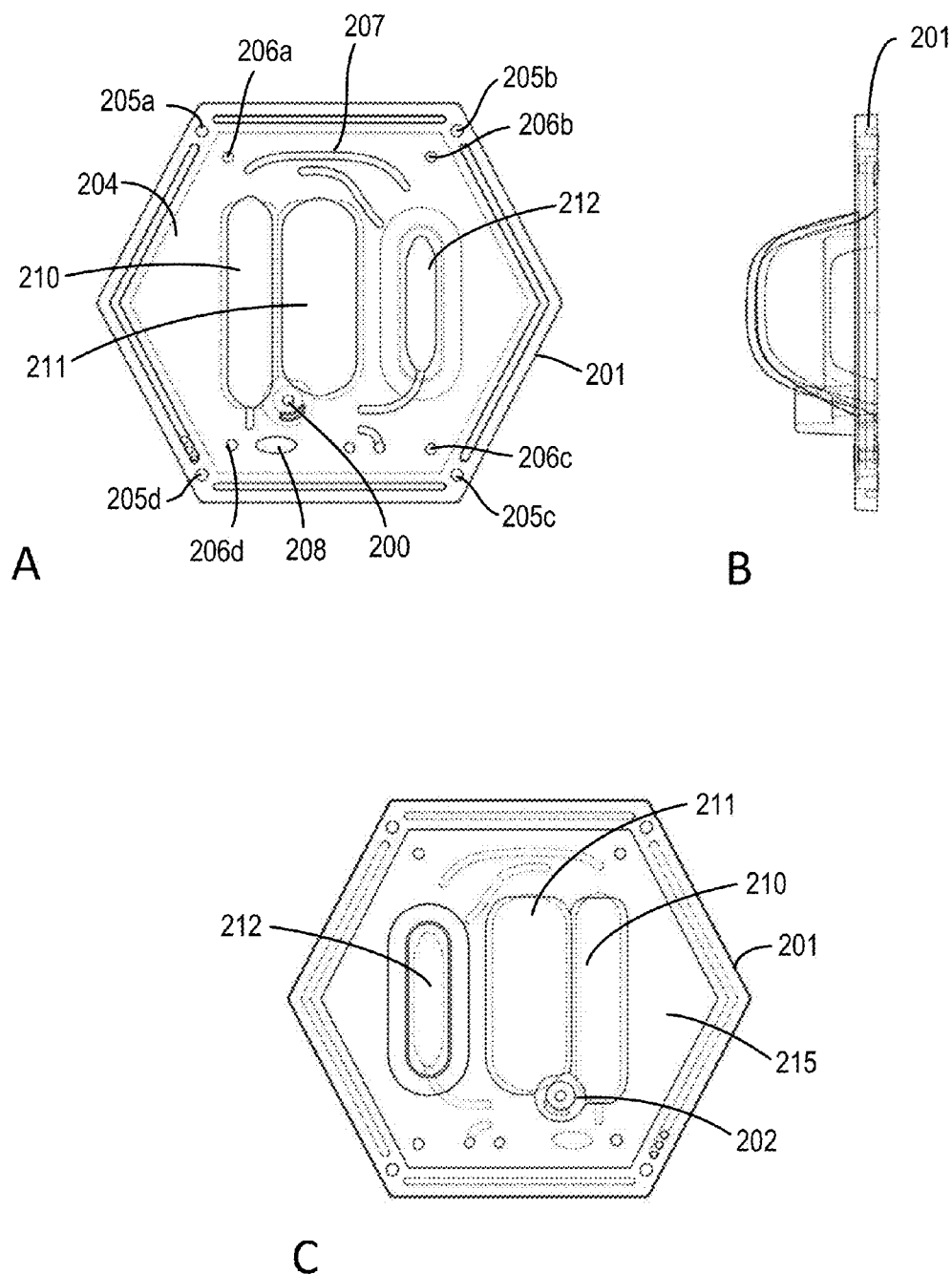
FIG. 2 shows an example of a fluidics manifold.

Unless defined otherwise, all technical and scientific terms used herein have the same meaning as commonly understood by one of ordinary skill in the art to which the invention pertains. Although many methods and materials similar, modified, or equivalent to those described herein can be used in the practice of the present invention without undue experimentation, the preferred materials and methods are described herein. In describing and claiming the present invention, the following terminology will be used in accordance with the definitions set out below.

The term "mesoscale," as used herein, refers to a dimension greater than or equal to $1 \times 10^{-3}$ m. Mesoscale channels can have, e.g., a diameter, width and/or thickness in the mesoscale range.

The term "microscale," as used herein, refers to a dimension greater than or equal to $1 \times 10^{-6}$ m (micrometer) and less than $1 \times 10^{-3}$ m. Microchannels can have, e.g., a diameter, width and/or thickness in the microscale range.

The term "nanoscale," as used herein, refers to a dimension less than $1 \times 10^{-6}$ m. Nanoscale channels can have, e.g., a diameter, width and/or thickness in the nanoscale range.

The term "via," as used herein, refers to an orifice or channel extending through at least a portion of a device layer. A via in some cases extends from a first surface of a device layer to a second surface of the device layer, the second surface opposite from the first surface.

A diaphragm valve uses a diaphragm to open or close a fluidic path between fluidic conduits. A diaphragm valve typically comprises a valve body having a valve inlet and a valve outlet that communicate with the fluidic conduits entering and exiting the valve. The diaphragm valve closes when the diaphragm sits against a valve seat, thereby preventing fluid flow between the valve inlet and the valve outlet. When the diaphragm is off the valve seat, it creates a fluidic chamber or passage through which fluid may flow. A fluidic conduit is then in fluid communication with the valve chamber through the valve ports. The valve may be configured so that under ambient conditions (i.e., no external application of positive or negative pressure) the diaphragm naturally sits on the valve seat, thus closing the valve, and is deformed away from the seat to open the valve by application of positive or negative pressure relative to ambient (a so-called "normally closed" valve). The valve also may be configured so that under ambient conditions (i.e., no external application of positive or negative pressure) the diaphragm naturally does not sit on the seat and is deformed toward the seat to close the valve by application of positive or negative pressure relative to ambient (a so-called "normally open" valve). In this case, application of positive pressure to the elastic layer from the actuation conduit will push the elastic layer onto the valve seat, closing the valve. Thus, the diaphragm is in operative proximity to the valve seat and configured to be actuatable to contact the valve seat or to be out of contact with the valve seat.

This invention provides fluidic devices, e.g., microfluidic devices, having at least one and, typically, a plurality of fluidic paths, e.g., microfluidic paths, in which fluid flow along a fluidic path is regulated by one or more diaphragm valves. In some situations, devices are provided having three functional layers: a fluidics layer, an actuation layer and an elastic layer (i.e., a layer formed of an elastic material, such as an elastomer) sandwiched between them. The fluidics layer comprises at least one and, typically, a plurality of fluidic conduits through which fluid flows. The elastic layer sandwiched between the fluidics layer and the actuation layer is configured to provide diaphragms for the diaphragm valves. The actuation layer comprises at least one and, typically, a plurality of actuation conduits that actuate the elastic diaphragms. The layers typically have effacing surfaces on which many diaphragm valves can be introduced. Typically, the elastic layer is formed of a flat sheet, e.g., a sheet that is not sculpted. In some embodiments, the functional layers of the fluidic devices are held together by a mechanical seal, such as a pressure seal. In an example, the mechanical seal is a screw. In another example, the mechanical seal is a clamp. In another example, the mechanical seal is an adhesive.

In some embodiments, valves are formed by functional elements in three parts. A valve inlet and a valve outlet comprise openings on the surface of the fluidics layer facing the elastic layer. The valve inlet and valve outlet communicate with fluidic conduits in the fluidics layer to form a fluidic path. The portion of the surface of the fluidics layer between the valve inlet in the valve outlet interrupts a fluidic conduit and can function as a valve seat. The elastic layer functions as a diaphragm. When it contacts the fluidics layer, the diaphragm sits on the valve seat, closing the valve. The actuation layer comprises raised rings or ridges. When facing the fluidics layer, these raised rings are configured to surround a valve inlet and a valve outlet. Because the rings are raised against the surface of the actuation layer, they define a valve relief into which the diaphragm can be deflected. Actuation conduits communicate with the valve relief thereby providing a path through which positive or negative pressure can be transmitted to deflect the diaphragm toward or away from the valve seat.

Figure 11:
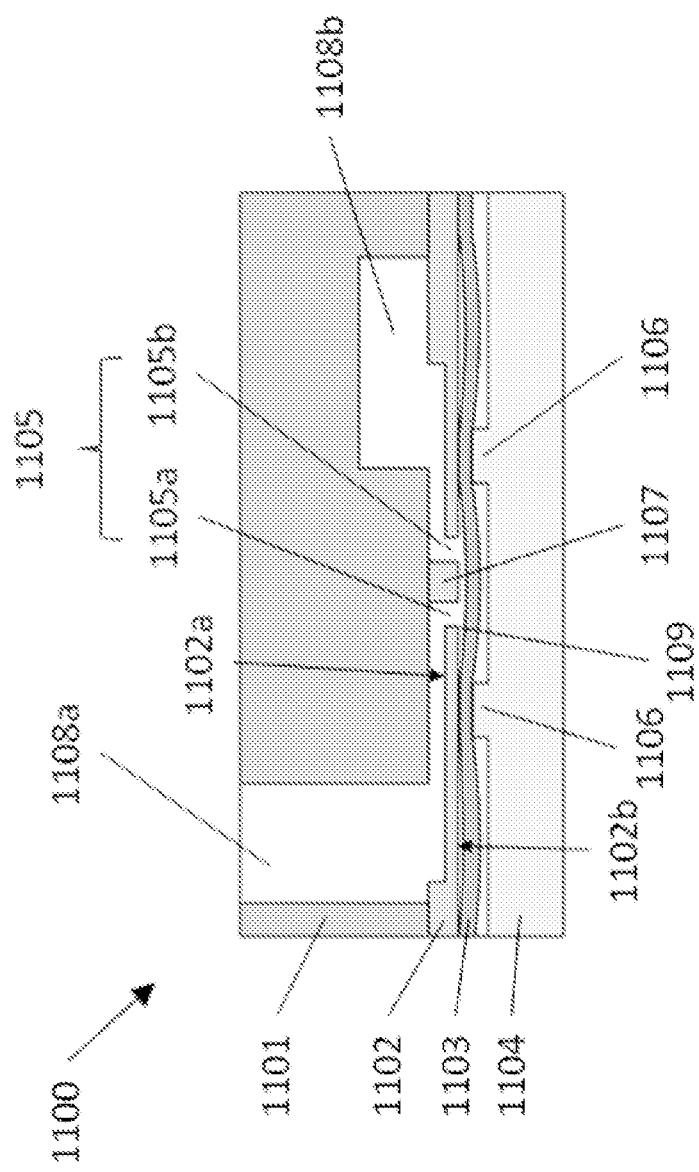
FIG. 11 shows a valve, in accordance with an embodiment of the invention.

FIG. 11 shows a valve 1100, in accordance with an embodiment of the invention. The valve 1100 includes a fluidics manifold 1101, a via layer 1102 adjacent the fluidics manifold 1101, an elastic layer 1103 adjacent the via layer 1102, and an actuation layer 1104 adjacent the elastic layer 1103. The via layer 1102 has a first surface 1102a and a second surface 1102b. The via layer 1102 includes one or more vias. In the illustrated example, the via layer 1102 includes vias 1105, which are openings through the via layer 1102. The vias 1105 include a first via 1105a and a second via 1105b. The first via 1105a and the second via 1105b each traverse the via layer, extending from the first surface 1102a to the second surface 1102b. The actuation layer 1104 includes ridges 1106 that are configured to hold portions of the elastic layer 1103 against the second surface 1102b of the via layer 1102. In some cases, the ridges 106 are part of a ring-like or other symmetrical structure. The fluidics manifold 1101 includes chambers and/or channels, such as a first chamber 1108a and a second chamber 1108b. The via layer 1102 includes a ridge (or sealing member) 1107 that is configured to form a seal with the elastic layer 1103. The ridge 1107 can be referred to as a valve seat in some cases. The actuation layer 1104 is configured to provide force or pressure (positive or negative pressure) to the elastic layer 1103.

The elastic layer 1103 is formed of a deformable material, such as a polymeric material (e.g., elastomer). The elastic layer 1103 is configured to at least partially deform upon the application of actuation force from the actuation layer 1104.

The vias 1105 enable a fluid to move from the first chamber 1108a to the second chamber through a channel defined by the ridge 1107 and the elastic layer 1103. In some cases, the valve 1100 is a normally-closed valve. In such a case, in the absence of actuation pressure from the actuation layer 1104, the elastic layer 1103 is flush against the ridge 1107, thereby sealing a channel between the vias 1105. Upon the application of actuation pressure from the actuation layer 1104 to the elastic layer 1103, a portion of the elastic layer 1103 moves away from the ridge 1107 to open the channel between the vias 1105. Fluid may then flow from the first chamber 1108a to the second chamber 1108b (or vice versa) through the vias 1105. Alternative, the valve 1100 may be a normally-open valve. In such a case, in the absence of actuation pressure from the actuation layer 1104, the elastic layer 1103 is not in contact with the ridge 1107 and the channel between the vias 1105 is open. Upon the application of actuation pressure from the actuation layer 1104 to the elastic layer 1103, a portion of the elastic layer 1103 comes in contact with the ridge 1107, thereby closing the channel between the vias 1105.

The actuation layer 1103 provides actuation pressure (or force) between the ridges 1106. In some cases, the actuation pressure is a vacuum and the actuation layer 1104 provides a vacuum between the ridges 1106. In other cases, the actuation pressure is positive pressure and the actuation layer 1104 provides positive pressure between the ridges 1106, which causes the elastic layer 1103 to deform upward.

With continued reference to FIG. 11, the vias 1105a and 1105b may be in fluid communication with one or more channels formed in the via layer 1102. In an example, the first via 1105a is in fluid communication with a channel formed in the first surface 1102a. The channel may be angularly disposed in relation to the first via 1105a, such as disposed at an angle of about 90° in relation to the first via 1105a. The channel may bring the first via 1105*a* in fluid communication with another via or a chamber or channel of the fluidics manifold 1101.

The ridges 1106 are comprised in a sealing member in the actuation layer 1104. The ridges are separated from one another by a distance (D1, see also FIG. 15C) that in some cases is greater than a distance (D2) between the centers of the vias 1105*a* and 1105*b*—i.e., D1>D2. In other cases, D1 can be equal to D2 (i.e., D1=D2).

A portion of the elastic layer 1103 comes in contact with the via layer 1102. The elastic layer in some cases is not in contact with the ridge 1107, in which case a passage between the elastic layer 1103 and the ridge 1107 permits fluid flow between the first chamber 1108*a* and second chamber 1108*b*. With the elastic layer 1103 not contacting the ridge 1107, the via layer 1102 comprises a ridge 1109, which may be a symmetrical ridge (i.e., having an opposing, mirror ridge, as shown). In some cases, the ridge 1109 is formed in cases in which D1>D2.

The raised rings also serve a function of creating a pressure seal for the diaphragm valves. More specifically, when the three functional layers are squeezed together, the raised ridges focus pressure against the elastic layer and onto the actuation layer. This inhibits fluid from leaking out of the valve and between the functional layers. The pressure can be applied mechanically. In this case, it may not be necessary to bond the elastic layer with either the fluidics layer or the actuation layer.

Alternatively, the valve can be normally open. In this case, application of positive pressure to the elastic layer from the actuation conduit will push the elastic layer onto the valve seat, closing the valve. This embodiment can be made by, for example, making the surface of the valve seat recessed with respect to the surface of the fluidics layer bonded to the elastic layer. In this case, the valve seat will be raised with respect to the elastic layer. Positive pressure on the elastic layer pushes the elastic layer against the valve seat, closing the valve.

By controlling a solenoid, vacuum or pressure (e.g., approximately one-half atmosphere) can be applied to the diaphragm to open or close the valve by simple deformation of the flexible membrane, e.g., application of vacuum to the membrane deflects the membrane away from a valve seat, thereby opening the valve.

Diaphragm valves of this invention can displace defined volumes of liquid. A diaphragm valve can displace a defined volume of liquid when the valve is moved into a closed or opened position. For example, a fluid contained within a diaphragm valve when the valve is opened is moved out of the diaphragm valve when the valve is closed. The fluid can be moved into a microchannel, a chamber, or other structure. The diaphragm valve can displace volumes that are about, up to about, less than about, or greater than about any of 500, 400, 300, 200, 100, 50, 25, 20, 15, 10, 5, 4, 3, 2, 1, 0.5, 0.25, 0.1, 0.05 or 0.01 µL.

Variations on flow-through and in-line valves can include valves that are situated at intersections of greater than two, three, four, or more channels. Valve seats or other structures can be designed such that closure of the valve can prevent or reduce flow in one or more of the channels while allowing fluid to flow in one or more of the other channels. For example flow can be blocked along three of five channels, while flow can continue through two of the five channels. A flow-through valve can also be referred to as a T-valve, as described in WO 2008/115626.

Fluid can be moved through valves by exertion of exogenous pressure on the fluid in the fluidic conduits or by using on-board diaphragm pumps.

When three diaphragm valves are placed in a series a positive displacement pump is created. The series can comprise a first diaphragm valve with a valve seat, a pumping diaphragm valve without a valve seat and a second diaphragm valve with a valve seat. Positive displacement diaphragm pumps are self-priming and can be made by coordinating the operation of the three valves (including but not limited to any of 2, 3, 4, 5, 6, 7, 8, 9, 10, 11, 12, 13, 14, 15, 16, 17, 18, 19, or 20 or more valves), and can create flow in either direction. A variety of flow rates can be achieved by the timing of the actuation sequence, diaphragm size, altering channel widths, and other on-device dimensions. Routers can similarly be formed from these valves and pumps. The routers can be formed using two or more valves each on a separate channel connecting to central diaphragm valve. A router also can be made by configuring three channels, each comprising a diaphragm pump, to meet in a common chamber, e.g., a pumping chamber. Bus structures can also be created that employ a series of at least two flow-through valves in which intersecting channels intersect the same flow-through channel.

To operate a three-part diaphragm pump, a first valve is opened and a third valve is closed. Then, a second, or middle, valve is opened, drawing liquid through the first valve and into the chamber of the second valve. Then, the first valve is closed, the third valve is opened. Then, the second valve is closed, pumping liquid in the chamber through the third valve. For example, moving the diaphragm into the valve relief creates an intake stroke that pulls fluid into the valve chamber when the valve inlet is open and the valve outlet is closed. Then, moving the diaphragm toward the valve seat creates a pump stroke that pushes the fluid out of the valve chamber when the valve inlet is closed and the valve outlet is open.

In some embodiments, microfluidic devices are monolithic devices. In monolithic devices, a plurality of circuits are provided on a single substrate. In the case of devices comprising diaphragm valves, a monolithic device comprises a single elastic layer functioning as a diaphragm for a plurality of valves. In certain embodiments, one actuation channel can operate a plurality of valves on a monolithic device. This allows parallel activation of many fluidic circuits. Monolithic devices can have dense arrays of microfluidic circuits. These circuits function with high reliability, in part because the channels in each circuit are fabricated simultaneously on a single substrate, rather than being made independently and assembled together. In other embodiments, an actuation conduit can control actuation of a single valve. For example, the actuation conduit can traverse the actuation layer from the actuation surface to the other side.

In some embodiments, fluidic devices comprise one or more microfluidic channels. A microfluidic channel has at least one cross sectional dimension no greater than 500 microns, no greater than 400 microns, no greater than 300 microns, or no greater than 250 microns, e.g., between 1 micron and 500 microns. A macrofluidic channel has at least one cross sectional dimension greater than 500 microns. A non-microfluidic volume as used herein refers to a volume of at least 5 microliters, at least 10 microliters, at least 100 microliters and least 250 microliters, at least 500 microliters, at least 1 milliliter, or at least 10 milliliters.

The diaphragm valves, pumps, and routers are durable, easily fabricated at low cost, can operate in dense arrays, and have low dead volumes. Arrays of diaphragm valves, pumps, and routers are readily fabricated on substrates. In one embodiment, all the diaphragm valves, pumps, and routers on a microchip are created at the same time in a simple manufacturing process using a single or monolithic membrane, such as a sheet of an elastic material. The cost is similar to make five diaphragm pumps on a device as to create five hundred. This technology provides the ability to create complex meso-, micro- and nanofluidic circuits on microchips and integrate chemical and biochemical processes by using the circuits. Thus, the disclosure herein provides methods and the ability to create simple and complex meso-, micro-, nano-, and pico-fluidic circuits on devices, and allows the implementation of virtually any reaction or assay onto a device. In general, this technology can be at least substantially insensitive to variations in solution ionic strength and surface contamination, and does not require applied electric fields. In some situations, the technology, including various devices and methods, may be used in processed with wide temperature ranges, a variety of different solvents, and over a relatively long length of time.

A device typically will comprise a plurality of fluidics circuits, each circuit comprising a microfluidic conduit in communication with external entry and exit ports. Circuits typically comprise channels and functional elements, such as valves, routers, pumps (e.g., three independently operable valves in series) and chambers.

The fluidic circuits and actuation circuits of these devices can be densely packed. A circuit comprises an open or closed conduit. In certain embodiments, the device can comprise at least 1 fluidic circuit per 1000 $mm^2$, at least 2 fluidic circuits per 1000 $mm^2$, at least 5 fluidic circuits per 1000 $mm^2$, at least 10 fluidic circuits per 1000 $mm^2$, at least 20 fluidic circuits per 1000 $mm^2$, at least 50 fluidic circuits per 1000 $mm^2$. Alternatively, the device can comprise at least 1 mm of channel length per 10 $mm^2$ area, at least 5 mm channel length per 10 $mm^2$, at least 10 mm of channel length per 10 $mm^2$ or at least 20 mm channel length per 10 $mm^2$. Alternatively, the device can comprise valves at a density of at least 1 valve per $cm^2$, at least 4 valves per $cm^2$, or at least 10 valves per $cm^2$, or at least 50 valves per $cm^2$. A valve in such a case may be a seated valve (i.e., a valve having a valve seat). Alternatively, the device can comprise features, such as channels, that are no more than 5 mm apart (edge-to-edge), no more than 2 mm apart, no more than 1 mm apart, no more than 500 microns apart or no more than 250 microns apart.

In other embodiments, the device can comprise at most 1 fluidic circuit per 1000 $mm^2$, at most 2 fluidic circuits per 1000 $mm^2$, at most 5 fluidic circuits per 1000 $mm^2$, at most 10 fluidic circuits per 1000 $mm^2$, at most 20 fluidic circuits per 1000 $mm^2$, at most 50 fluidic circuits per 1000 $mm^2$. Alternatively, the device can comprise at most 1 mm of conduit length per 10 $mm^2$ area, at most 5 mm conduit length per 10 $mm^2$, at most 10 mm of conduit length per 10 $mm^2$ or at most 20 mm conduit length per 10 $mm^2$. Alternatively, the device can comprise valves at a density of at most 1 valves per $cm^2$, at most 4 valves per $cm^2$, or at most 10 valves per $cm^2$, or at least 50 valves per $cm^2$. A valve in such a case may be a seated valve (i.e., a valve having a valve seat). Alternatively, the device can comprise features, such as channels, that are no less than 5 mm apart edge-to-edge, no less than 2 mm apart, no less than 1 mm apart, no less than 500 microns apart or no less than 100 microns apart.

The devices of this invention have very low failure rates. A device is considered to fail when at least one fluidic circuit fails to perform. Failure can result from several sources. These include delamination of the sandwich, for example from deformation of the parts; from sticking of the elastic layer to functional portions of the fluidics or elastic layers, such as sticking to a valve seat, valve chamber or channel surfaces that is exposed to the elastic layer; or poor control of the laser cutting, resulting in, e.g., residue material blocking channels or valves.

The devices of this invention can perform more high reliability. A batch of devices according to this invention have failure rates of less than 20%, less than 10%, less than 1% or less than 0.1%. Valves of this invention can have a failure rate of less than 1% over 1,000 actuations, 10,000 actuations or 100,000 actuations. A batch can be at least 10, at least 50 or at least 100 devices.

Some embodiments provide a microfluidic devices comprising one or more pneumatically actuated valves having low or substantially low failure rates. In some cases, an individual valve of said pneumatically actuated valves has a valve seat. Upon actuation of the individual valve and following termination of actuation, the individual valve remains in its actuated position (and thus has a failure rate) less than about 10% of actuation times, or less than about 1% of actuation times, or less than about 0.1% of actuation times, or less than about 0.01% of actuation times, or less than about 0.001% of actuation times, or less. In some embodiments, the individual valve comprises at least 1 elastic layer, or at least 2 elastic layers, or at least 3 elastic layers. In other embodiments, the individual valve comprises at least 2 layers, or at least 3 layers, or at least 4 layers.

Other embodiments provide a microfluidic device comprising one or more pneumatically-actuated valves operably coupled to an actuator, wherein each of said pneumatically-actuated valves is operable for at least about 70%, or 75%, or 80%, or 85%, or 90%, or 95%, or 99%, or 99.9%, or 99.99%, or 99.999%, or 99.9999% of actuations performed on the valve by said actuator, wherein the actuations comprise at least 10, 100, 200, 500, 700, or 1000 actuations, sequential actuations, or sequential actuations first performed by the valve/device. In any of the embodiments herein, each of the pneumatically-actuated valves comprises at least 1 elastic layer, or at least 2 elastic layers, or at least 3 elastic layers (for example, in some instances a valve comprises an elastomeric layer/diaphragm and an elastomeric via layer). In any of the embodiments herein, each of the pneumatically-actuated valves comprises at least 2 layers, or at least 3 layers, or at least 4 layers. For example, a pneumatically-actuated valve can comprise of a pneumatic layer, a via layer and an elastic layer located between said via layer and pneumatic layer. As another example, a pneumatically-actuated valve can comprise of a pneumatic layer, a via layer and an elastic layer located between said via layer and pneumatic layer, and a fluidics manifold (also "fluidics manifold layer" herein) adjacent the via layer.

In an example, the individual valve comprises an elastic layer adjacent to a via layer. The via layer comprises at least one channel directed through the via layer from a first surface of the via layer to a second surface of the via layer, the second surface opposite from the first surface. The via layer may include at least one channel formed in the first surface. The at least one channel is in fluid communication with the via. In some cases, the via is in fluid communication with an additional channel formed in the first surface or the second surface.

The individual valve may be in a normally open or normally closed configuration. In a normally open configuration, the valve is open in the absence of pneumatic actuation (also "actuation" herein), such as actuation with the aid or positive pressure or negative pressure (or vacuum). In a normally closed configuration, the valve will be opened upon actuation. In a normally open configuration, the valve will be closed upon actuation.

In some situations, the individual valve fails to respond to actuation less than about 10% of actuation times, or less than about 1% of actuation times, or less than about 0.1% of actuation times, or less than about 0.01% of actuation times, or less than about 0.001% of actuation times, or less wherein the actuation times are at least 10, 20, 50, 100, 200, 500, or 1000 actuations, wherein the actuations are optionally sequential, or wherein the actuations are sequential and the first ones are performed by the valves. In an example, with the individual valve in a normally closed configuration, following actuation an elastic layer of the valve will stick to one or more surfaces of the valve (e.g., a surface of the valve seat) and remain open less than about 10% of actuation times, or less than about 1% of actuation times, or less than about 0.1% of actuation times, or less than about 0.01% of actuation times, or less than about 0.001% of actuation times, or less. In another example, with the individual valve in a normally open configuration, following actuation an elastic layer of the valve will stick to one or more surfaces of the valve (e.g., a surface of the valve seat) and remain closed less than about 10% of actuation times, or less than about 1% of actuation times, or less than about 0.1% of actuation times, or less than about 0.01% of actuation times, or less than about 0.001% of actuation times, or less.

Fluidics devices provided herein can have low or substantially low leakage rates per actuation. In some embodiments, a fluidics device comprises one or more pneumatically actuated valves, an individual valve of the one or more pneumatically actuated valves has a fluidics layer that is independent of an actuation layer of the individual valve. The individual valve leaks upon at most about 1/100, or 1/1000, or 1/10,000, or 1/100,000, or 1/1,000,000 actuations, wherein the actuations are optionally sequential, or wherein the actuations are sequential and the first ones are performed by the valves. In some situations, the individual valve leaks upon at most 1/100, or 1/1000, or 1/10,000, or 1/100,000, or 1/1,000,000 actuations when in use or storage for at least about 1 day, or 2 days, or 3 days, or 4 days, or 5 days, or 6 days, or 1 week, or 2 weeks, or 3 weeks, or 1 month, or 12 months, or 1 year, or 2 years, or 3 years, or 4 years, or 5 years, or 6 years, or 7 years, or 8 years, or 9 years, or 10 years, wherein the actuations are optionally sequential, or wherein the actuations are sequential and the first ones are performed by the valves.

2. Fluidic Devices

The fluidic devices of this invention comprise (1) a fluidics layer, (2) an actuation layer and (3) an elastic layer sandwiched between them.

A. Fluidics Layer

A fluidics layer typically comprises one or more fluidic conduits defining fluid paths and comprising an interruption that prevents fluid flow along the path. The fluidics layer also can comprise at least one chamber, e.g., a macrofluidic chamber, into which fluid can flow and that can function as, for example, a reaction chamber. Fluidic channels can be internal to the fluidics layer.

In one embodiment of this invention, the fluidics layer comprises a fluidics manifold and a via layer. The via layer and the fluidics manifold are configured to mate, creating a number of functional elements. These elements include valve inlets and the valve outlets, fluidic channels, fluidic chambers, fluidic ports, and diaphragm pump chambers. The via layer and fluidics manifold also can comprise apertures which, when aligned, form guides for fasteners that hold of the layers of the devices together. In other embodiments, external pressure can be exerted on fluidic conduits by apertures that traverse the fluidics layer, the elastic layer and enter the actuation layer. Furthermore, liquid can traverse the layers in such conduits, for example, to evacuate waste or to cross liquid paths in the device.

i. Fluidics Manifold

A fluidics manifold comprises a mating face adapted to mate with the via layer. Into this face are introduced a variety of functional elements.

The fluidics manifold can comprise an aperture that defines a non-micro fluidic volume that traverses the manifold. This aperture can function as an entry point to introduce fluid into the device. On the mating surface onto which the aperture opens, the aperture can be in fluidic communication with a fluidic channel, e.g., a microfluidic channel or a macrofluidic channel imposed on the surface. The apertures can traverse the piece forming a conduit, e.g., a bore. In some situations, a non-microfluidic aperture in the article that communicates with a microfluidic channel on a surface also creates a path that communicates between the two surfaces in the article onto which it opens. Such a conduit can function as an outlet passage from the fluidics manifold. A non-microfluidic aperture that is in fluid communication with a microfluidic channel on a first surface generally will have a smaller port on one surface than on the other surface onto which it opens, thus taking the shape of a well, or function as an exit port. The apertures can be adapted to receive a liquid and transmit it to the microfluidic channel with which they are in fluid communication. The compartments can take any desired shape such as cylindrical, cone shaped, box shaped, etc. In choosing the shape, one can pay attention to how surface tension will move the fluid meniscuses as the reservoir fills up and empties. The microfluidic channel can be in communication with a variety of elements, such as openings, conduits, chambers and valve chambers and seats. (For purposes of this invention, unless otherwise specified, conduits are considered to be in fluid communication even if it is across a valve seat.) Alternatively, as will be described, channels can be comprised in a surface on the via layer which mates with the fluidics manifold. Channels in either the fluidics manifold or the via layer can be in fluid communication with fluidic chambers in the fluidics manifold. Fluidic chambers can be formed as a wells that open onto the mating face of the fluidics manifold. Fluidic chambers can have microfluidic volumes or macrofluidic volumes. The fluidic chambers can function as reaction chambers in which chemical reactions are performed or as metering chambers. The mating face of the manifold also can comprise a shallow well that functions as a valve chamber of a diaphragm pump, as will be described in more detail below. The fluidics manifold can be comprised of a rigid plastic.

In some embodiments, the fluidics manifold of a microfluidic device need not have a high degree of precision or detail. Such high degree of precision or detail may be provided in the via layer. This enables the fluidics manifold to be fabricated using molding processes readily available, such as low fidelity molding processes (e.g., blow molding).

Fluidic conduits may be formed in surfaces of the fluidics manifold or via layer as furrows, dimples, cups, open channels, grooves, trenches, indentations, impressions and the like. Conduits or passages can take any shape appropriate to their function. This includes, for example, channels having, semi-circular, circular, rectangular, oblong or polygonal cross sections. Valves, reservoirs and chambers can be made having dimensions that are larger than channels to which they are connected. Chambers can have walls assuming circular or other shapes. Areas in which a conduit becomes deeper or less than a connecting passage can be included to change the speed of fluid flow. The conduits comprise surfaces or walls that contact fluids flowing through them. The fluid in the fluidics layer can be a liquid, a gas. An emulsion or a suspension.

In some situations, the fluidics manifold includes one or more laminate layers (or sub-layers) for overpasses, reservoirs, pumps, and macro-scale channels. In an example, the fluidics manifold includes a packed column.

ii. Via Layer

In some embodiments, the via layer is a sheet formed of a polymeric material (e.g., plastic). The via layer in some cases is thin and substantially flat. The via layer comprises a first face (or first surface) that faces and mates with the mating face of the fluidics manifold and a second face (or second surface) that faces the elastic layer. The via layer typically comprises fluidic channels, typically microfluidic channels, introduced into the first surface, though meso- (i.e., mesoscopic scale, e.g., a scale on the order of 1 micrometer) and nanoscale channels may be used in some situations. The fluidic channels can be in fluid communication with pairs of apertures that traverse the via layer and that function as valve inlets and valve outlets. The apertures serve as vias that connect fluidic channels with valve chambers. Thinning the via layer allows introduction of apertures with smaller diameters. Also, to the extent the via layer is thin, the vias have decreased dead volume. In certain embodiments, the apertures have the same cross-sectional area as the microfluidic channels with which they communicate. For example, the via layer has a thickness of no more than about 0.1 mm, or 0.2 mm, or 0.3 mm, or 0.4 mm, or 0.5 mm. The area of the second surface of the via layer that surrounds the valve inlet and valve outlet functions as a valve seat. The via layer also can comprise an aperture configured to oppose a pump chamber in the fluidics manifold. The pump chamber will be in fluid communication with fluidic channels acting as inlets and outlets to the diaphragm pump.

In this configuration, the surface or face of the fluidics manifold or via layer that face each other generally comprises a substantially planar, flat or smooth surface into which indentations, depressions or etchings have been made to form the functional elements of fluidics and actuation layers, e.g., channels, chambers and valves. A portion of the surface (e.g., a planar, smooth or flat surface) that contacts the elastic layer is referred to as a contact surface. Portions of the surfaces that are indented, depressed or etched that face the elastic layer are referred to as exposed surfaces. Surfaces over which fluid flows, including conduits, channels, valve or pump bodies, valve seats, reservoirs, and the like are referred to as functional surfaces.

The via layer can be comprised of a flexible plastic coated with an adhesive and overlaid with a protective covering. The features described above can be introduced into the plastic through the adhesive and protective covering by for example, laser cutting, laser grooving or laser machining. During assembly, the protective layer is removed exposing the adhesive the via layer is aligned with corresponding features in the fluid manifold and pressed against the fluidics manifold, attaching the via layer to the fluidics manifold in forming the fluidics layer.

B. Elastic Layer

The elastic layer typically is formed of a substance that can deform when vacuum or pressure is exerted on it, and can return to its un-deformed state upon removal of the vacuum or pressure, e.g., an elastomeric material. Because the deformation dimension is measure in less than ten mm, less than one mm, less than 500 um, or less than 100 um, the deformation required is lessened and a wide variety of materials may be employed. Generally, the deformable material has a Young's modulus having a range between about 0.001 GPa and 2000 GPa, preferably between about 0.01 GPa and 5 GPa. Examples of deformable materials include, for example but are not limited to thermoplastic or a cross-linked polymers such as: silicones (e.g., polydimethylsiloxane), polyimides (e.g., Kapton™, Ultem), cyclic olefin co-polymers (e.g., Topas™, Zeonor), rubbers (e.g., natural rubber, buna, nitrile, EPDM), styrenic block co-polymers (e.g., SEBS), urethanes, perfluoro elastomers (e.g., Teflon, PFPE, Kynar), Mylar, Viton, polycarbonate, polymethylmethacrylate, santoprene, polyethylene, or polypropylene. Other classes of material that could function as the elastic layer include, for example, but are not limited to metal films, ceramic films, glass films or single or polycrystalline films. Furthermore an elastic layer could comprise multiple layers of different materials such as combination of a metal film and a PDMS layer or a Parylene-containing layer (i.e., a layer having one or more poly(p-xylylene) polymers).

In devices employing monolithic elastic layers to form one or more diaphragm valves, the elastic layer typically is sealed against both the fluidics layer and the actuation layer in order to inhibit fluid from leaking out of the valve and between the layers. In certain embodiments this sealing is accomplished by bonding the elastic layer to the fluidics layer and/or the actuation layer. In this case it may be necessary to prevent bonding of the elastic layer to the valve seat. However, the present invention uses physical pressure exerted through the raised sealing rings to seal the valves. Therefore the elastic layer used in the devices of this invention need not to be comprised of a material capable of bonding with or being made to bond with the surfaces of the fluidics layer or the actuation layer.

In certain embodiments, the elastic layer comprises a monolithic, un-sculpted sheet of elastic material. It can comprise holes or apertures functioning as guides for fasteners (and/or other structural elements) and to allow transmission of pressure from the actuation layer into fluidic channels in the fluidics layer. When pressed against the second face of the via layer, the elastic layer closes the valve vias, thereby preventing fluid from flowing through a path comprising a valve.

C. Actuation Layer

The actuation layer comprises a surface configured to fluidically mate with the fluidics layer across the elastic layer. The surface can be substantially flat except for sealing rings which are raised above the mating surface. The sealing rings may be curved shaped or corner shaped. In some cases, the sealing rings are closed loops that are shaped circular, oval, or other shapes, such as serpentine, triangular, square, rectangular, pentagonal, hexagonal, heptagonal, octagonal, or nonagonal, heart shaped, ring shapes, or combinations thereof. A sealing ring can have a cross-sectional aspect of about 0.5 mm to about 5 mm or larger. Because they are raised above the surface of the actuation layer, the sealing rings define a volume which can operate as a valve relief in a diaphragm valves. The actuation layer also comprises actuation conduits that are fluidically connected with the valve relief and which open elsewhere on the actuation layer. Positive pressure or negative pressure (i.e., vacuum) can be transmitted from these openings or ports to the valve relief. Actuation conduits can be configured as internal channels in the actuation layer. Alternatively, they can be configured as bores or apertures connecting one face of the actuation layer with the mating face. The fluid that transmits pressure through the actuation conduits is referred to as an actuant. It can be a gas or a liquid.

The actuation layer also can comprise stand-offs, or raised areas, such as rings, that define a distance between the sealing rings and the second face of the via layer and defines the degree to which the elastic layer will compress. Generally, the standoffs will have a higher profile off the actuation surface than the sealing rings. Without wishing to be limited by theory, it is believed that one challenge faced in sealing valves involves lack of uniformity in the surfaces of the actuation layer and the fluidics layer, resulting in un-evenness in the conformity of the layers when they are mated. Generally, the elastic layer is compressible and can take up some slack. However, the raised sealing rings of the actuation layer decrease the need for perfect tolerances between layers, in part by focusing pressure against the elastic layer. Stand-offs in the actuation layer allow one to define the distance between layers in the assembled device and, thereby, control the pressure that any ring can exert against the elastic layer.

In some embodiments, with a one or more vias disposed atop a sealing member (e.g., sealing ring) in an actuation layer and separated from the actuation layer by an elastic layer, a two-dimensional center point of the one or more vias (i.e., the center of a single via or a mid-point between two or more vias) may be laterally disposed in relation to the center of a sealing member (i.e., along a vector parallel to a surface of the actuation layer) by at least about 1%, or 2%, or 3%, or 4%, or 5%, or 6%, or 7%, or 8%, or 9%, or 10%, or 15%, or 20% of a cross-sectional dimension (e.g., diameter) of the sealing member. A device provided herein may function as expected with a design tolerance (100%—center point deviation) of at least about 99%, or 98%, or 97%, or 96%, or 95%, or 94%, or 93%, or 92%, or 91%, or 90%, or 85%, or 80%. In some cases, structural components of devices can have tolerances that may permit the device layers to be oriented with one another with relatively high degree of variability—e.g., in some cases, substantially perfect alignment of device layers is not necessary for a device to function in the intended manner (e.g., valves opening and closing, fluid flowing from a first chamber to a second chamber, wherein the two chambers are connected by a pneumatically-actuated valve as described herein). In an example, with the via layer laterally shifted in relation to the actuation layer or the elastic layer (or both) by as much as 0.1%, or 0.2%, or 0.3%, or 0.4%, or 0.5%, or 0.6%, or 0.7%, or 0.8%, or 0.9%, or 1%, or 2%, or 3%, or 4%, or 5%, or 6%, or 7%, or 8%, or 9%, or 10%, or 15%, or 20% of a characteristic dimension of the fluidics device (e.g., length or width taken along an axis parallel to a surface of the fluidics device), the fluidics device will function in the intended manner. A lateral shift of 0% in such a case corresponds to a device in which all three layers are substantially perfectly aligned. For example, for a fluidics device having two sets of vias in the via layer, with each set having two vias separated from one another by a separation distance having a midpoint and each set of vias overlying a sealing ring in the actuation layer that has a center point (see, e.g., FIG. 15A), a lateral shift of 0% indicates that the midpoint between the two vias is disposed directly over the center point of the sealing ring.

Figure 15A:
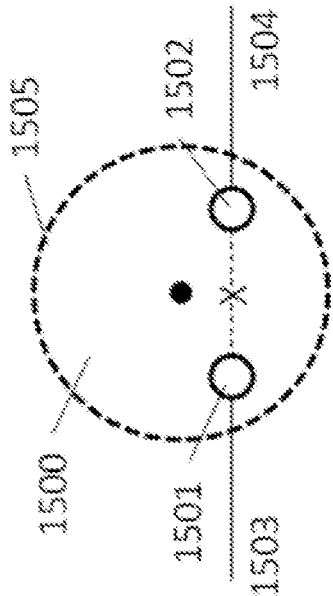
FIGS. 15A-15C schematically illustrate various configurations of vias.
Figure 15B:
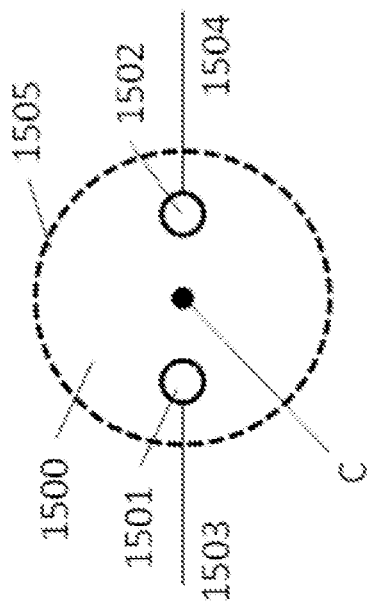
Figure 15C:
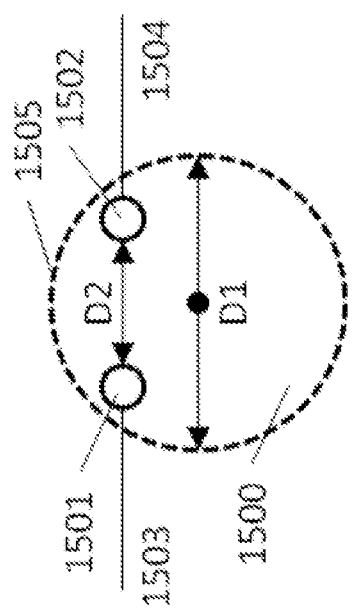

FIG. 15A shows a first via 1501, second via 1502, a first channel 1503 in fluid communication with the first via 1501 and a second channel 1504 in fluid communication with the second via 1502. The first via 1501, second via 1502, first channel 1503 and second channel 1504 are formed in the via layer 1500. A sealing member (e.g., sealing ring) 1505 formed in an actuation layer (see. FIG. 11) is disposed below (i.e., into the plane of the page) the vias 1501 and 1502. The first via 1501 and second via 1502 are oriented substantially symmetrically in relation to a midline dividing the sealing ring 1505 into two halves. A midpoint of a separation vector between the first via 1501 and the second via 1502 is disposed substantially over a center point (C) of the sealing member 1505. However, as shown in FIGS. 15B and 15C, the first via 1501 and second via 1502 may be shifted in relation to the center point (C) of the sealing ring while permitting the fluidics device to function as expected. The midpoint (marked by an 'X' in FIG. 15B) of the separation vector (dotted line) between the first via 1501 and the second via 1502 is shifted in relation to the center point of the sealing member 1505. This may be due to a misalignment of the via layer or the actuation layer, for example. The configuration of vias of FIGS. 15B and 15C advantageously enables a valve defined by the via layer, an elastic layer adjacent the via layer (not shown) and the actuation layer to open and close, as expected, to permit fluid to flow from the first channel 1503 to the second channel 1504.

With reference to FIG. 15C, the sealing member (e.g., sealing ring) in an actuation layer has a first dimension D1 and the vias have a center-to-center dimension D2. D1 and D2 are measured along parallel planes. In some embodiments, when the layers are comprised in a functional device (e.g., valve), the vias, when viewed from top, are disposed in a boundary defined by the sealing member (ring, as illustrated). D1 is greater than D2. The sealing member can generally have a dimension that is greater than a center-to-center dimension of the vias. In some situations, D2 divided by D1 less than or equal to about 0.1, or 0.2, or 0.3, or 0.4, or 0.5, or 0.6, or 0.7, or 0.8, or 0.9, or 0.95, or 0.96, o 0.97, or 0.98, or 0.99. With the vias separated from one another by a first width and the sealing member having a second width (along a plane parallel to a plane having the first width), the second width is greater than the first width. The second width can be at most 10%, or 20%, or 30%, or 40%, or 50%, or 60%, or 70%, or 80%, or 90%, or 95%, or 99% of the first width.

Actuation conduits terminate in a valve release on the mating surface and at ports configured to engage pressure lines of an actuation manifold or to accommodate solenoids. Such ports can be located on the mating surface, on the external surface or in the sides of the actuation layer.

The actuation layer can also comprise one or more apertures or finger-like structures adapted to allow access to the elastic layer. For example an aperture can be positioned into the face a heating chamber in the fluidics layer and can be adapted to accept a heating element. Also, the actuation layer can comprise one or more notches in the external face adapted to accept a source of magnetic force, e.g., a permanent magnet or any electromagnet. Such a magnet can be configured to exert magnetic force on a capture chamber in the fluidics layer. In some cases, the actuation layer may include alignment features, such as for assembly, and/or optical features, such as optical apertures, molded lenses, optical gratings, or waveguides.

Certain conduits in the actuation layer can transmit positive or negative pressure through holes in the elastic layer into fluidic conduits in the fluidics layer. Such pressure can be used to move liquids (e.g., waste solution, wash buffer(s)) through fluidic conduits.

The actuation layer may be formed of a metallic material (e.g., aluminum, a metal alloy), a polymeric material, or a composite material. In some cases, the actuation layer is formed of a polymeric material, such as a plastic. In an example, the actuation layer is formed from a printed circuit board, which may be formed of an elastic material. In some situations, the actuation layer is formed of polyimide.

Actuation conduits of the actuation layer can be in fluid communication with an actuation system, which can control actuation of the valves. An actuation system can, for example, comprise one or more solenoid valves that, when appropriately positioned, put an actuation conduit in communication with a source of positive pressure compared with ambient and/or a source of negative pressure compared with ambient. In a solenoid valve, electric current through a solenoid actuates movement of a magnet within the solenoid that comprises ports that can be switched between selected inlet and outlet ports, thereby directing a fluid (gas or liquid) along an open path, or preventing fluid flow at a stop. Typically the magnet is spring-biased to hold the valve in a selected position when not being actuated. The actuation system can be controlled by a control system, such as a computer programmed to operate the solenoid valves and the pressure sources.

3. Methods of Making

In some embodiments, a method for manufacturing a fluidics device a) providing a via layer, an actuation layer and an elastic layer disposed between the via layer and the actuation layer, said actuation layer having a raised sealing member adjacent the elastic layer, said via layer having one or more vias, and b) mechanically sealing the via layer, actuation layer and the elastic layer against one another to form the fluidics device. The via layer, actuation layer and the elastic layer can be mechanically sealed, for example, with the aid of a clamp and/or an adhesive. The design tolerance of the device permits the via layer, actuation layer and the elastic layer to be mechanically sealed against one another in a relative short time period while permitting the device to function in an intended manner. In some cases, the via layer, actuation layer and the elastic layer are mechanically sealed (including in some cases any drying or curing time that may be necessary to mechanically seal the layers) within a time period of 30 minutes or less, or 25 minutes or less, or 20 minutes or less, or 15 minutes or less, or 10 minutes or less, or 5 minutes or less, or 1 minute or less, or 30 seconds or less, or 15 seconds or less, or 10 seconds or less, or 5 seconds or less, or 4 seconds or less, or 3 seconds or less, or 2 seconds or less, or 1 seconds or less to yield the fluidics device (e.g., microfluidics device) configured to flow a fluid through the one or more vias and in some cases one or more channels in the via layer and or a fluidics layer at a flow rate of at least about 50 nanoliters (nL)/second (s), or 100 nL/s, or 200 nL/s, or 300 nL/s, or 400 nL/s, or 500 nL/s, or 1 microliter (uL)/s, or 2 uL/s, or 3 uL/s, or 4 uL/s, or 5 uL/s, or 10 uL/s, or 20 uL/s, or 30 uL/s, or 40 uL/s, or 50 uL/s, or 100 uL/s, or 200 uL/s, or 300 uL/s, or 400 uL/s, or 500 uL/s, or 1 milliliter (mL)/s, or 2 mL/s, or 3 mL/s, or 4 mL/s, or 5 mL/s, or 10 mL/s, or 20 mL/s, or 30 mL/s, or 40 mL/s, or 50 mL/s, or 100 mL/s, or 200 mL/s, or 300 mL/s, or 400 mL/s, or 500 mL/s, or 1 L/s.

The fluidics and/or actuation layers of the device may be made out of various materials, in particular, polymers, e.g., plastics. These include, but are not limited to, an olefin co-polymer (e.g., Zeonor), a cycloolefin polymer ("COP"), a cycloolefin co-polymer ("COC"), an acrylic, a liquid crystal polymer, polymethylmethoxyacrylate (PMMA), a polystyrene, a polypropylene, a polyester, a poly-ABS and a polythiol. The polymeric material that forms the fluidics or actuation layers can be a flowable polymer that can be molded. For example, the fluidics manifold can comprise a polyester (e.g., PET-G) and the actuation layer can comprise ABS plastic. Glass (e.g., borosilicate glasses (e.g., borofloat glass, Corning Eagle 2000, pyrex)), silicon and quartz also can be used.

Various layers (including structures therein, such as vias and channels) provided herein may be formed from substrates formed of metallic materials or polymeric materials (e.g., plastic). Depending on the choice of the material different fabrication techniques may be used. In certain fluidic devices of this invention, a plastic substrate can be a flat and/or rigid object having a thickness of about 0.1 mm or more, e.g., about 0.25 mm to about 5 mm. Grooves and apertures in the via layer can be formed by laser etching e.g., in a single process step. During this process ridges can build up along the sides of the grooves and vias as plastic melts and reflows. Use of a soft, pressure sensitive adhesive (e.g., a 1 mil silicone transfer tape) that can compress/reflow accommodates this during assembly. In some cases, channels and/or vias are formed with the aid of semiconductor fabrication techniques employing, for example, masks and various etching chemistries.

A layer (or other structural component of a device provided herein) may be made out of plastic, such as polystyrene, using a hot embossing technique. The structures are embossed into the plastic to create the bottom surface. A fluidics manifold may then be bonded to a via layer. In another embodiment a foil is embossed (e.g., using a roller) wherein sharp features on the embossing tool simultaneously punctures the via holes. Injection molding is another approach that can be used to create such a device. In some cases, lithography may also be utilized. Yet another approach involves the use of epoxy casting techniques to create the obstacles through the use of UV or temperature curable epoxy on a master that has the negative replica of the intended structure. Laser or other types of micromachining approaches may also be utilized to create vias and/or channels. Other suitable polymers that may be used in the fabrication of the device are polycarbonate, polyethylene, and poly(methyl methacrylate). In addition, metals like steel and nickel may also be used to fabricate the master of the device of the invention, e.g., by traditional metal machining. Three-dimensional fabrication techniques (e.g., rapid prototyping by stereolithography or SLA) may be employed to fabricate a device in one piece. This method is particularly useful to make actuation layers comprising internal actuation channels. Other methods for fabrication are known in the art.

The microfluidic device typically comprises multiple microchannels and vias that can be designed and configured to manipulate samples and reagents for a given process or assay. In some embodiments the microchannels have the same width and depth. In other embodiments the microchannels have different widths and depths. In another embodiment a microchannel has a width equal to or larger than the largest analyte (such as the largest cell) separated from the sample. In another embodiment the channels are smaller than the largest analyte (such as a cell or bead). This is a way of collecting materials, e.g., collecting particles on a dam. For example, in some embodiments, a microchannel in a microfluidic device can have a cross-sectional dimension between about 25 microns to about 500 micron, e.g., about 100 microns, about 150 microns or about 200 microns. In other embodiments, the channels have a width greater than any of 50, 60, 70, 80, 90, 100, 110, 120, 130, 140, 150, or 300 microns. In some embodiments, a microchannel has a width of up to or less than any of 100, 90, 80, 70, 60, 50, 40, 30 or 20 microns. In some embodiments a microchannel in a microstructure can have a depth greater than any of 50, 60, 70, 80, 90, 100, 110, 120, 130, 140 or 150 microns. In some embodiments, a microchannel has a depth of up to or less than 100, 90, 80, 70, 60, 50, 40, 30 or 20 microns. In some embodiments a microchannel has side walls that are parallel to each other. In some other embodiments a microchannel has a top and bottom that are parallel to each other. In some other embodiments a microchannel comprises regions with different cross sections.

The speed at which liquids can be transferred through channels depend on their viscosity, the driving pressure, and the flow restriction of the conduit. By combining micro- and non-micro channels the flow restriction of the conduit between reservoirs can be tailored.

In monolithic devices comprising a plurality of diaphragm valves, each diaphragm valve must be sealed against leakage of fluid out of the valve. In the present invention, sealing rings in the actuation layer exert localized pressure on the elastic layer against the fluidics layer to form a pressure seal. Non-uniformities in the facing surfaces may result in pressures that are not uniform across the entire surface of the sealing ring. However, it is believed that localizing the pressure in the sealing rings results in sufficient pressure across the ring surface to seal the valves. This allows the use of parts made of materials in which high tolerances are more difficult to achieve.

In some embodiments, all three layers (e.g., via layer, elastic layer and pneumatic/actuation layer) or optionally all four layers (e.g., via layer, elastic layer, pneumatic layer, and fluidics manifold) layers are mechanically sealed (or pressed) against one another. In some cases, such mechanical sealing generates pressure (or squeezing) that holds the layers together. Pressure or squeezing of the layers together can be achieved using mechanical fasteners. Mechanical fasteners can be selected from, for example, a screw, a clip, a snap fastener, a staple, a rivet a band (e.g., an elastic band) and a pin. For example, bores through the three layers can function as guides for pins or screws. The fluidic or actuation layer can comprise a snap that tightly snaps into a groove or recess in the other layer. Accordingly, the actuation layer may not be completely planar, but may include bend that is flattened when the layers are fastened. Therefore, the present invention provides a new mechanism for generating functionally pneumatic valve(s) comprising at least 2 or 3 or 4 layers through a single combining/attaching step. This provides a faster and cheaper mechanism to produce functional valves.

In an example, layers are mechanically sealed against one another with the aid of gluing (e.g., glue screw). In such a case, glue may be provided between the layers to hold the layers together when compressed. In another example, layers are mechanically sealed against one another with the aid of a clamp or vacuum. In another example, layers are mechanically sealed against one another with the aid of heat sealing. In another example, layers are mechanically sealed against one another with the aid of ultrasonic welding.

For example, in an assembled device the fluidics layer, elastic layer and actuation layer are sandwiched together. A microfluidic channel in the fluidics layer is interrupted by a valve seat and the termini of the channels adjacent the valve seat open onto the elastic layer through a pair of vias. The valve seat is in contact with the elastic layer, resulting in a closed valve. When negative pressure is transmitted through an actuation channel, the elastic layer is deformed into the valve relief. This opens the valve, creating a path through which liquid can flow. The pressure in the pneumatic chamber relative to the microfluidic channel controls the position of the elastic layer. The elastic layer can be deformed toward the pneumatic chamber when the pressure is lower in the pneumatic chamber relative to the microfluidic channel. Alternatively, the elastic layer can be deformed toward the valve seat when the pressure is lower in the microfluidic channel relative to the pneumatic chamber. When pressure is equal or approximately equal in the microfluidic channel and the pneumatic chamber, the valve can be in a closed position. This configuration can allow for complete contact between the seat and the elastic layer when the valve is closed. Alternatively, when pressure is equal or approximately equal in the micro fluidic channel and the pneumatic chamber, the valve can be in an open position. The pneumatically actuated valves can be actuated using an inlet line that is under vacuum or under positive pressure. The vacuum can be approximately house vacuum or lower pressure than house vacuum, e.g., at least 15 inches Hg or at least 20 inches Hg. Alternatively, in a normally closed valve, the valve relief can be connected to ambient pressure and pressure in the fluid path can push open the valves. The positive pressure can be about 0, about 1, about 2, about 5, about 10, about 15, about 20, about 25, about 30, about 35, more than 35 psi or up to about 150 psi. The fluid for communicating pressure or vacuum from a source can be any fluid, such as a liquid or a gas. The gas can be air, nitrogen, or oxygen. The liquid can be any pneumatic or hydraulic fluid, including organic liquid or aqueous liquid, e.g., water, a perfluorinated liquid (e.g., Fluorinert), dioctyl sebacate (DOS) oil, monoplex DOS oil, silicon oil, glycerol or glycol hydraulic fluid oil or automobile transmission fluid.

4. System

A fluidic system can comprise a fluidic assembly and an actuation assembly. The fluidic assembly can comprise (1) elements to engage and hold the fluidic portion of a microfluidic device that comprises fluidic conduits, and (2) a fluid delivery assembly, such as a robot or a pump (or other tubing or direct mating), configured to deliver fluids to the fluidics manifold or to the microfluidic conduits. The actuation assembly can comprise (1) elements to engage and hold the actuation portion of a microfluidic device that comprises actuation conduits, (2) an actuation manifold configured to mate or align with ports on the micro fluidic device and to deliver actuant into the actuation conduits microfluidic device; and (3) an actuant delivery assembly, configured to deliver fluids, e.g., air, to the actuation manifold or to the actuation conduits directly. The actuant delivery assembly can comprise a source of positive or negative pressure and can be connected to the actuation conduits through transmission lines. The system can also comprise accessory assemblies. One such assembly is a temperature controller configured to control temperature of a fluid in a fluidic conduit. Another is a source of magnetic force, such as a permanent or electromagnet, configured to apply magnetic force to containers on the instrument that can comprise, for example, particles responsive to magnetic force. Another is an analytic assembly, for example an assembly configured to receive a sample from the fluidic assembly and perform an procedure such as capillary electrophoresis that aids detection of separate species in a sample. Another is a detector, e.g., an optical assembly, to detect analytes in the instrument, for example fluorescent or luminescent species. The instrument also can comprise a control unit configured to automatically operate various assemblies. The control unit can comprise a computer comprising code or logic that operates assemblies by, for example, executing sequences of steps used in procedure for which the instrument is adapted.

5. Methods for Use

The devices of this invention can be used to manipulate fluidics and perform chemical or biochemical reactions on them. In certain embodiments, the devices are useful to perform one or more steps in a sample preparation procedure. For example, a fluidics robot can load a macrofluidic sample containing an analyte from a 96-well microtiter plate to a non-microfluidic well of a device of this invention. The robot also can load reagents onto other non-microfluidic wells of the device that are part of the same fluidic circuit. On-device circuitry, such as diaphragm valves and pumps, can divert fluids into the same chamber for mixing and reaction. A temperature regulator can transmit heat to a chamber, for example, to perform thermal cycling or to "heat-kill" enzymes in a mixture. Fluids can be shuttled between chambers (or valve seats) in preparation of further steps. Analytes can be captured from a volume by contacting the fluid with immobilized specific or non-specific capture molecules. For example, chambers can have immobilized biospecific capture agents. Also, fluids comprising magnetically responsive particles that capture analytes can be mixed with fluids comprising the analyte in various chambers in the device. The particles can be immobilized with a magnetic force and washed to remove impurities. Then the purified analyte can be eluted from the particles and transmitted to an exit chamber for removal from the device.

EXAMPLES

Example 1

A fluidic device 100 of this invention is depicted in the figures. The device comprises (1) a fluidics layer 200 that comprises a fluidics manifold 201 and a via layer 250; (2) an elastic layer 300 and (3) an actuation layer 400.

Fluidics manifold 201 is a piece of molded plastic that comprises a mating surface 204. The fluidics manifold has a fluid inlet 202 configured as an aperture through the mating face that opens into a well on an outside surface 215 of the fluidics manifold. A plurality of macrofluidic chambers (210, 211, 212) in the fluidics manifold open onto the mating surface. The fluidic channels 207 are disposed in the mating surface as grooves. The fluidic channels are in fluid communication with the fluidic chambers directly or through fluidic channels disposed in the via layer. A recess 208 in the mating surface functions as a particle capture chamber. A plurality of apertures (205*a-d*, 206*a-d*) through the fluidics manifold function as guides for the alignment pins in the assembly fixture and screws to hold the layers of the device together.

In an embodiment depicted in FIG. 6, fluidics manifold 600 comprises a plurality of fluid inlets 602*a-d*. In this embodiment, the fluidics manifold is configured to be oriented so that the fluid inlets are vertical and able to receive and hold liquid.

Figure 3:
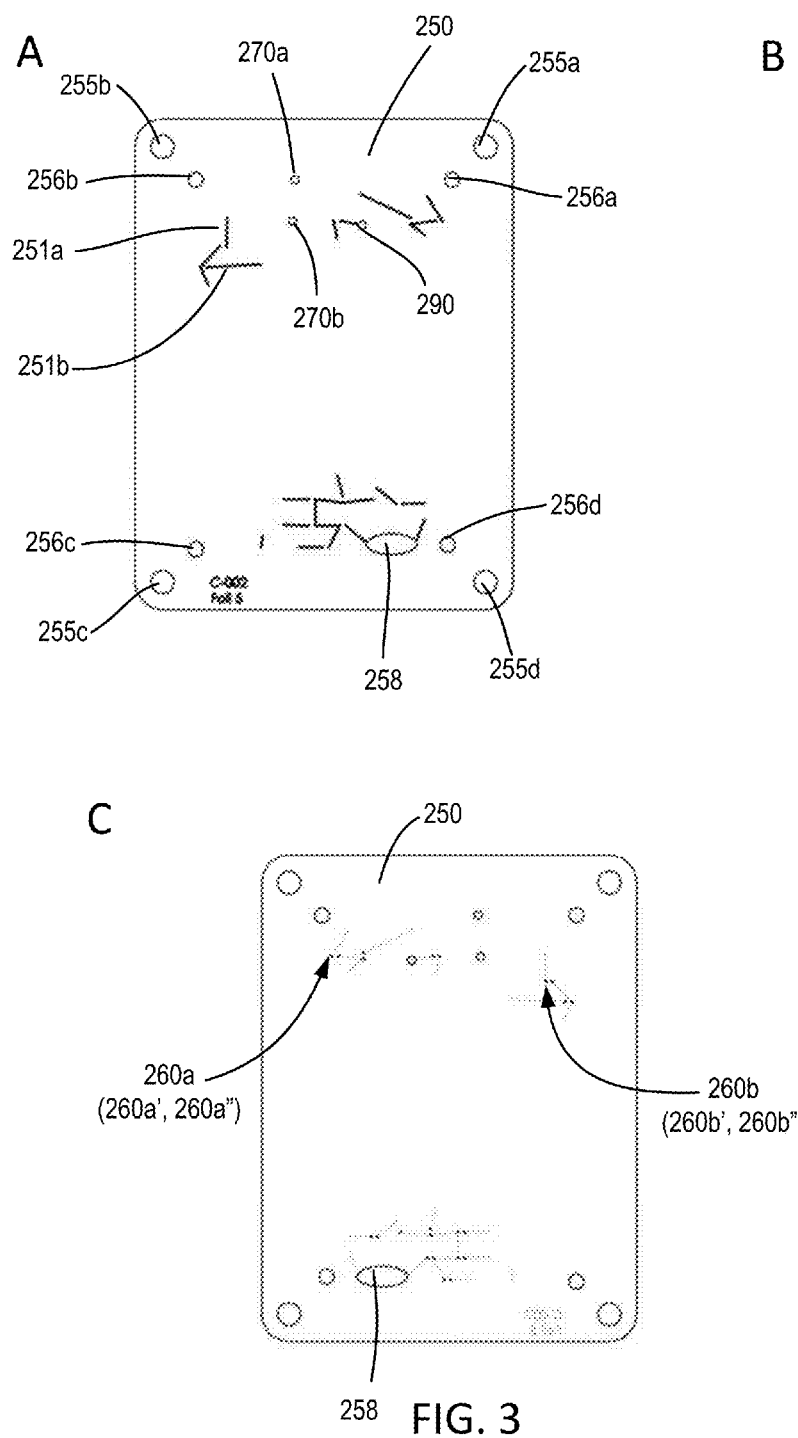
FIG. 3 shows an example of a via layer.

The via layer 250 is comprised of a polymeric material (e.g., a thin plastic material, an elastomer) that can be more flexible than the material from which the fluidics manifold is made. A first surface of the via layer (FIG. 3A) faces the mating surface of the fluidics manifold. The first surface comprises fluidic channels 251*a-b* that, when properly aligned with the mating surface of the fluidics manifold, serve as fluidic connections between inlets, macrofluidic channels, chambers, valves and/or pumps. At the location of a diaphragm valve, a fluidic channel comprises an interruption of the groove. Two apertures or vias (260*a'* and 260*a''*; 260*b'* and 260*b''*), communicate with the first surface (FIG. 3A) and a second surface (FIG. 3B) of the via layer. The apertures are in fluidic communication with the ends of the fluidic channels at the location of the interruption. Each pair of vias will function as a valve inlet and a valve outlet in a diaphragm valve. The via layer also comprises an aperture 258 positioned to align with the capture chamber 208 in the fluidics manifold. This aperture is in fluid communication with two fluidic channels in the first surface of the via layer. A plurality of apertures in the via layer (255*a-d*, 256*a-d*) are positioned to be aligned with apertures in the fluidics manifold and function as guides for fasteners. The second surface of the via layer is generally smooth and flat, and is adapted to be pressed against the elastic layer to seal the vias.

The elastic layer 300 also comprises apertures 306*a-d* positioned to align with the guide apertures of the fluidics manifold and the via layer.

The actuation layer 400 is configured as a plate. It has a surface 404 that faces the elastic layer 300 in an assembled device. Raised rings 417*a-d* in the actuation layer located around fastener guides function as stand-offs and determine how close the surface of the actuation layer can get to the surface of the elastic layer, and how much the elastomer is compressed. Each ring comprises a ridge that in some cases has a thickness less than about 5 mm, or 4 mm, or 3 mm, or 2 mm, or 1 mm, or 0.5 mm, or 0.1 mm, or 0.01 mm. If the parts are warped, valves in close proximity to such stand-offs will still have a well-defined volume. The mating surface comprises a plurality of guide apertures (405*a-d*, 406*a-d*) positioned to align with guide apertures in the other layer for fastening. The mating surface also comprises a plurality of sealing rings 460*a-b* that are raised above the otherwise flat mating surface. The sealing rings are positioned such that upon mating with the elastic and fluidics layers, each sealing ring surrounds a pair of via holes, i.e., a valve input and a valve output. Each raised sealing ring defines a well or chamber 461*a-b* that will function as a valve relief in the assembled device. A sealing ring 408 for a capture chamber is positioned to be disposed on assembly opposite the pumping chamber.

The floor of the well formed by a sealing ring comprises a hole (or orifice) 462 that communicates with an actuation conduit 465. Actuation conduits are disposed inside the actuation layer. Each conduit opens at a port 480*a-b*, allowing communication of pressure (positive or negative) between the well and the port. Each actuation conduit is in fluid communication with a positive pressure source (e.g., air compressor) or a negative pressure source (e.g., vacuum pump).

The face of the actuation layer opposite the mating face comprises a groove or notch 415 configured to receive a magnet that can immobilize magnetically responsive particles in a chamber or compartment of the fluidics manifold.

An aperture in the actuation layer is positioned to be disposed opposite a chamber in the fluidics manifold. The aperture is configured to accept a heating element that transmits heat through the elastic layer and the via layer into a chamber in the fluidics manifold. In another embodiment, there also is an aperture through the elastic layer to transmit heat.

The actuation layer also can comprise conduits 475*a-b* and 465*a-b* configured to transmit pressure through a port 490, through holes 370*a-b* and 390 in the elastic layer and holes 270*a-b* and 290 in the via layer into fluidic conduits. This pressure can act as a motive force to move liquid throughout liquid conduits. Such conduits also can carry liquids into and out of the device.

The device is assembled by aligning the functional elements in each layer with their counterpart elements in the other layers and fastening the layers together. In this example, the fasteners are screws that traverse the guide apertures. Fasteners are adapted to exert pressure between the layers such that the sealing rings seal the elastic layer against the sealing rings on the one side and the second surface of the via layer on the other side.

When the layers are properly aligned with each other, assembled and fastened, diaphragm valves are formed. Paired vias function as a valve input and a valve output. The second surface of the via layer that faces the elastic layer serves as a valve seat. A portion of the elastic layer is pressed against the valve seat, closing the valve input and output. The well formed by the ring seal functions as a valve relief. Negative pressure applied through an actuation conduit pulls the diaphragm into the valve relief, creating a valve chamber on the opposite side of the diaphragm, opening a fluid path between the valve input and valve output and allowing fluid to flow along the fluid path.

A capture chamber is formed at a location in which a sealing ring effaces an aperture in the via layer and a pumping chamber. In this configuration the elastic layer does not sit against a valve seat in the via layer and, generally, cannot completely close the valve. Alternatively the chamber can be configured with the elastic layer sitting against the valve relief by raising the floor inside the sealing ring. This would make the chamber volume independent of vacuum quality. The capture chamber is effaced on the actuation side by a notch 415 that is configured to accept a source of magnetic force, such as a permanent magnet. In operation, the elastic layer can be pulled away from the capture chamber, increasing its volume. Magnetically responsive particles that enter the capture chamber can be captured by the magnetic force of the magnet. The elastic layer is pumped in and out, displacing the particles and allowing them to be washed by fluid in the chamber.

Alternatively, the capture chamber can be paired with two diaphragm valves that function as inlet valves and outlet valves, forming a pump. A pumping cycle can comprise the following steps: (1) open the inlet valve and close the outlet valve; (2) perform a draw stroke with the pumping valve to draw fluid into the pumping chamber; (3) close the inlet valve and open the outlet valve; (4) perform a pumping stroke would pumping valve to push fluid out of the pumping chamber.

Referring to FIG. 8, device 100 is engaged with actuation manifold 800, which is configured to deliver positive or negative pressure to actuation conduits or to fluid conduits. Fluid inlet 202 is configured to receive syringe 802 by which a liquid sample can be introduced into the device. Temperature control element 805 is configured to regulate temperature in reaction chamber 212. Temperature control element 801 fits into slot 412 to regulate temperature in the reaction chamber 212. Magnet 850 fits into a slot on the actuation layer. Ports 480a-b are configured to engage lines in actuation manifold 800. Actuation manifold 800 comprises solenoid valves 810a-b which are engaged with a source of pressure. Opening or closing the solenoid valves transmits positive or negative pressure through actuation conduits to operate the diaphragm valves, or through holes, e.g., 490 and 290, to provide motive force to move liquids though fluidic conduits.

FIG. 9 shows an example of a device in which the actuation layer and actuation manifold have been integrated into one part, 900h. Ports connect to a source of pressure for pressurizing fluids: 'air' (A, 920), vacuum for opening valves (V, 930), waste (may contain liquid to pass a liquid trap) (W, 940) and closing pressure to close the valves (normally higher than the 'air' pressure by which the liquid in the reservoirs is pressurized) (C, 950). Solenoid valves 910a-d control transmission of pressure through actuation conduits to valves as described above, orchestrating operations on fluids in the fluidics layer to pull and possibly meter liquids from the ports E, B2, N, P and T, and to pump or push liquid to the out-port 'O'.

Example 2

Figure 12A:
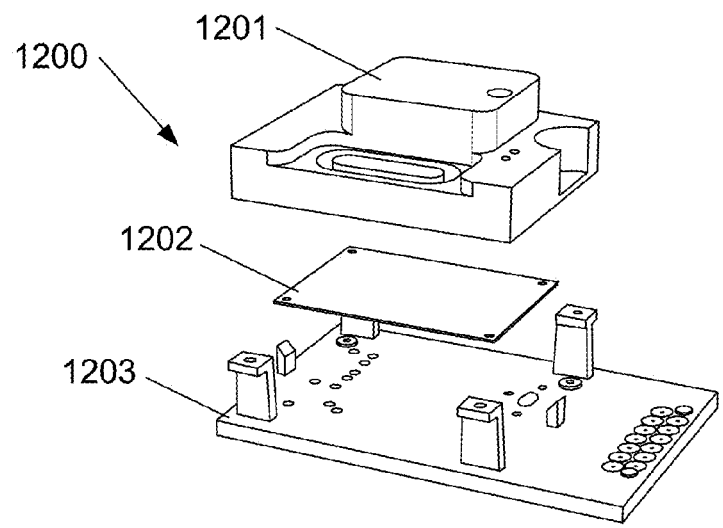
FIGS. 12A-12C shows a fluidics device.
Figure 12B:
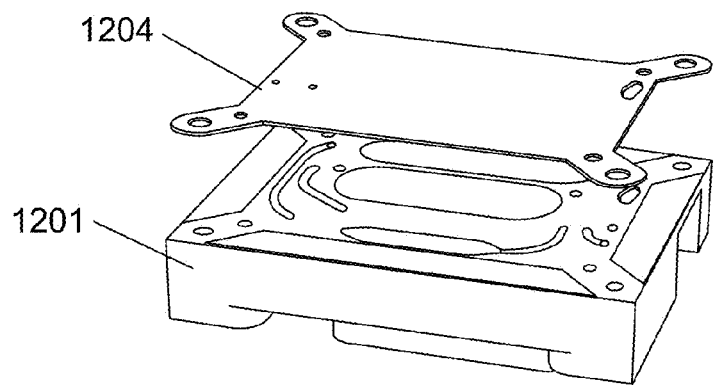

FIG. 12A schematically illustrates a device 1200 having a separable fluidics manifold 1201, elastic layer 1202 and actuation layer 1203. The device 1200 includes a via layer 1204, as shown in FIG. 12B. The via layer 1204 comprises one or more vias and channels. The via layer fluidics manifold 1201, via layer 1204, elastic layer 1202 and actuation layer 1203 are configured to be mechanically sealed against one another. When assembled in the device 1200, the via layer 1204 is disposed adjacent the fluidics manifold 1201 and the elastic layer 1202 is disposed between the actuation layer 1203 and the via layer 1204.

Figure 12C:
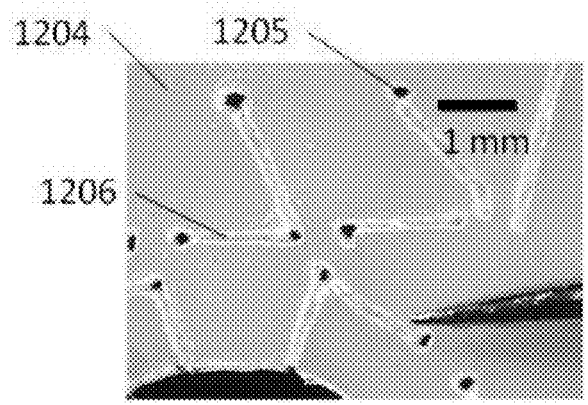

The via layer 1204 includes one or more vias 1205 and channels 1206, as shown in FIG. 12C. The channels 1206 are formed in the via layer 1204 and in fluid communication with one or more vias. Adjacent vias not connected by a channel formed in the via layer may be brought in fluid communication with one another through a channel formed between the elastic layer 1202 and the via layer 1204 (see FIG. 11).

Example 3

Figure 13:
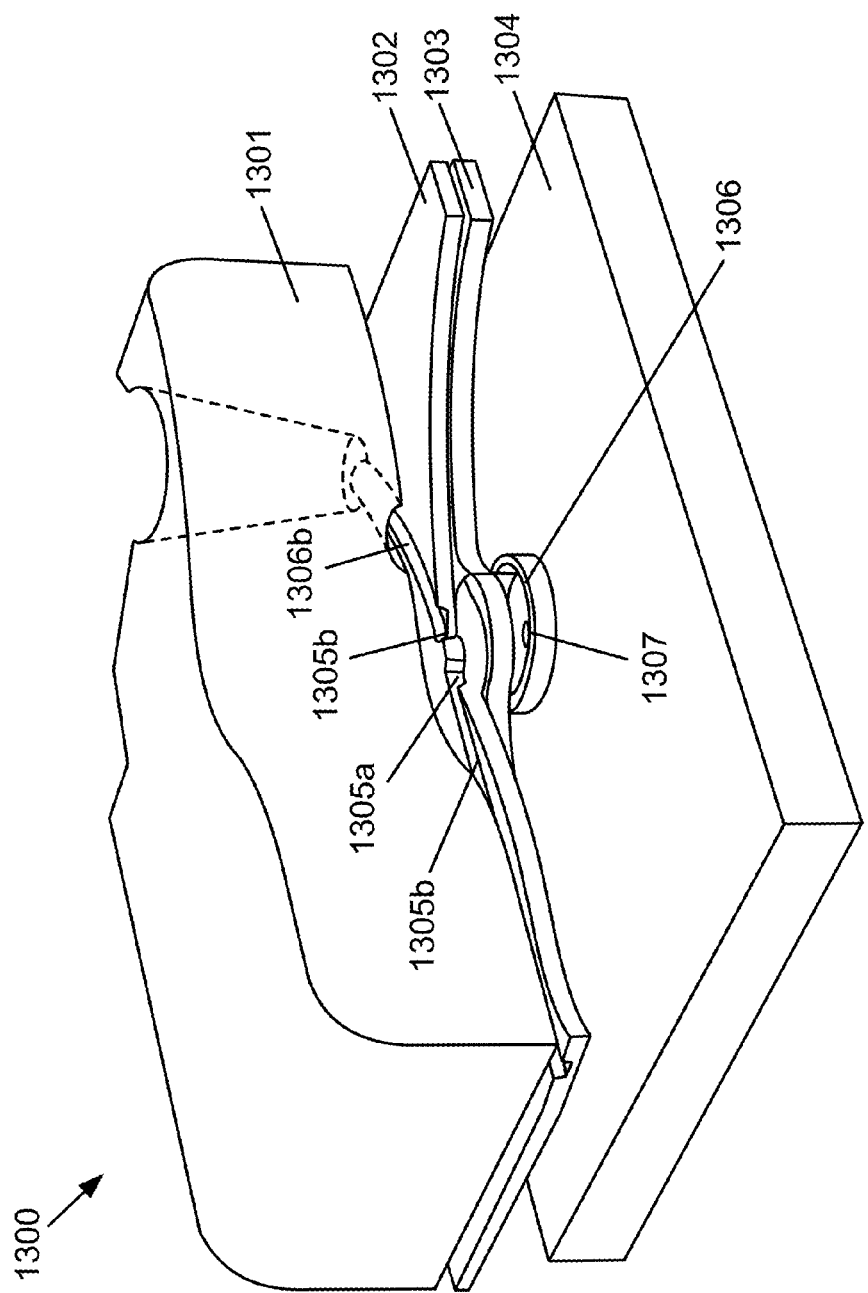
FIG. 13 schematically illustrates a fluidics device.

FIG. 13 schematically illustrates a device 1300 having a fluidics manifold 1301, a via layer 1302 adjacent the fluidics manifold 1301, an elastic layer 1303 adjacent the via layer 1302, and an actuation layer 1304 adjacent the elastic layer 1303. The via layer 1302 includes vias 1305a and 1305b that extend from a first surface of the via layer 1302 to a second surface, the second surface adjacent the elastic layer 1303. The first via 1305a is in fluid communication with a first channel 1306a formed in the via layer 1302, and the second via 1305b is in fluid communication with a second channel 1306b formed in the via layer 1302. The first channel 1306a and second channel 1306b may be brought in fluid communication with one another through a channel formed between the via layer 1302 and the elastic layer 1303.

The actuation layer 1304 includes a sealing ring 1306 having raised ridges that are configured to come in contact with the elastic layer 1303 (see FIG. 11). An orifice 1307 provides positive and/or negative pressure to an area between the elastic layer 1303 and the actuation layer 1304, which aids the elastic layer 1303 to open or close a channel between the via layer 1302 and the elastic layer 1303 that fluidically connects the first via 1305a and the second via 1305b. The channel is defined by a space between the via layer 1302 and the elastic layer 1303.

In some situations, the via layer 1302, elastic layer 1303 and actuation layer define a valve. The valve may be a normally-closed valve or a normally-open valve. In normally-closed cases, the elastic layer 1303 is in contact with the via layer 1302 in the absence of actuation pressure from the actuation layer 1304. Upon the application of actuation pressure (e.g., vacuum) from the actuation layer 1304 to the elastic layer 1303, a portion of the elastic layer 1303 moves away from the via layer 1302 to form a channel between the via layer 1302 and the elastic layer 1303 that fluidically connects the first via 1305a to the second via 1305b. When actuation pressure is terminated, the elastic layer 1303 returns to its normally-closed configuration. In normally-open cases, the elastic layer 1303 is not in contact with the via layer 1302 in the absence of actuation pressure from the actuation layer 1304. Upon the application of actuation pressure (e.g., positive pressure) from the actuation layer 1304 to the elastic layer 1303, a portion of the elastic layer 1303 moves toward the via layer 1302 to close the channel between the via layer 1302 and the elastic layer 1303 that fluidically connects the first via 1305a to the second via 1305b. When actuation pressure is terminated, the elastic layer 1303 returns to its normally-open configuration.

Example 4

Figure 14A:
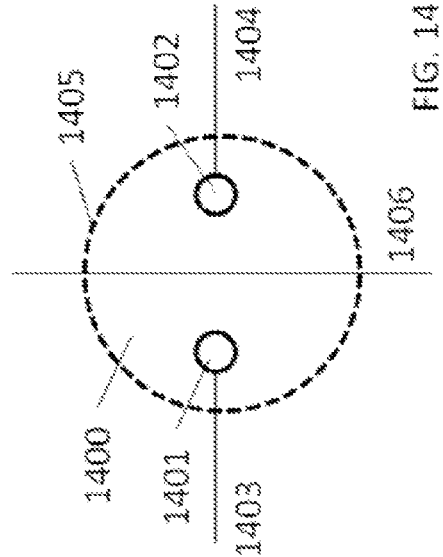
FIGS. 14A-14C schematically illustrate various configurations of vias and channels.
Figure 14B:
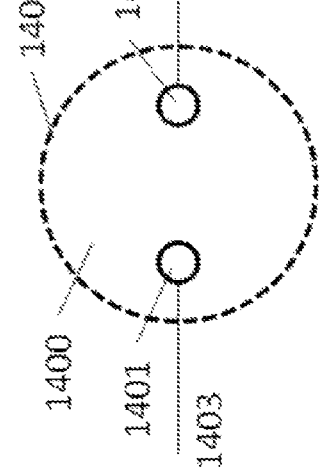
Figure 14C:
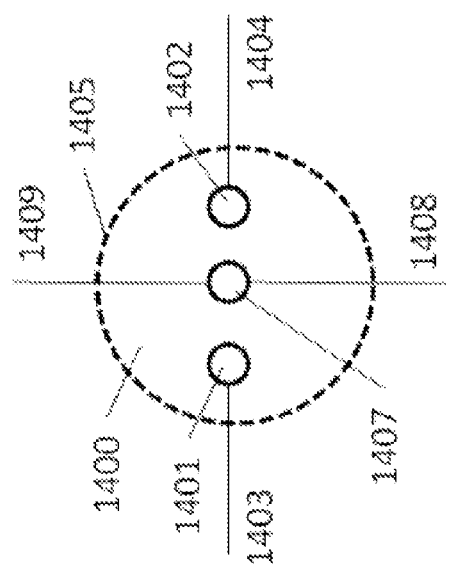

FIGS. 14A-14C show various configurations of vias and channels in a vial a layer 1400. FIG. 14A shows a first via 1401, second via 1402, a first channel 1403 in fluid communication with the first via 1401 and a second channel 1404 in fluid communication with the second via 1402. The first via 1401, second via 1402, first channel 1403 and second channel 1404 are formed in the via layer 1400. A sealing ring 1405 formed in an actuation layer (see. FIG. 11) is disposed below (i.e., into the plane of the page) the vias 1401 and 1402. In some cases, for a normally closed configuration, upon the application of actuation pressure to an elastic layer (not shown) between the actuation layer and the via layer 1400, the vias 1401 and 1402 (and hence the channels 1403 and 1404) are brought in fluid communication with one another. Alternatively, for a normally open configuration, upon the application of actuation pressure to the elastic layer, the fluid communication between the vias 1401 and 1402 (and hence the channels 1403 and 1404) is terminated.

Various configurations of vias and channels are possible in devices provided herein. For example, in FIG. 14B, the via layer 1400 includes a third channel 1406 directed across the sealing ring 1405. The third channel 1406, as illustrated, is not in fluid communication with the vias 1401 and 1402; however, in some cases, the third channel 1406 may be in fluid communication with one or more of the vias 1401 and 1402. As another example, in FIG. 14C, the via layer 1400 includes a third via 1407 in fluid communication with a fourth channel 1408 and a fifth channel 1409.

Example 5

Figure 16:
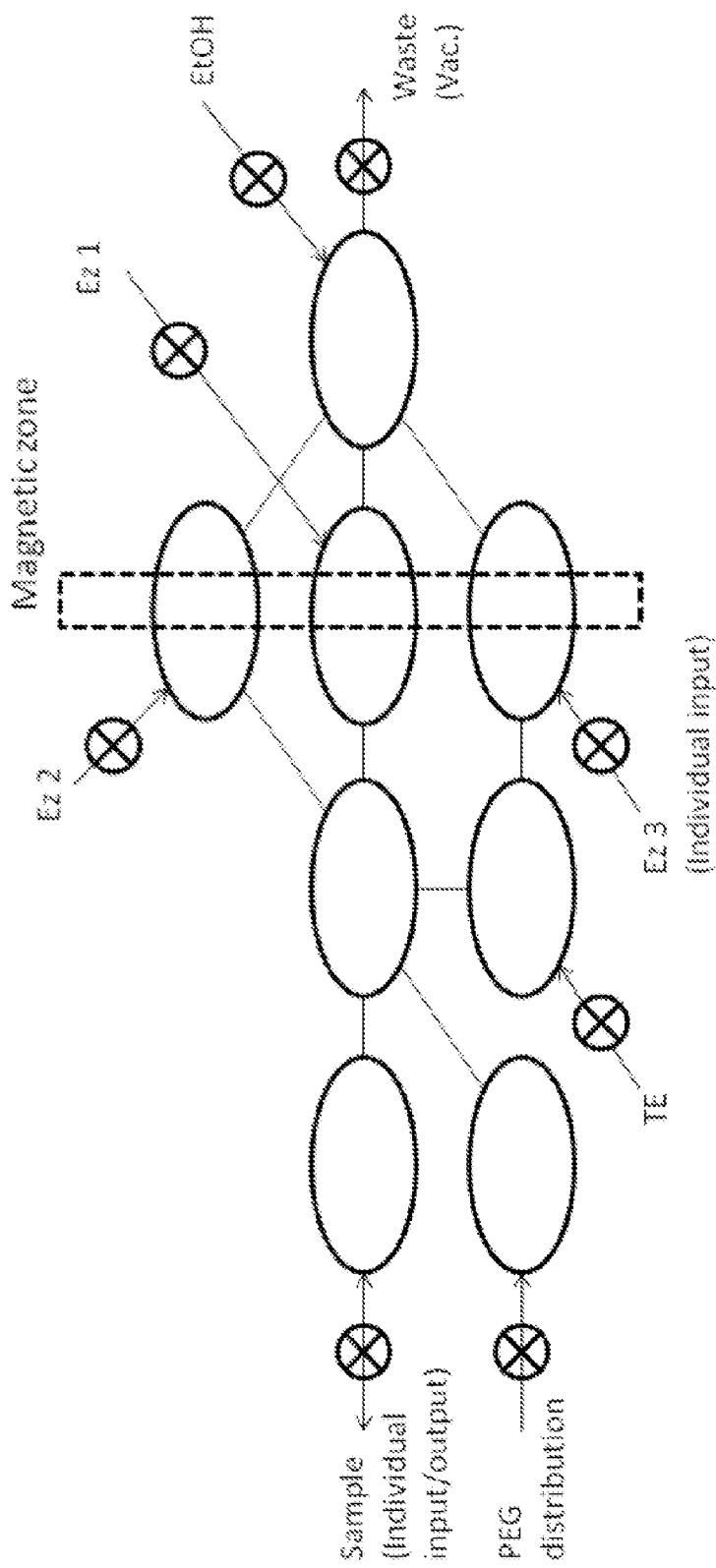
FIG. 16 shows various valve configurations for a fluidics device.

FIG. 16 shows various valve configurations for a fluidics device. Each valve (represented by an oval) includes a diaphragm comprises in a via layer, an elastic layer and an actuation layer. Each valve includes one or more vias directed through the via layer (see FIG. 11). Valves may be fluidically coupled to one or more other valves through one or more channels. The device includes a magnetic zone for providing a regulatable magnetic field to the fluidics device. This may aid in capturing attractable particles, such as beads. The valves regulate the flow rate of enzymes (Ez 1, Ez 2, Ez 3, etc.), solvents (e.g., ethanol, or EtOH), and other components (e.g., polyethyleneglycol, or PEG)

Example 6

Figure 17:
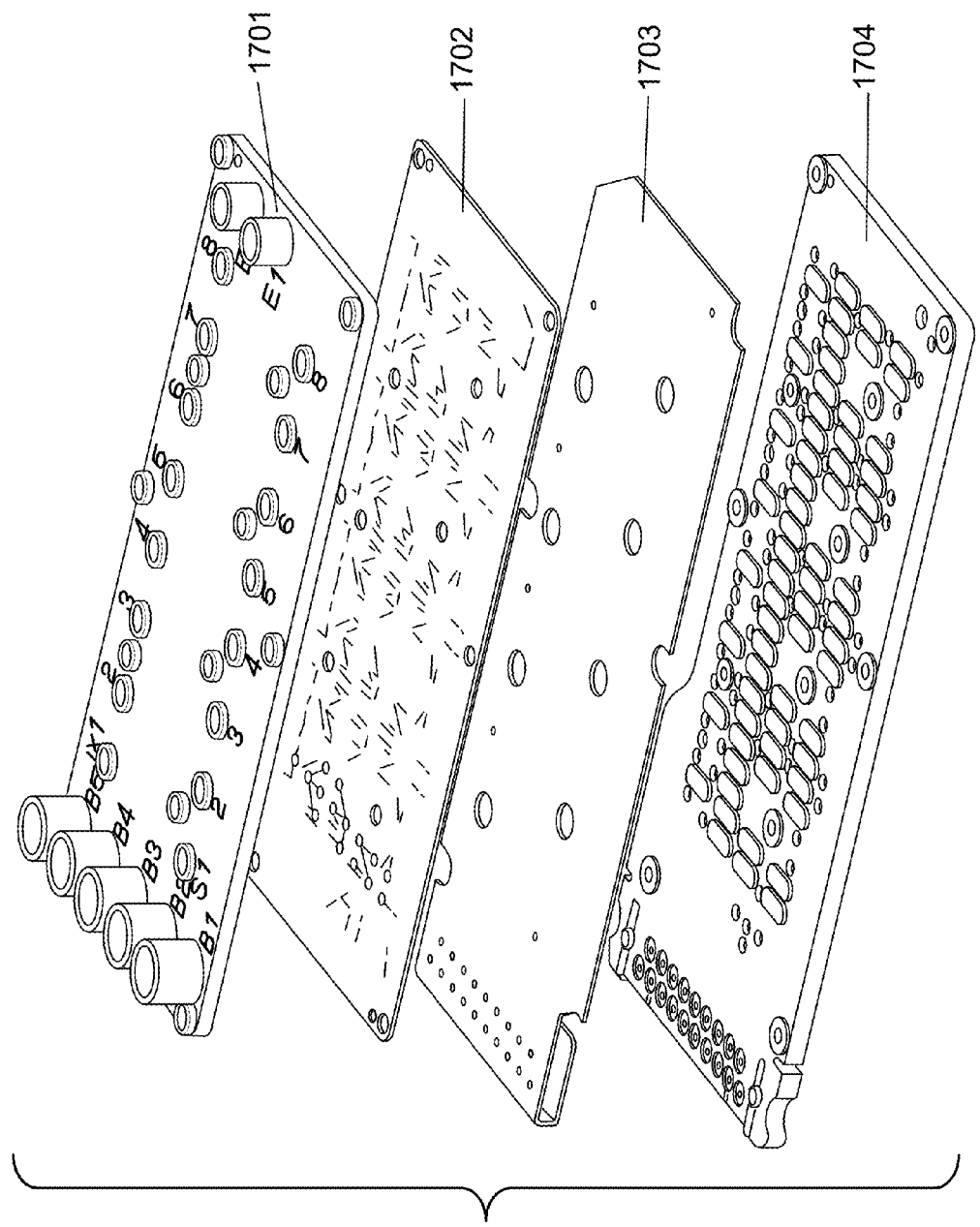
FIG. 17 shows a fluidics device having plurality of device layers.

FIG. 17 shows a fluidics device having a manifold 1701, via layer 1702, elastic layer 1703 and actuation layer 1704. The via layer 1702 can be a foil, such as a foil formed of a polymeric material or a metallic material. The actuation layer is a pneumatic carrier for providing positive or negative pressure to the elastic layer 1703. The manifold 1703, via layer 1702, elastic layer 1703 and actuation layer 1704 can be held together with the aid of a mechanical seal (e.g., clamp, glue).

Example 7

Figure 18A:
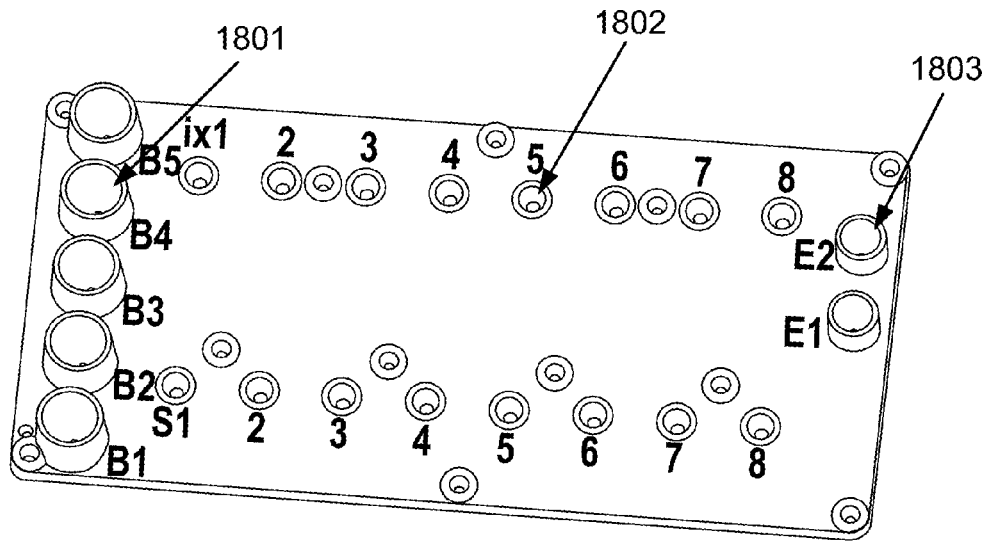
FIG. 18A illustrates a front view of a fluidics manifold.
Figure 18B:
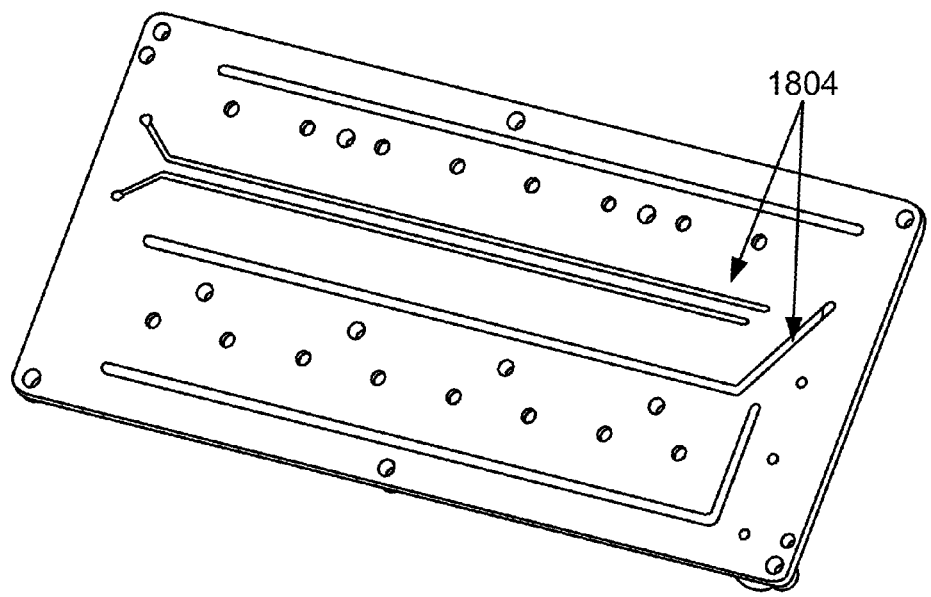
FIG. 18B illustrates an underside of the fluidics manifold.

FIGS. 18A and 18B show a manifold (or fluidics manifold) 1800. FIG. 18A is a front view of the manifold 1800; FIG. 18B shows an underside of the manifold 1800. The manifold has reagent distribution ports 1801, 1802 and 1803 of various sizes (volumes). At least some of the ports 1801, 1802 and 1803 are in fluid communication with reagent distribution lines (or channels) 1804. The ports can be chambers for accepting a fluid. The reagent distribution ports 1801, 1802 and 1803 can be between about 1 microliter (uL) and 300 uL in size, or 10 uL and 200 uL. The reagent distribution channels may have various sizes. Some reagent distribution channels are configured to flow a fluid at a flow rate of at least about 1 milliliter (mL)/s, or 2 mL/s, or 3 mL/s, or 4 mL/s, or 5 mL/s, or 10 mL/s, or 20 mL/s, or 40 mL/s. Other reagent distribution channels are configured to flow a fluid at a flow rate of at most about 1000 microliter (uL)/s, or 900 uL/s, or 800 uL/s, or 700 uL/s, or 600 uL/s, or 500 uL/s, or 400 uL/s, or 300 uL/s, or 200 uL/s, or 100 uL/s.

The reagent distribution lines are configured to come in fluid communication with vias or channels in a via layer of a fluidic device having the manifold. In some cases, the ports 1801, 1802 and 1803 and reagent distribution channels hold or transfer a fluid at the macroscale, whereas the vias or channels in the via layer transfer fluid at the microscale or even nanoscale.

Example 8

Figure 19A:
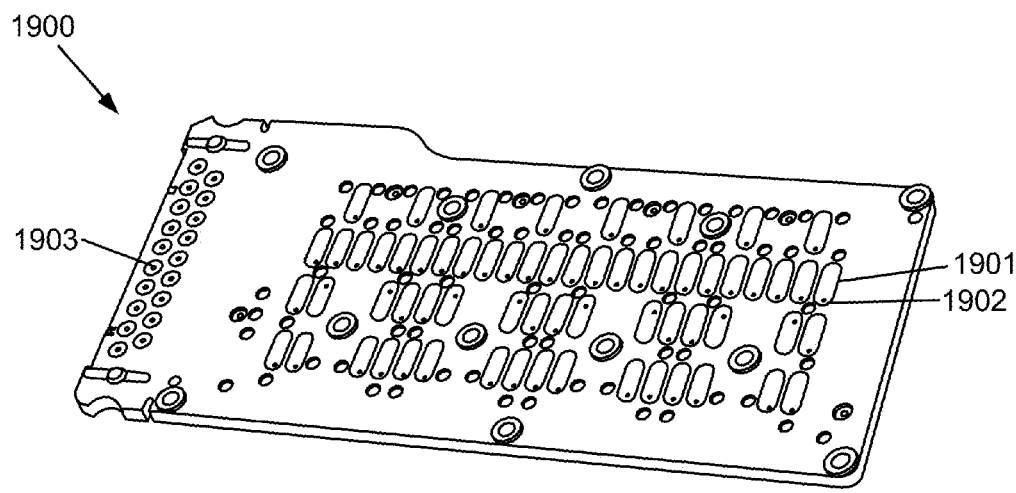
FIG. 19A shows a front view of a pneumatic carrier.
Figure 19B:
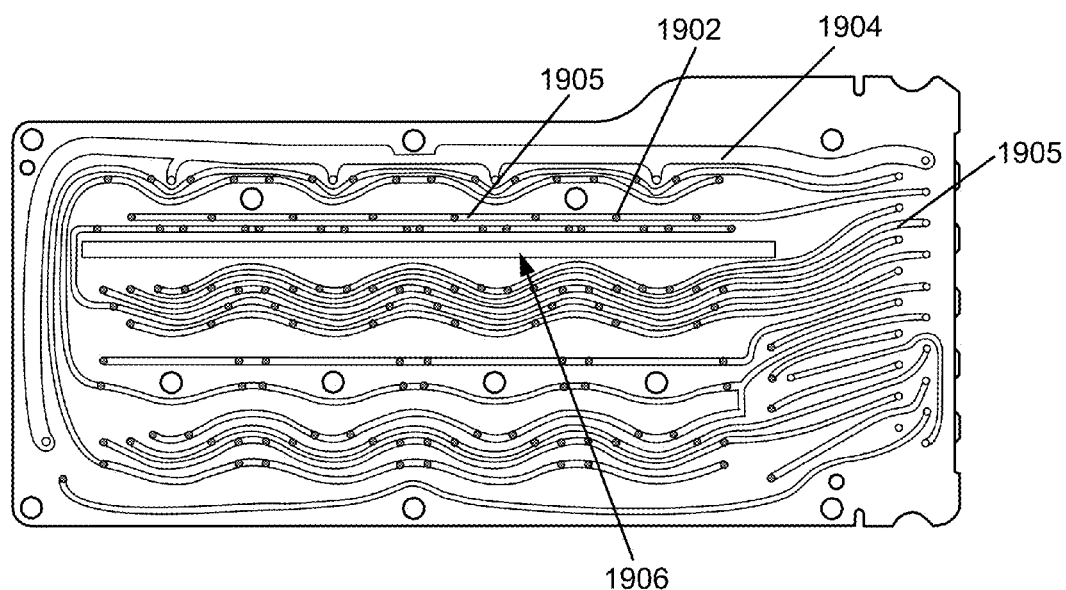
FIG. 19B shows an underside of the pneumatic carrier.

FIGS. 19A and 19B show a pneumatic carrier (or actuation layer) 1900 having a plurality of channels formed in the carrier 1900. FIG. 19A is a front view of the pneumatic carrier 1900; FIG. 19B shows an underside of the pneumatic carrier 1900. The pneumatic carrier includes a plurality of raised sealing rings 1901 having ports 1902 for providing positive or negative pressure to cavities defined by the sealing rings 1901. The sealing rings 1901 are configured to rest adjacent an elastic layer and below one or more vias in a via layer adjacent the elastic layer (see FIG. 11). The sealing rings 1901 and ports 1902 are in fluid communication with ports 1903 for providing pressure (positive or negative) to the cavities defined by the sealing rings 1901. Positive or negative pressure is conveyed to the cavities by channels formed in an underside of the pneumatic carrier 1900, as shown in FIG. 19B. The pneumatic carrier 1900 includes a first channel 1904 (e.g., waste channel) and one or more second channels 1905 for bringing the sealing rings 1901 in fluid communication with a source of positive or negative pressure. The pneumatic carrier 1900 includes a slot for a magnet 1906. The magnet may be used for capturing magnetic field-attractable particles during processing (e.g., fluid flow through a fluidics layer a device having the pneumatic carrier 1900).

Some of the channels of the pneumatic carrier 1900 can be grouped (or ganged). This permits control of a plurality of valves with the aid of a single source of positive or negative pressure.

Example 9

Figure 20:
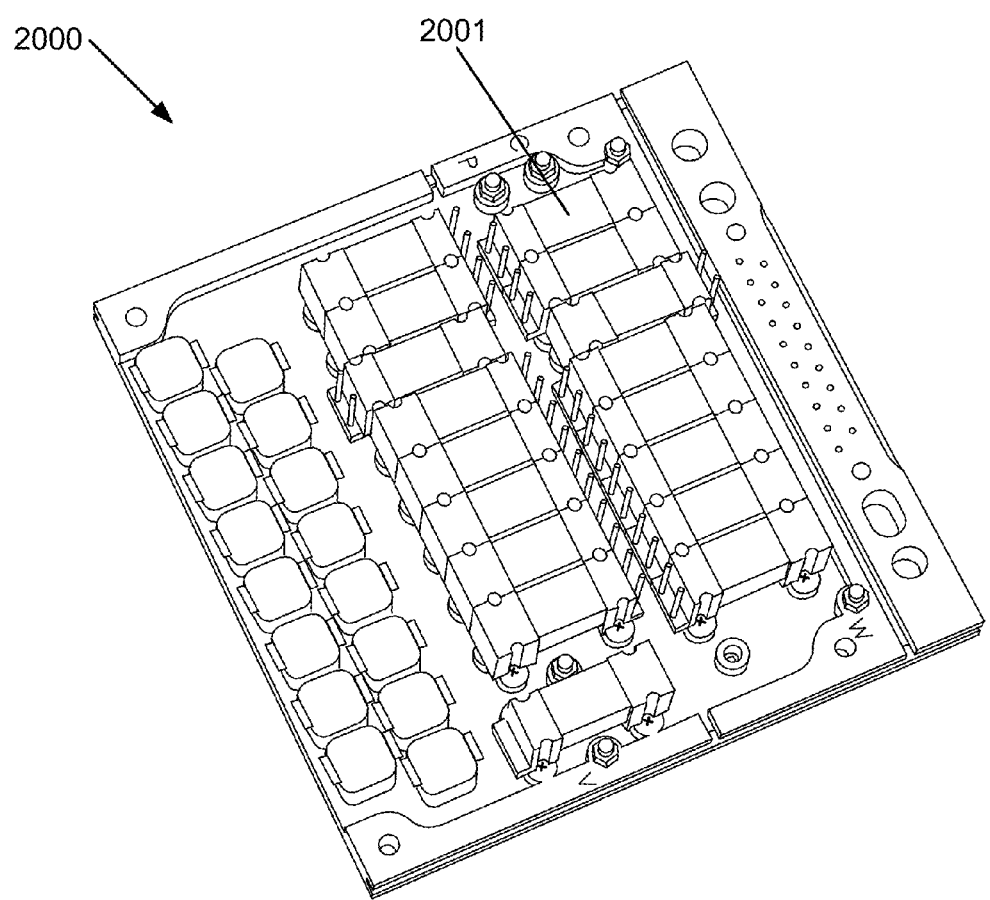
FIG. 20 schematically illustrates a solenoid valve.

FIG. 20 shows an interface manifold 2000 for mating with a pneumatic carrier (or actuation layer), such as the pneumatic layer 1900 of FIG. 19. The interface manifold 2000 includes solenoid valves 2001 for regulating the application of positive or negative pressure to various channels of the pneumatic carrier. The interface manifold 2000 permits the pressure of individual channels to be independently regulated. The solenoid valves 2001 are in fluid communication with a source of positive pressure (e.g., compressor) or negative pressure (e.g., vacuum pump).

Example 10

Figure 21:
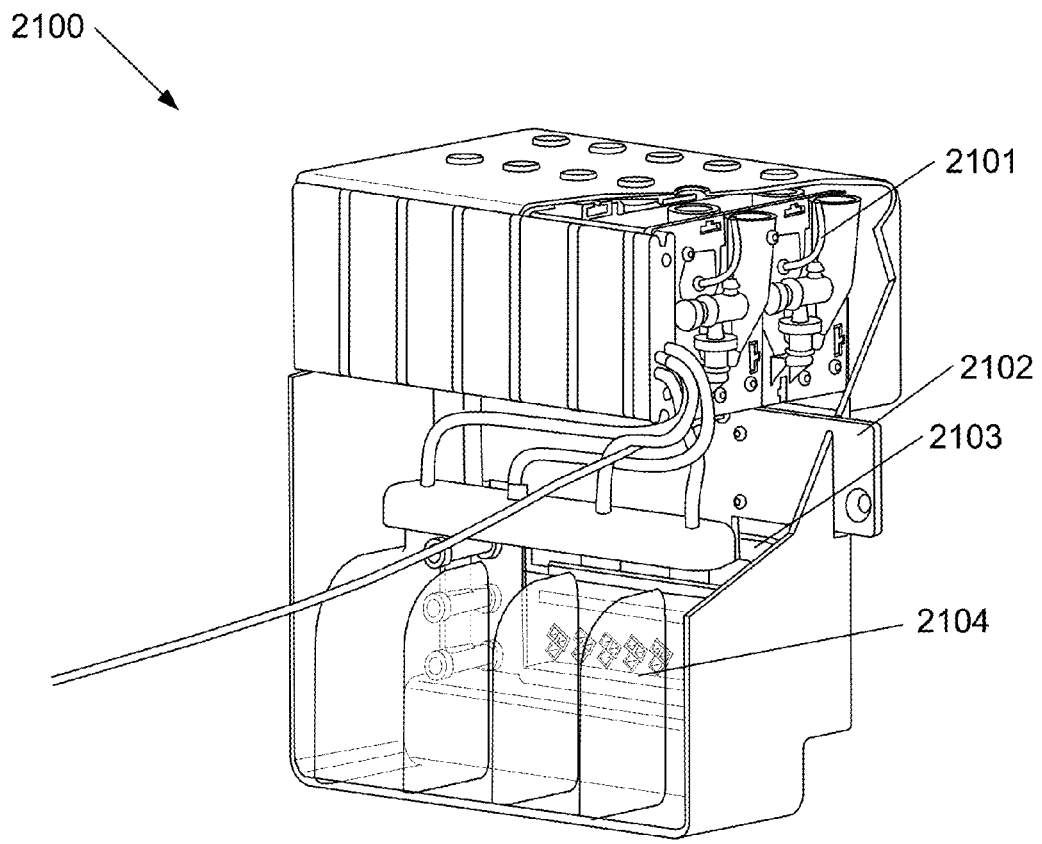
FIG. 21 schematically illustrates a fluidics system.

FIG. 21 shows a fluidics system 2100 having a sample processing module 2101, library construction module 2102, normalization module 2103 and chambers (or containers) for various reagents (e.g., buffers) or waste. The processing module 2101 comprises a fluidics manifold, a via layer adjacent the fluidics manifold, an elastic layer adjacent the via layer and an actuation layer adjacent the elastic layer (see, e.g., FIG. 11).

Figure 22A:
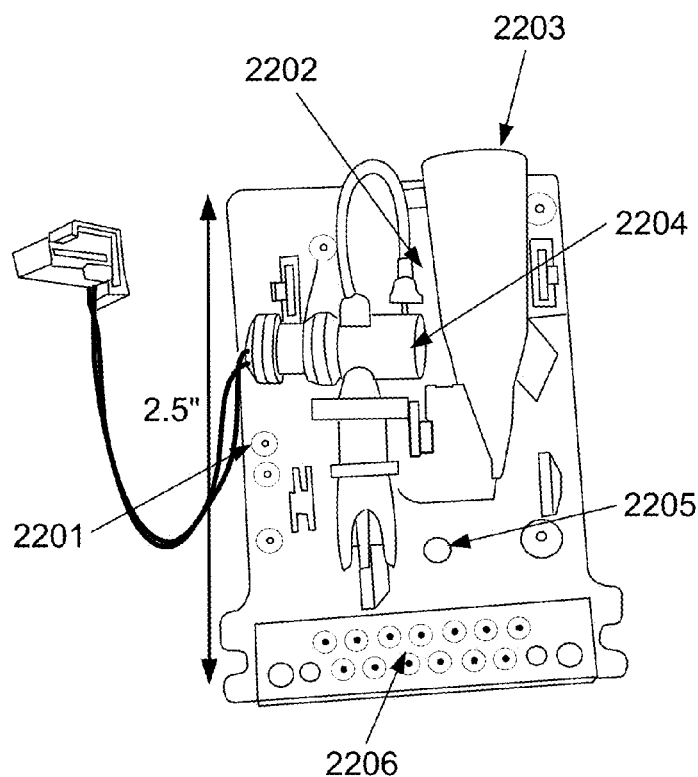
FIGS. 22A and 22B show a processing module, which can be used with the fluidics device of FIG. 21.
Figure 22B:
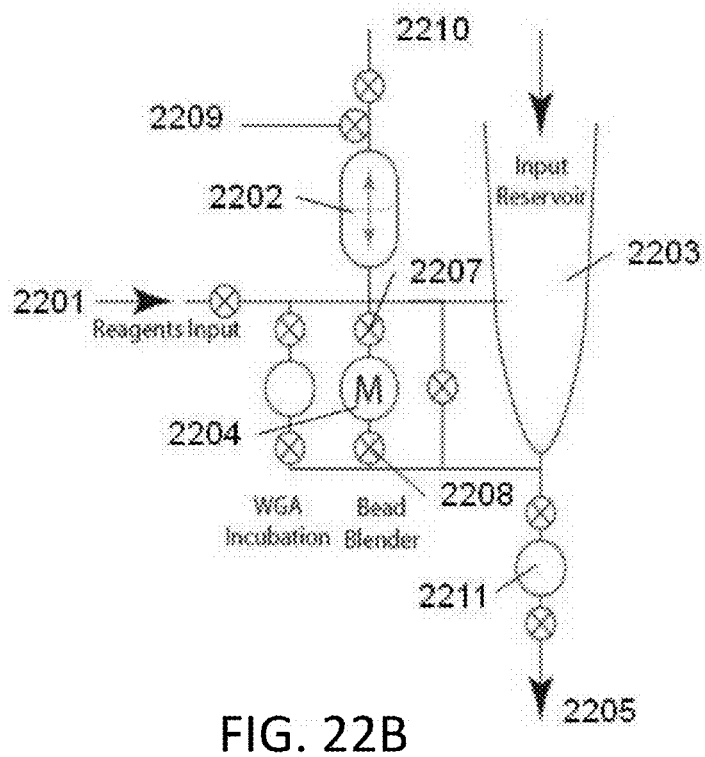

FIGS. 22A and 22B show an example of a sample processing module (or cartridge) 2200 that may be integrated into the fluidics system 2100. The module 2200 comprises a reagent input 2201, a pumping ballast and beads chamber 2202, a sample inlet 2203 (e.g., for accepting cotton swabs), a bead blender 2204, an output 2205 and a pneumatic interface 2206. The processing module 2200 further comprises a via layer, an elastic layer and an actuation layer.

The sample processing module 2200 performs the initial tasks of the workflow: cell disruption, DNA purification and whole genome amplification. The sample processing module can perform viral/cell/spore disruption, DNA purification, and whole genome amplification.

Lysis can be accomplished using a commercial off-the-shelf technology (e.g., Omnilyse, Claremont BioSciences) 2204 integrated on the cartridge 2200. For example, the Omnilyse from Claremont BioSciences provides bead beating in a miniature format by employing a rotating bed of zirconium beads; this device may effectively lyse spores and other types of cells. Paramagnetic bead-based purification is used to purify and concentrates the DNA from the lysates. Whole genomic amplification can be carried out isothermally using randomly primed multiple-strand displacement amplification.

This sample processing module cartridge is formed using rapid prototyping techniques having a design compatible with injection molding. A microfluidic foil and an elastomeric valve/pumping membrane are sandwiched between a pair of liquid and a pneumatic manifolds. The valves are actuated using pressure and/or vacuum through the pneumatic interface 2206. The liquid manifold also provides the interface and structural support for the on-board lysis device (mechanical bead blender). The cartridge has a funnel-shaped inlet 2203 that accepts a 0.3-1.5 mL sample that is then circulated through the bead blender for a predetermined period of time. Circulation is accomplished by opening valves 2207 and 2208, and cyclically opening valve 2209 (closing valve 2210) and opening 2210 (closing valve 2209). The sample is thus uniformly exposed to the lysis device 2204 while it is activated. Reagents for the subsequent SPRI clean-up (a PEG/magnetic beads mix and 70% ethanol (EtOH) for washing) are metered by a (similar) reagents distributor cartridge (not shown) and transferred using a back pressure into the reagents input 2201 and mixed with the sample. The beads are positioned in the smaller chamber 2202 using a magnet (not shown) or other magnetic-field-inducing device and DNA is captured on the beads. Wash solution is introduced through 2201 and passed over the beads. The beads now carrying the DNA are re-suspended in 60 µL EtOH (introduced through 2202) and pumped out via the Output port 2205 using pump 2211.

Figure 23A:
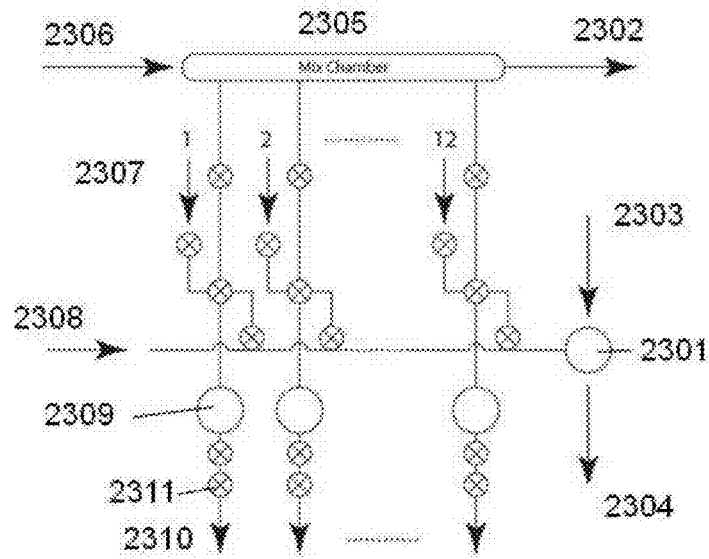
FIGS. 23A and 23B show a normalization module.
Figure 23B:
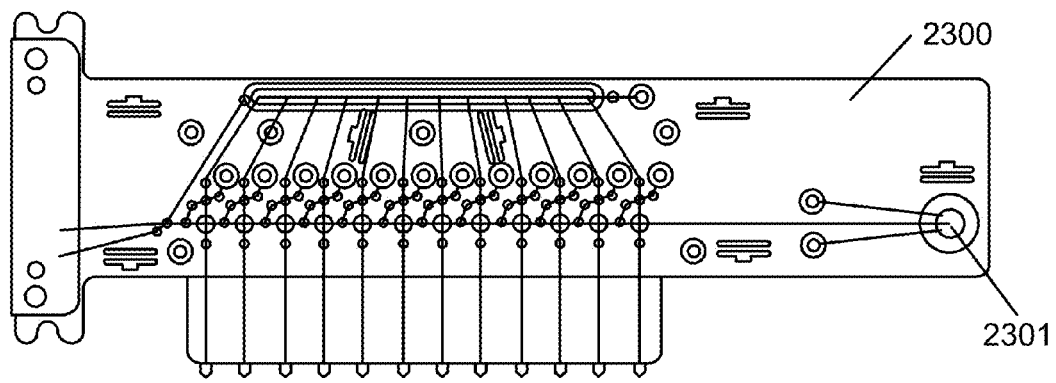

FIGS. 23A and 23B show an example of a normalization module that may be integrated into the fluidics system 2100 described above in the context of FIG. 21. The function of the normalization module can be to provide an optimal library concentration to the sequencer. The concentration of each library can be measured, for example, using a fluorescently stained sample and an off-the-shelf fluorimeter. In some embodiments, the concentration can be measured by UV spectrophotometry, conductivity, or other methods known in the art. Each library can then be diluted accordingly and optionally pooled. The normalization module can also efficiently transfer fluids between the other cartridge modules.

The function of the normalization module is to provide an optimal library concentration to the sequencer. The concentration of each library is measured using a fluorescently stained sample and off-the-shelf fluorimeter. Each is diluted accordingly and then pooled. FIG. 23B shows a normalization cartridge 2300 of the normalization module, which carries out all processes for 12 libraries. The concentration of ds-DNA in each library is measured at the optical flowcell 2301 using the pump 2309 to withdraw aliquots of library samples that enter the normalization module through interface 2310 and to withdraw dsDNA stain in buffer from dye input 2308, to mix and position the sample. The flowcell 2301 can be interrogated by a detector (not shown). The detector can be a fluorimeter, including a commercially available fluorimeter. After each measurement the optical flow cell is washed by a pressurized vial of wash buffer 2303 passed through the flow cell to waste 2304. This process can be carried out in series for each library. In some embodiments, multiple optical flow cells may be provided to simultaneously analyze more than one sequencing library.

Pooling of the libraries can be carried out by first pumping each library into mix chamber 2305. A controller can reference the measured dsDNA concentrations to modulate each of the pumping valves 2311 for each library appropriately, for example to produce a mixture comprising equal concentrations of each library. Transfer buffer 2306 can enter the mix chamber 2305 to dilute the libraries. Transfer buffer flow can also be used to push the pooled library to a sequencing module through port, channel or other fluidic connection 2302, such as a MiSeq flowcell.

Example 11

Figure 24:
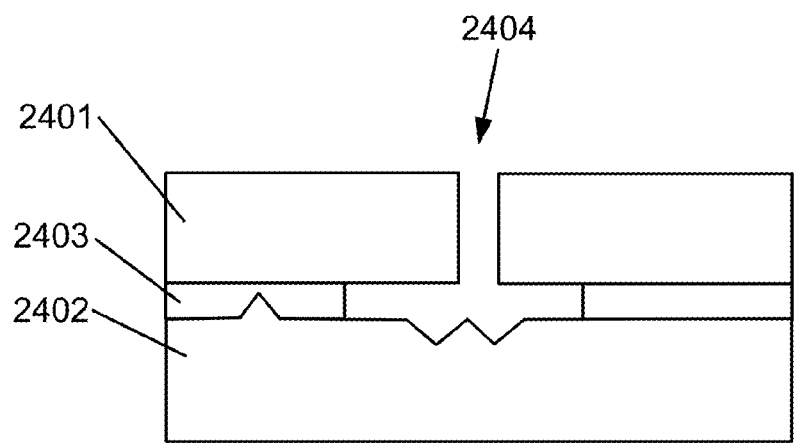
FIG. 24 shows various approaches for mechanically sealing a first layer against a second layer.

FIG. 24 shows an example for mechanically sealing a first layer 2401 against a second layer 2402. The first layer 2401 is sealed against the second layer 2402 with the aid of a sealant provided through a 2404 formed in the first layer 2401. Any force (or pressure) required to enable the sealant to fill one or more spaces between the first layer 2401 and the second layer 2402 can be provided by way of one or more of screws (e.g., metal screws, glue screws) and clamps (e.g., mechanical clamps). Alternative, the layers may be sealed against one another with the aid of high temperature lamination, such as, for example, if one of the layers is formed of a polymeric material.

Devices, systems and methods provided herein are combinable with, or modifiable by, other systems and methods, such as, for example, systems and/or methods described in U.S. Patent Publication No. 2004/0209354 to Mathies et al., filed on Dec. 29, 2003, U.S. Patent Publication 2005/0161669 to Jovanovich et al., filed on Feb. 2, 2005, and Anderson et al., "A miniature integrated device for automated multistep genetic assays," Nucleic Acids Res. 2000 June 15:28(12): E60.

It is to be understood that this invention is not limited to particular devices or methods, which can, of course, vary. It is also to be understood that the terminology used herein is for the purpose of describing particular embodiments only, and is not intended to be limiting. As used in this specification and the appended claims, the singular forms "a", "an" and "the" can include plural referents unless the content clearly dictates otherwise. Thus, for example, reference to "a component" can include a combination of two or more components, reference to "a reagent" can include mixtures of reagents, and the like.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A device comprising at least one diaphragm valve comprised in a combination that comprises a fluidics layer comprising a fluidic conduit, an actuation layer comprising an actuation conduit and an elastic layer sandwiched between the fluidics layer and the actuation layer, wherein:
(A) at least one diaphragm valve comprises a diaphragm provided by the elastic layer, said diaphragm being mechanically sealed against the fluidics layer and against a raised sealing ring of the actuation layer, wherein the sealing ring is configured to exert localized pressure on the elastic layer against the fluidics layer to form a pressure seal;
(B) each diaphragm valve of (A) comprises:
 a) a valve seat against which the diaphragm is configured to sit;
 b) a valve relief defined at least in part by the sealing ring, and into which the diaphragm is configured to be deflected, thereby defining a valve chamber; and
 c) a valve inlet and a valve outlet comprised in the fluidics layer and in fluid communication with the valve chamber,
 wherein the diaphragm is configured to be actuated by positive or negative pressure transmitted through an actuation conduit in the actuation layer that communicates with the valve relief; and
(C) the fluidics layer comprises a via layer and a fluidics manifold, wherein:
 the via layer has a first face mated with the elastic layer and a second face mated with the fluidics manifold, wherein the valve inlet and valve outlet of each diaphragm valve of (A) are configured as vias through the via layer and each via is in fluid communication with a microfluidic channel disposed in the second face of the via layer, and
 the fluidics manifold comprises at least one compartment sealed by the second face of the via layer, wherein the at least one compartment is in fluid communication with the microfluidic channel that is in fluid communication with the via.

2. The device of claim 1, further comprising a mechanical fastener configured to fasten the combination into a sandwich, wherein the mechanical fastener transmits pressure to a pressure seal.

3. The device of claim 2, wherein the mechanical fastener is selected from a screw, a clip, a snap, a staple, a rivet, a band and a pin.

4. The device of claim 1 wherein the elastic layer comprises a urethane, a nitrile, a latex or silicone.

5. The device of claim 1, wherein the at least one diaphragm valve of (A) is a plurality of diaphragm valves.

6. The device of claim 1, wherein the fluidics manifold comprises a second compartment that opens toward the via layer and the via layer comprises an aperture exposing the second compartment to the elastic layer.

7. The device of claim 1, wherein the fluidics manifold and/or the actuation layer comprises a polymer selected from poly(acrylonitrile butadiene styrene) ("ABS"), acrylic, acetal, rubber, nylon, polycarbonate, polyether, polyester, polyurethane, polypropylene, polyolefin, cycloolefin, and co-polymers or filled versions thereof.

8. The device of claim 1, wherein the fluidics manifold and/or the actuation layer are comprised of a rigid material.

9. The device of claim 1, wherein at least one actuation conduit is configured to transmit positive or negative pressure to a plurality of the diaphragm valves of (A).

10. The device of claim 1, wherein at least one actuation conduit is configured to transmit positive or negative pressure to a fluidic conduit.

11. The device of claim 1, wherein at least one actuation conduit traverses the actuation layer from a first face to a second, opposing face.

12. The device of claim 1, wherein the actuation layer comprises an internal actuation conduit configured to transmit positive or negative pressure to at least one diaphragm valve of (A).

13. The device of claim 1, wherein the via layer has a thickness of no more than about 0.5 mm.

14. The device of claim 1, wherein the sealing ring is in contact with the elastic layer.

15. The device of claim 1, wherein one or more macrofluidic chambers or channels are disposed in the fluidics manifold.

16. The device of claim 15, wherein the via layer comprises one or more microfluidic channels in fluid communication with said one or more macrofluidic chambers or channels.

17. The device of claim 16, wherein the device tolerates a lateral shift of the via layer in relation to the actuation layer of as much as 20% with respect to a center of a sealing ring and a midpoint between two via serving as a valve inlet and a valve outlet, respectively.

18. The device of claim 1, wherein the elastic layer comprises polydimethylsiloxane (PDMS).

19. The device of claim 1, wherein the layers are pressure sealed against one another by gluing or by vacuum.

20. The device of claim 1, wherein the layers are pressure sealed against one another by heat sealing or by ultrasonic welding.

21. A system comprising:
a) a device comprising at least one diaphragm valve comprised in a combination that comprises a fluidics layer comprising a fluidic conduit, an actuation layer comprising an actuation conduit and an elastic layer sandwiched between the fluidics layer and the actuation layer, wherein:
(A) at least one diaphragm valve comprises a diaphragm provided by the elastic layer, said diaphragm being mechanically sealed against the fluidics layer and against a raised sealing ring of the actuation layer, wherein the sealing ring is configured to exert localized pressure on the elastic layer against the fluidics layer to form a pressure seal;
(B) each diaphragm valve of (A) comprises:
 i) a valve seat against which the diaphragm is configured to sit;
 ii) a valve relief defined at least in part by the sealing ring, and into which the diaphragm is configured to be deflected, thereby defining a valve chamber; and
 iii) a valve inlet and a valve outlet comprised in the fluidics layer and in fluid communication with the valve chamber,
 wherein the diaphragm is configured to be actuated by positive or negative pressure transmitted through an actuation conduit in the actuation layer that communicates with the valve relief; and
(C) the fluidics layer comprises a via layer and a fluidics manifold, wherein:
 the via layer has a first face mated with the elastic layer and a second face mated with the fluidics manifold, wherein the valve inlet and valve outlet of each diaphragm valve of (A) are configured as vias through the via layer and each via is in fluid communication with a microfluidic channel disposed in the second face of the via layer, and the fluidics manifold comprises at least one compartment sealed by the second face of the via layer, wherein the at least one compartment is in fluid communication with the microfluidic channel that is in fluid communication with the via;

b) a source of positive and/or negative pressure in communication with the actuation conduits; and c) a control unit comprising logic to open and/or close valves in a programmed sequence.

22. The system of claim 21 further comprising:

d) a magnet assembly configured to deliver a regulatable magnetic field to a chamber in the fluidic manifold.

23. The system of claim 21 further comprising:

d) a thermal control assembly configured to regulate temperature in a chamber in the fluidic manifold.

24. The system of claim 21, further comprising:

d) an optical assembly.

25. The system of claim 21, further comprising a mechanical fastener configured to fasten the combination into a sandwich, wherein the mechanical fastener transmits pressure to a pressure seal.

26. The system of claim 21, wherein the elastic layer comprises a urethane, a nilrile, a latex or silicone.

27. The system of claim 21, wherein the at least one diaphragm valve of (A) is a plurality of diaphragm valves.

28. The system of claim 21, wherein the fluidics manifold and/or the actuation layer comprises a polymer selected from poly(acrylonitrile butadiene styrene) ("ABS"), acrylic, acetal, rubber, nylon, polycarbonate, polyether, polyester, polyurethane, polypropylene, polyolefin, cycloolefin, and copolymers or filled versions thereof.

29. The system of claim 21, wherein the via layer has a thickness of no more than about 0.5 mm.

30. The system of claim 21, wherein one or more macrofluidic chambers or channels are disposed in the fluidics manifold and the via layer comprises one or more microfluidic channels in fluid communication with said one or more macrofluidic chambers or channels.

31. The system of claim 30, wherein the device tolerates a lateral shift of the via layer in relation to the actuation layer of as much as 20% with respect to a center of a sealing ring and a midpoint between two vias serving as a valve inlet and a valve outlet, respectively.

32. The system of claim 30, wherein the layers are pressure sealed against one another by heat sealing or ultrasonic welding.

33. A method comprising:

a) providing a device comprising at least one diaphragm valve comprised in a combination that comprises a fluidics layer comprising a fluidic conduit, an actuation layer comprising an actuation conduit and an elastic layer sandwiched between the fluidics layer and the actuation layer, wherein:

(A) at least one diaphragm valve comprises a diaphragm provided by the elastic layer, said diaphragm being mechanically sealed against the fluidics layer and against a raised sealing ring of the actuation layer, wherein the sealing ring is configured to exert localized pressure on the elastic layer against the fluidics layer to form a pressure seal;

(B) each diaphragm valve of (A) comprises:

i) a valve seat against which the diaphragm is configured to sit;

ii) a valve relief defined at least in part by the sealing ring, and into which the diaphragm is configured to be deflected, thereby defining a valve chamber; and iii) a valve inlet and a valve outlet comprised in the fluidics layer and in fluid communication with the valve chamber, wherein the diaphragm is configured to be actuated by positive or negative pressure transmitted through an actuation conduit in the actuation layer that communicates with the valve relief; and (C) the fluidics layer comprises a via layer and a fluidics manifold, wherein;

the via layer has a first face mated with the elastic layer and a second face mated with the fluidics manifold, wherein the valve inlet and valve outlet of each diaphragm valve of (A) are configured as vias through the via layer and each via is in fluid communication with a microfluidic channel disposed in the second face of the via layer, and the fluidics manifold comprises at least one compartment sealed by the second face of the via layer, wherein the at least one compartment is in fluid communication with the microfluidic channel that is in fluid communication with the via;

wherein the at least one compartment is a plurality of compartments;

b) opening at least one of the diaphragm valves of (A); and c) moving liquid through the diaphragm valve from one compartment to another.

* * * * *

UNITED STATES PATENT AND TRADEMARK OFFICE
CERTIFICATE OF CORRECTION

PATENT NO. : 8,763,642 B2  
APPLICATION NO. : 13/202877  
DATED : July 1, 2014  
INVENTOR(S) : Mattias Vangbo Page 1 of 1

It is certified that error appears in the above-identified patent and that said Letters Patent is hereby corrected as shown below:

In the Claims:

Column 31, Line 13, Claim 1, "scaled" should be changed to --sealed--

Column 31, Line 41, Claim 1, "scaled" should be changed to --sealed--

Column 32, Line 45, Claim 21, "scaled" should be changed to --sealed--

Column 33, Line 49, Claim 32, "scaled" should be changed to --sealed--

Column 34, Line 10, Claim 33, "scaled" should be changed to --sealed--

Signed and Sealed this  
Fifth Day of April, 2016

Michelle K. Lee  
*Director of the United States Patent and Trademark Office*